(12) United States Patent
Carmignani et al.

(10) Patent No.: US 11,101,986 B2
(45) Date of Patent: Aug. 24, 2021

(54) AUTHENTICATION PROCESSING SERVICE

(71) Applicant: KEYLESS TECHNOLOGIES LTD, London (GB)

(72) Inventors: Andrea Carmignani, Fontainebleau (FR); Fabian Eberle, Fuerth (DE); Giuseppe Ateniese, Hoboken, NJ (US); Jaroslav Sedenka, Hranice (CZ); Paolo Gasti, New York, NY (US)

(73) Assignee: KEYLESS TECHNOLOGIES LTD, London (GB)

( * ) Notice: Subject to any disclaimer, the term of this patent is extended or adjusted under 35 U.S.C. 154(b) by 94 days.

(21) Appl. No.: 16/786,615

(22) Filed: Feb. 10, 2020

(65) Prior Publication Data

US 2020/0259638 A1 Aug. 13, 2020

Related U.S. Application Data

(60) Provisional application No. 62/802,854, filed on Feb. 8, 2019, provisional application No. 62/862,454, filed on Jun. 17, 2019.

(51) Int. Cl.
| | |
|---|---|
| *H04L 9/06* | (2006.01) |
| *H04L 9/08* | (2006.01) |
| *H04L 9/30* | (2006.01) |
| *H04L 9/32* | (2006.01) |
| *H04L 29/06* | (2006.01) |

(52) U.S. Cl.
CPC .......... *H04L 9/0833* (2013.01); *H04L 9/0869* (2013.01); *H04L 9/30* (2013.01); *H04L 63/0853* (2013.01); *H04L 63/0861* (2013.01)

(58) Field of Classification Search
CPC ....... H04L 9/0833; H04L 9/0869; H04L 9/30; H04L 63/0853; H04L 63/0861
See application file for complete search history.

(56) References Cited

U.S. PATENT DOCUMENTS

| | | |
|---|---|---|
| 9,454,656 B2 | 9/2016 | Oberheide et al. |
| 9,537,661 B2 | 1/2017 | Khalil et al. |
| 2014/0259120 A1 | 9/2014 | Morijiri et al. |
| 2015/0186721 A1* | 7/2015 | Derakhshani ......... H04L 9/0866 382/117 |
| 2016/0119119 A1* | 4/2016 | Calapodescu ....... G06F 21/6227 380/30 |
| 2016/0373440 A1* | 12/2016 | Mather ............... H04L 63/0861 |
| 2018/0191501 A1* | 7/2018 | Lindemann ........... G06F 3/0647 |
| 2018/0191695 A1* | 7/2018 | Lindemann ......... H04L 63/0853 |

(Continued)

FOREIGN PATENT DOCUMENTS

| | | |
|---|---|---|
| KR | 10-2011-0116913 A | 10/2011 |
| WO | 2013/134299 A1 | 9/2013 |

OTHER PUBLICATIONS

Adi Shamir. "How to share a secret." Communications of the ACM, 22(11):612-613, 1979. [Sha79] [Technical Overview-10] [Biometrics-9].

(Continued)

*Primary Examiner* — Darshan I Dhruv
(74) *Attorney, Agent, or Firm* — Van Court & Aldridge LLP

(57) ABSTRACT

Systems, methods, and computer-readable media for facilitating an authentication processing service are provided.

17 Claims, 24 Drawing Sheets

(56) References Cited

U.S. PATENT DOCUMENTS

2019/0356491 A1* 11/2019 Herder, III ............ H04L 9/0637

OTHER PUBLICATIONS

Ali Bagherzandi, Stanislaw Jarecki, Yanbin Lu, and Nitesh Saxena, "Password-Protected Secret Sharing." 22 pages, CCS '11: Proceedings of the 18th ACM conference on Computer and communications security, Oct. 2011 [BJSL11].
Amos Beimel. "Secret-sharing schemes: A survey." 36 pages. 2011. In: Chee Y.M. et al. (eds) Coding and Cryptology. IWCC 2011. Lecture Notes in Computer Science, vol. 6639. Springer, Berlin, Heidelberg https://www.cs.bgu.ac.il/~beimel/Papers/Survey.pdf. [Biometrics-1].
Andrew Tobin. Sovrin: What goes on the ledger?, 2018, 12 pages. https://www.evernym.com/wp-content/uploads/2017/07/What-Goes-On-The-Ledger.pdf. [Tob18].
Anil K Jain, Arun Ross, and Salil Prabhakar. "An introduction to biometric recognition." IEEE Transactions on circuits and systems for video technology, 14(1):4-20, 2004, 17 pages. [JRP04].
Anil K. Jain, Salil Prabhakar, Lin Hong, and Sharath Pankanti. "Filterbank-based fingerprint matching." IEEE Transactions on Image Processing, 9(5):846-859, May 2000. [Technical Overview-6].
Argent "A radically better crypto wallet" https://argent.xyz. 4 pages, retrieved Jan. 28, 2020. [arg].
Baird, "Brian Armstrong Claims Coinbase Is Registering 50,000 New Users Per Day." 5 pages, Aug. 15, 2018. Bitcoinist: https://bitcoinist.com/brian-armstrong-coinbase-registering-50000-new-users-per-day/ [002USP1-9].
Benny Chor, Shafi Goldwasser, Silvio Micali, and Baruch Awerbuch. "Verifiable secret sharing and achieving simultaneity in the presence of faults." In Foundations of Computer Science, 1985, 26th Annual Symposium on, pp. 383-395. IEEE, 1985. [CGMA85].
Bitcoin Active Addresses historical chart. 1 page, retrieved Feb. 14, 2020. Bitinfocharts: https://bitinfocharts.com/comparison/bitcoin-activeaddresses.html [002USP1-8].
Bitcoin hierarchial deterministic wallets. 18 pages, retrieved on Jun. 11, 2019. https://github.com/bitcoin/bips/blob/master/bip-0032.mediawiki. [Technical Overview-1].
Blockstack. https://blockstack.org. 15 pages, retrieved Jan. 28, 2020 [blo].
Brandao et al., "Threshold Schemes for Cryptographic Primitives." 56 pages, Draft dated Jul. 26, 2018, National Institute of Standards and Technology, U.S. Department of Commerce. https://csrc.nist.gov/CSRC/media/Publications/nistir/8214/draft/documents/nistir-8214-draft.pdf [FAQ-1].
Brian Byer. "Internet users worry about online privacy but feel powerless to do much about it." https://www.entrepreneur.com/article/314524, Jun. 20, 2018, 5 pages [Bye].
Casa. "Securing Bitcoin Made Easy." https://keys.casa, 5 pages, retrieved Jan. 29, 2020 [cas].
Craig Gentry, Philip MacKenzie, and Zulfikar Ramzan. 2006. "A Method for Making Password-Based Key Exchange Resilient to Server Compromise." In Advances in Cryptology—Crypto 2006, Cynthia Dwork (Ed.). Springer Berlin Heidelberg, Berlin, Heidelberg, 18 pages. [Bake-7].
Craig Timberg. "German researchers discover a flaw that could let anyone listen to your cell calls." 10 pages, Dec. 18, 2014. https://www.washingtonpost.com/news/the-switch/wp/2014/12/18/german-researchers-discover-a-flaw-that-could-let-anyone-listen-to-your-cell-calls-an. [Tim].
Davey Winder. Data breaches expose 4.1 billion records in first six months of 2019. https://www.forbes.com/sites/daveywinder/2019/08/20/data-breaches-expose-41-billion-records-in-first-six-months-of-2019/ #4f529115bd54, Aug. 20, 2019, 4 pages. [Win].
Drummond Reed, Manu Sporny, Dave Longley, Christopher Allen, Ryan Grant, and Markus Sabadello. "Decentralized Identifiers (DIDs)" v1.0, Dec. 10, 2019, 59 pages. https://w3c-ccg.github.io/did-spec/. [RSL+18] [Technical Overview-9].
Duncan Kingori. Top 10 cybersecurity risks for 2019. https://www.uscybersecurity.net/risks-2019/, 6 pages, accessed Sep. 15, 2019. [Kin].
Elette Boyle, Rio Lavigne, and Vinod Vaikuntanathan. "Adversarially robust property-preserving hash functions." 53 pages, Feb. 20, 2019. [BLV19a] [BLV19b].
Ethereum Active Addresses historical chart. 1 page, retrieved Feb. 14, 2020. Bitinfocharts: https://bitinfocharts.com/comparison/ethereum-activeaddresses.html. [002USP1-7].
Ethereum Unique Addresses Chart. 1 page, retrieved Feb. 14, 2020. Etherscan: https://etherscan.io/chart/address. [002USP1-6].
Face ID security. Nov. 2017, 6 pages. https://www.apple.com/kr/business-docs/FaceID_Security_Guide.pdf. [fac].
Florian Schroff, Dmitry Kalenichenko, and James Philbin. "Facenet: A unified embedding for face recognition and clustering." 10 pages, 2015. https://arxix.org/abs/1503.03832. [Biometrics-2].
Forrester Research. The growing legal and regulatory implications of collecting biometric data. https://www.zdnet.com/article/the-growing-legal-and-regulatory-implications-of-collecting-biometric-data/, May 17, 2019, 3 pages. [Res].
Giuseppe Ateniese, Alfredo De Santis, Anna Lisa Ferrara, and Barbara Masucci. "Provably-secure time-bound hierarchical key assignment schemes." In Ari Juels, Rebecca N. Wright, and Sabrina De Capitani di Vimercati, editors, 4CM CCS 06: 13th Conference on Computer and Communications Security, 36 pages, Alexandria, Virginia, USA, Oct. 30-Nov. 3, 2006. ACM Press. [ADFM06].
Giuseppe Ateniese, Alfredo De Santis, Anna Lisa Ferrara, and Barbara Masucci. "Provably-secure time-bound hierarchical key assignment schemes." Journal of Cryptology, 25(2), pp. 243-270, Apr. 2012. [ADFM12].
Grand View Research, Multi-factor Authentication Market Size, Share & Trends Analysis Report, 5 pages, 2019. https://www.grandviewresearch.com/industry-analysis/multi-factor-authentication-market [002USP1-5].
Guy Zyskind, Oz Nathan, and Alex Pentland. Enigma: Decentralized computation platform with guaranteed privacy.arXiv preprint arXiv:1506.03471, 14 pages, 2015. [ZNP15].
IBM. 2019 cost of a data breach report. https://www.ibm.com/security/data-breach, 5 pages, accessed Sep. 15, 2019. [IBM].
Jason Crampton. "Practical and efficient cryptographic enforcement of interval-based access control policies." ACM Transactions on Information Systems Security, vol. 14, No. 1, Article 14, 30 pages, May 2011. [Cra11].
Jerry Ma, Weining Yang, Min Luo, and Ninghui Li. "A study of probabilistic password models." In IEEE Symposium on Security and Privacy (SP),16 pages. IEEE, 2014. [MYLL14].
John Daugman. "Probing the Uniqueness and Randomness of IrisCodes: Results From 200 billion Iris Pair Comparisons." Proceedings of the IEEE, 94(11):1927-1935, 2006. [Technical Overview-2].
Kilian Q. Weinberger and Lawrence K. Saul. "Distance metric learning for large margin nearest neighbor classification." Journal of Machine Learning Research 10, 2009, pp. 207-244. http://jmlr.csail.mit.edu/papers/volume10/weinberger09a/weinberger09a.pdf [Biometrics-4].
Ledger. https://Ledger.com, 6 pages, retrieved Jan. 29, 2020. [led].
Marcella Hastings, Brett Hemenway, Daniel Noble, , and Steve Zdancewic. "SoK: General purpose compilers for secure multi-party computation." 2019 IEEE Symposium on Security and Privacy (SP), May 19-23, 2019, 18 pages. [HHN+].
Markets and Markets, Consumer IAM Market worth $37.79 billion by 2023, 3 pages, 2019. https://www.marketsandmarkets.com/PressReleases/consumer-iam.asp [002USP1-3].
Markets and Markets, Enterprise Key Management Market. 3 pages, 2019. https://www.marketsandmarkets.com/PressReleases/enterprise-key-management.asp [002USP1-4].
Markus Dürmuth, Fabian Angelstorf, Claude Castelluccia, Daniele Perito, and Abdelberi Chaabane. "OMEN: Faster password guessing using an ordered markov enumerator." In ESSoS, pp. 1-14. Springer, 2015. [DAC+15].

(56) References Cited

OTHER PUBLICATIONS

Mashael AlSabah, Gabriele Oligeri, and Ryan Riley. "Your culture is in your password: An analysis of a demographically-diverse password dataset." Computers & Security, 77, 38 pages, Oct. 24, 2018. [AOR18].

Matteo Dell'Amico, Pietro Michiardi, and Yves Roudier. "Password strength: An empirical analysis." In Proceedings IEEE INFOCOM, pp. 1-9. IEEE, 2010. [DMR10].

Mihir Bellare and Sara K Miner. "A forward-secure digital signature scheme." In Annual International Cryptology Conference, pp. 1-30. Springer, 1999. [BM99].

Mihir Bellare, David Pointcheval, and Phillip Rogaway. "Authenticated key exchange secure against dictionary attacks." In Bart Preneel, editor, Advances in Cryptology—Eurocrypt 2000, vol. 1807 of Lecture Notes in Computer Science, pp. 1-16, Bruges, Belgium, May 14-18, 2000. Springer, Heidelberg, Germany. [BPR00a] [BPR00b] [Bake-1].

Mihir Bellare, Viet Tung Hoang, and Phillip Rogaway. "Foundations of garbled circuits." 45 pages, Oct. 1, 2012, https://eprint.iacr.org/2012/265.pdf. [Biometrics-5].

Mikhail J. Atallah, Keith B. Frikken, and Marina Blanton. "Dynamic and efficient key management for access hierarchies." CCS '05, Nov. 7-11, 2005, 12 pages. [ABFF09].

Min Lin, Qiang Chen, and Shuicheng Yan. "Network in network." 10 pages, Mar. 4, 2014. https://arxiv.org/abs/1312.4400. [Biometrics-6].

Mitsuru Ito, Akira Saito, and Takao Nishizeki. "Secret sharing scheme realizing general access structure." Electronics and Communications in Japan (Part III: Fundamental Electronics Science), 72(9): 99-102, 1989. [ISN89] [Technical Overview-5] [Biometrics-3].

Moni Naor and Benny Pinkas. "Effcient oblivious transfer protocols." In S. Rao Kosaraju, editor, 12th Annual ACM-SIAM Symposium on Discrete Algorithms, 10 pages, Washington, DC, USA, Jan. 7-9, 2001. ACM-SIAM. [Technical Overview-7] [NP01].

Ndinga et al., "Measuring True Crypto Adoption: Bitcoin vs. Dash, Zcash, and Monero." 9 pages, Sep. 23, 2018. Longhash: https://www.longhash.com/news/measuring-true-crypto-adoption-bitcoin-vs-dash-zcash-and-monero[002USP1-10].

Oded Goldreich and Yehuda Lindell. 2006. "Session-Key Generation Using Human Passwords Only." Journal of Cryptology 19, 3, Jan. 25, 2005, 92 pages. https://doi.org/10.1007/s00145-006-0233-z [Bake-8].

Oded Goldreich, Silvio Micali, and Avi Wigderson. "How to play any mental game or a completeness theorem for protocols with honest majority." In Alfred Aho, editor, 19th Annual ACM Symposium on Theory of Computing, pp. 218-229, New York City, NY, USA, May 25-27, 1987. ACM Press. [GMW87] [Technical Overview-4].

Oded Goldreich. Foundations of Cryptography: vol. II Basic Applications. Cambridge University Press, Cambridge, UK, 2004, 449 pages. [Technical Overview-3].

Oded Goldreich. "Secure multi-party computation." Manuscript. Preliminary version, 78, 1998, 110 pages. [Gol98].

Paolo Gasti, Jaroslav Šeděnka, Qing Yang, Gang Zhou, and Kiran S. Balagani. "Secure, fast, and energy-efficient outsourced authentication for smartphones." IEEE Transactions on Information Forensics and Security, 11(11):2556-2571, Nov. 2016. [GvY+16].

Pierre-Alain Dupont, Julia Hesse, David Pointcheval, Leonid Reyzin and Sophia Yakoubov. "Fuzzy Password-Authenticated Key Exchange". 62 pages, Apr. 9, 2018. https://eprint.iacr.org/2017/1111 [Bake-13] [DHP+17] [DHP+18].

Ran Canetti, Benjamin Fuller, Omer Paneth, Leonid Reyzin, and Adam Smith. "Reusable fuzzy extractors for low-entropy distributions." In Marc Fischlin and Jean-Sebastien Coron, editors, Advances in Cryptology—Euro-Crypt 2016, Part I, vol. 9665 of Lecture Notes in Computer Science, pp. 1-27, Vienna, Austria, May 8-12, 2016. Springer, Heidelberg, Germany. https://doi.org/10.1007/978-3-662-49890-3_5 [CFP+16] [Bake-4].

Ran Canetti, Shai Halevi, Jonathan Katz, Yehuda Lindell, and Phil MacKenzie. "Universally composable password-based key exchange." In Ronald Cramer, editor, Advances in Cryptology—Eurocrypt 2005, vol. 3494 of Lecture Notes in Computer Science, 17 pages, May 22-26, 2005. Springer Berlin Heidelberg. [CHK+05a] [CHK+05b] [Bake-5].

Roberts et al., "Exclusive: Nearly 4 Million Bitcoins Lost Forever, New Study Says", 8 pages, Nov. 25, 2017, Fortune: http://fortune.com/2017/11/25/lost-bitcoins/ [002USP1-2].

Ronald Cramer, Ivan Damgård, and Ueli Maurer. "General secure multi-party computation from any linear secret-sharing scheme." In International Conference on the Theory and Applications of Cryptographic Techniques, pp. 321-339. Springer, 2000. [CDM00].

Samuel Mistretta. Does one password reset cost your company $7 or $70 every time? the password is . . . https://www.sparkhound.com/blog/does-one-password-reset-cost-your-company-7-or-70-every-time-the-password-is, 2 pages, accessed Sep. 15, 2019. [Mis].

Secret double octopus. 10 pages, retrieved Feb. 12, 2020. https://doubleoctopus.com/. [sdo].

Selim G Akl. "Digital signatures: a tutorial survey." Computer, (2):15-24, Feb. 1983. [Aki83].

Selim G. Akl and Peter D. Taylor. "Cryptographic solution to a problem of access control in a hierarchy." ACM Transactions on Computer Systems, 1(3):239-248, Aug. 1983. [AT83].

Shall Goldwasser, Silvio Micali, and Ronald L Rivest. "A digital signature scheme secure against adaptive chosen-message attacks." SIAM Journal on Computing, 17(2):281-308, 1988. [GMR88].

Shai Halevi and Hugo Krawczyk. "Public-key Cryptography and Password Protocols." ACM Trans. Inf. Syst. Secur. 2, 3, Feb. 2, 1999, 29 pages. https://doi.org/10.1145/322510.322514 [Bake-9].

Sophia Yakoubov. "A gentle introduction to Yao's garbled circuits." 12 pages, 2017, http://web.mit.edu/sonka89/www/papers/2017ygc.pdf. [Biometrics-10].

Sovrin Foundation. "Sovrin: A protocol and token for self-sovereign identity and decentralized trust." 42 pages, 2018. https://sovrin.org/wp-content/uploads/ Sovrin-Protocol-and-Token-White-Paper.pdf [Fou18].

Stanislaw Jarecki, Aggelos Kiayias, Hugo Krawczyk, and Jiayu Xu. "Toppss: Cost-minimal password-protected secret sharing based on threshold OPRF." In Dieter Gollmann, Atsuko Miyaji, and Hiroaki Kikuchi, editors, Applied Cryptography and Network Security, 39 pages, Cham, 2017. Springer International Publishing. [JKKX17].

Stanislaw Jarecki and Xiaomin Liu. 2009. "Efficient Oblivious Pseudorandom Function with Applications to Adaptive OT and Secure Computation of Set Intersection." In Theory of Cryptography, Omer Reingold (Ed.). Springer Berlin Heidelberg, Berlin, Heidelberg, 18 pages. [Bake-11] [Bake-12].

Stanislaw Jarecki, Aggelos Kiayias, and Hugo Krawczyk. "Round-optimal password-protected secret sharing and T-PAKE in the password-only model." In Palash Sarkar and Tetsu Iwata, editors, Advances in Cryptology—Asiacrypt 2014, 44 pages, Berlin, Heidelberg, 2014. Springer Berlin Heidelberg. [JKK14].

Stanislaw Jarecki, Hugo Krawczyk, and Jiayu Xu. 2018. "OPAQUE: An Asymmetric PAKE Protocol Secure Against Pre-computation Attacks." In Advances in Cryptology—Eurocrypt 2018, Jesper Buus Nielsen and Vincent Rijmen (Eds.). Springer International Publishing, Cham, 61 pages. [Bake-10].

Statista: https://www.statista.com/statistics/290525/cyber-crime-biggest-online-data-breaches-worldwide, 4 pages, retrieved Feb. 6, 2019. [002USP1-1].

Steven M. Bellovin and Michael Merritt. "Augmented encrypted key exchange: A password-based protocol secure against dictionary attacks and password file compromise." In V. Ashby, editor, ACM CCS 93: 1st Conference on Computer and Communications Security, 7 pages, Fairfax, Virginia, USA, Nov. 3-5, 1993. ACM Press. https://doi.org/10.1145/168588.168618 [BM93a] [BM93b] [Bake-2].

Steven M. Bellovin and Michael Merritt. "Encrypted key exchange: Password-based protocols secure against dictionary attacks." In 1992 IEEE Symposium on Security and Privacy, 7 pages. IEEE Computer Society Press, May 1992, pp. 72-84. [BM92a] [BM92b].

Sumit Saha. "A comprehensive guide to convolutional neural networks." 9 pages, Dec. 15, 2018. https://towardsdatascience.com/a-

(56) References Cited

OTHER PUBLICATIONS comprehensive-guide-to-convolutional-neural-networks-the-eli5-way-3bd2b1164a53. [Biometrics-8].

Taher ElGamal. "A public key cryptosystem and a signature scheme based on discrete logarithms." IEEE transactions on information theory, 31(4), pp. 10-18, 1985. [EIG85].

Torben Pryds Pedersen. "Non-interactive and information-theoretic secure verifiable secret sharing." In Annual International Cryptology Conference, pp. 129-140. Springer, 1991. [Ped91] [Technical Overview-8] [Biometrics-7].

Trezor. 14 pages, retrieved on Feb. 12, 2020. https://Trezor.io. [tre].

Wenliang Du and Mikhail J. Atallah. "Secure multi-party computation problems and their applications: a review and open problems." In Proceedings of the 2001 workshop on New security paradigms, 10 page. ACM, 2001. [DA01].

Xavier Boyen. "Reusable cryptographic fuzzy extractors." Cryptology ePrint Archive, Report 2004/358, 2004, 27 pages. http://eprint.iacr.org/2004/358. [Boy04] [Bake-3].

Yevgeniy Dodis, Leonid Reyzin, and Adam Smith. 2004. "Fuzzy Extractors: How to Generate Strong Keys from Biometrics and Other Noisy Data." In Advances in Cryptology—Eurocrypt 2004, vol. 3027 of Lecture Notes in Computer Science. Springer, Heidelberg, Germany, Interlaken, Switzerland, 18 pages. https://doi.org/10.1007/978-3-540-24676-3_31 [Bake-6] [DRS04].

Yubikey. 6 pages, retrieved Feb. 12, 2020. https://www.yubico.com/. [yub].

Yunhua Wen and Shengli Liu. Reusable fuzzy extractor from LWE. In Willy Susilo and Guomin Yang, editors, ACISP 18: 23rd Australasian Conference on Information Security and Privacy, vol. 10946 of Lecture Notes in Computer Science, pp. 13-27, Wollongong, NSW, Australia, Jul. 11-13, 2018. Springer, Heidelberg, Germany. [WL18].

Zoom. 35 pages, retrieved Feb. 13, 2020. https://www.zoomlogin.com/. [zoo].

\* cited by examiner

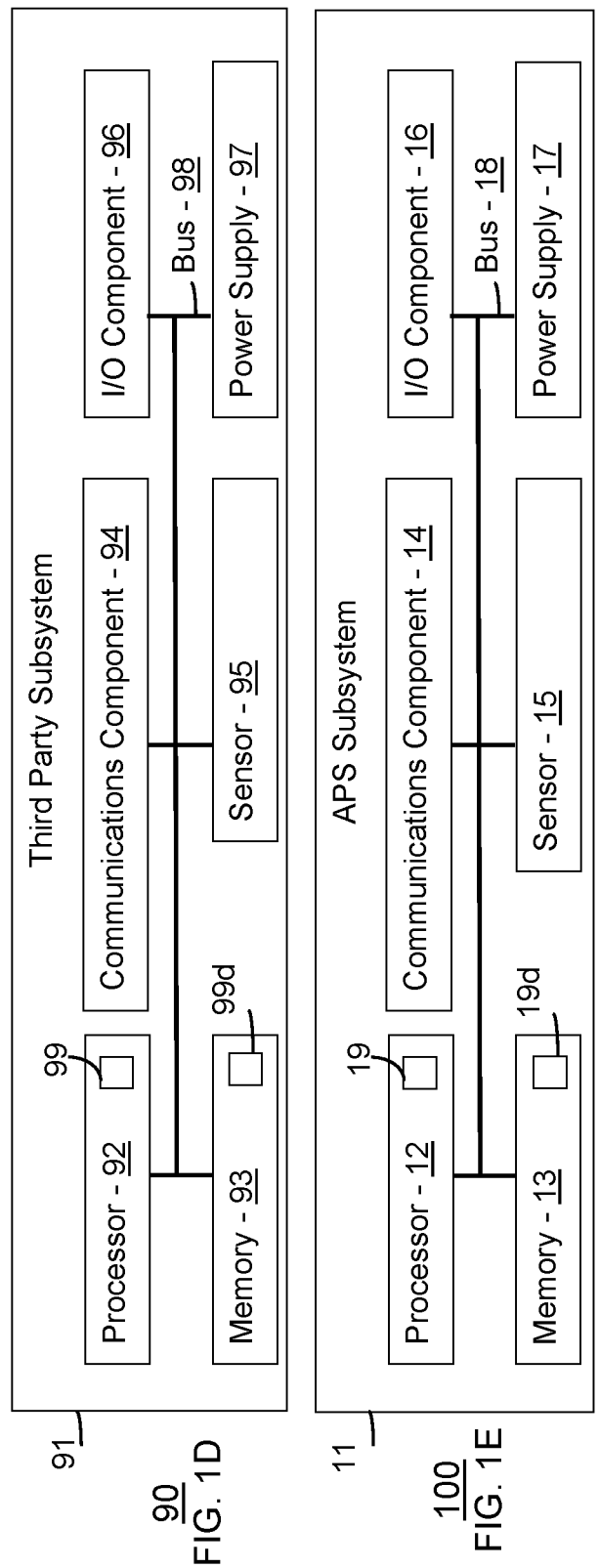

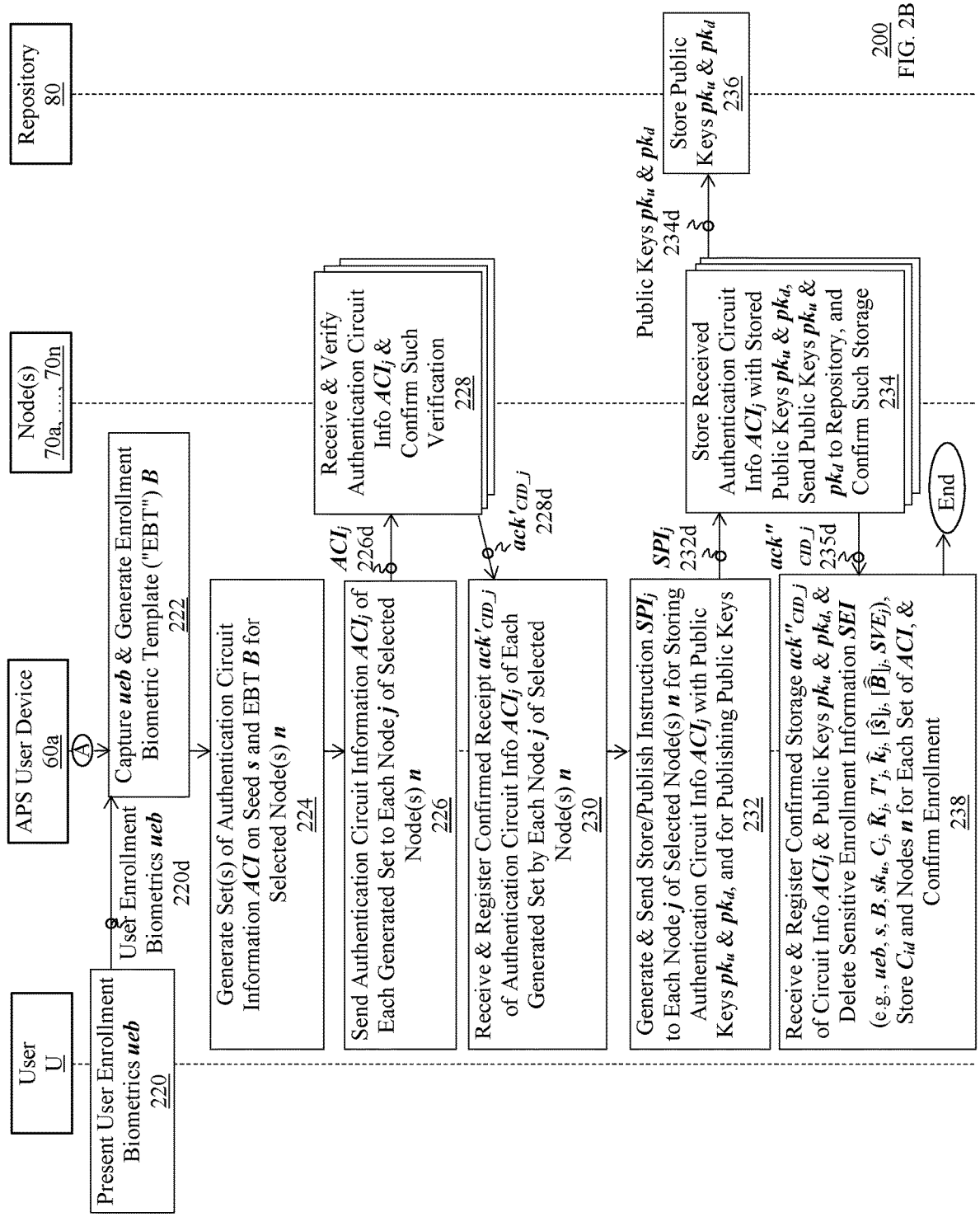

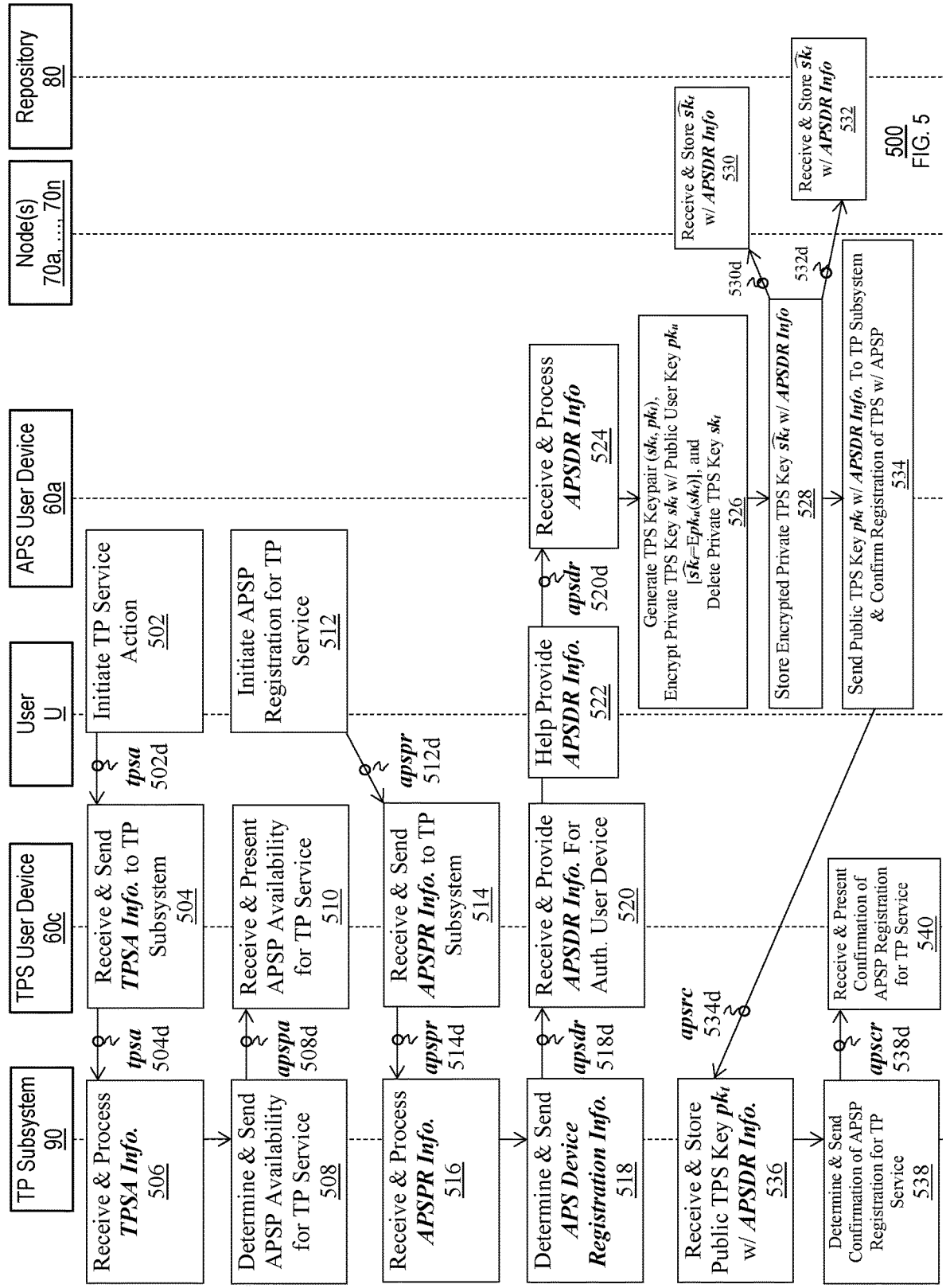

700p (Device 60c)

700q (Device 60c)

800

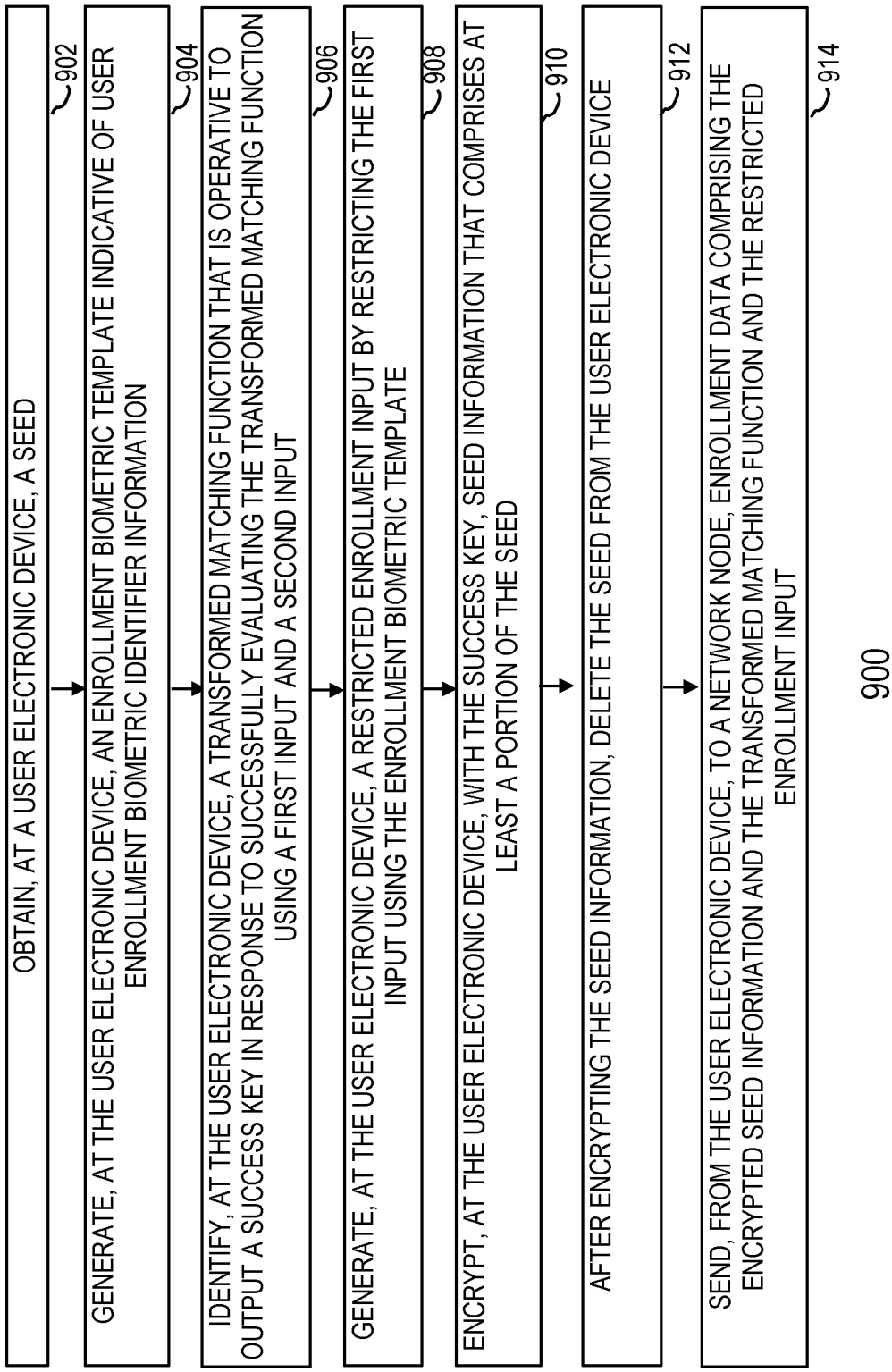

AUTHENTICATION PROCESSING SERVICE

CROSS-REFERENCE TO RELATED APPLICATION(S)

This application claims the benefit of prior filed U.S. Provisional Patent Application No. 62/802,854, filed Feb. 8, 2019 and of prior filed U.S. Provisional Patent Application No. 62/862,454, filed Jun. 17, 2019, each of which is hereby incorporated by reference herein in its entirety.

COPYRIGHT NOTICE

At least a portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

This disclosure relates to an authentication processing service and, more particularly, to a decentralized biometric authentication processing service using secure multi-party computation for enabling a secure operation.

BACKGROUND OF THE DISCLOSURE

Authenticating a user often requires the storage of a user's security details on a storage system that may be vulnerable to attack, thereby threatening the authentication process.

SUMMARY OF THE DISCLOSURE

This document describes systems, methods, and computer-readable media for providing an authentication processing service.

For example, a method for authenticating a user of at least a first user electronic device and a second user electronic device using a network node is provided. The method may include receiving, at the network node, from the first user electronic device, at a first moment in time, communication protocol information that includes a restricted enrollment input corresponding to an unrestricted enrollment input that has been restricted by an enrollment biometric template indicative of user enrollment biometrics captured at an enrollment moment in time that is prior to the first moment in time, an unrestricted authentication input, and a transformed matching function that is operative to output a success key in response to successfully evaluating the transformed matching function using two inputs, receiving, at the network node, from the second user electronic device, at a second moment in time after the first moment in time, a restricted authentication input corresponding to the unrestricted authentication input that has been restricted by an authentication biometric sample indicative of user authentication biometrics captured at an authentication moment in time that is after the first moment in time but that is prior to the second moment in time, after the receiving the restricted authentication input, evaluating, at the network node, the transformed matching function using the restricted enrollment input and the restricted authentication input, and, when the evaluating is successful, using, at the network node, the success key output by the transformed matching function to enable a secure operation.

As yet another example, a method for authenticating a user of a user electronic device using a network node is provided. The method may include obtaining, at the user electronic device, a seed, generating, at the user electronic device, an enrollment biometric template indicative of user enrollment biometric identifier information, identifying, at the user electronic device, a transformed matching function that is operative to output a success key in response to successfully evaluating the transformed matching function using a first input and a second input, generating, at the user electronic device, a restricted enrollment input by restricting the first input using the enrollment biometric template, encrypting, at the user electronic device, with the success key, seed information that includes at least a portion of the seed, after the encrypting, deleting the seed from the user electronic device, and sending, from the user electronic device, to the network node, enrollment data comprising the encrypted seed information and the transformed matching function and the restricted enrollment input.

As yet another example, a non-transitory computer-readable storage medium storing at least one program is provided, the at least one program including instructions, which, when executed by at least one processor of an electronic subsystem, may cause the at least one processor to receive, from a user electronic device, a restricted enrollment input corresponding to an unrestricted enrollment input that has been restricted by an enrollment biometric template indicative of user enrollment biometrics captured at an enrollment moment in time, receive, from the user electronic device, a restricted authentication input corresponding to an unrestricted authentication input that has been restricted by an authentication biometric sample indicative of user authentication biometrics captured at an authentication moment in time after the enrollment moment in time, receive, from the user electronic device, a transformed matching function that is operative to output a success key in response to successfully evaluating the transformed matching function using two inputs, evaluate the received transformed matching function using the received restricted enrollment input and the received restricted authentication input, and, when the evaluation is successful, use the success key output by the transformed matching function to enable a secure operation.

This Summary is provided to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 1D is a more detailed schematic view of a third party subsystem of the system of FIG. 1;

FIG. 1E is a more detailed schematic view of an authentication processing service subsystem of the system of FIG. 1;

FIGS. 2A and 2B illustrate a flowchart of an exemplary process for enrolling a user device and a user thereof with an APS platform;

FIG. 5 illustrates a flowchart of an exemplary process for registering a third party service with an enrolled APS user of an enrolled APS user device;

FIGS. 8 and 9 illustrate flowcharts of other exemplary processes for using an authentication processing service.

DETAILED DESCRIPTION OF THE DISCLOSURE

Systems, methods, and computer-readable media for providing an authentication processing service are provided.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, the terms "computer," "personal computer," "device," and "computing device" may refer to any programmable computer system that is known or that will be developed in the future. In certain embodiments, a computer will be coupled to a network, such as described herein. A computer system may be configured with processor-executable software instructions to perform the processes described herein. Such computing devices may be mobile devices, such as a mobile telephone, data assistant, tablet computer, or other such mobile device. Alternatively, such computing devices may not be mobile (e.g., in at least certain use cases), such as in the case of server computers, desktop computing systems, or systems integrated with non-mobile components.

As used herein, the terms "component," "module," and "system," are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

Figure 1:
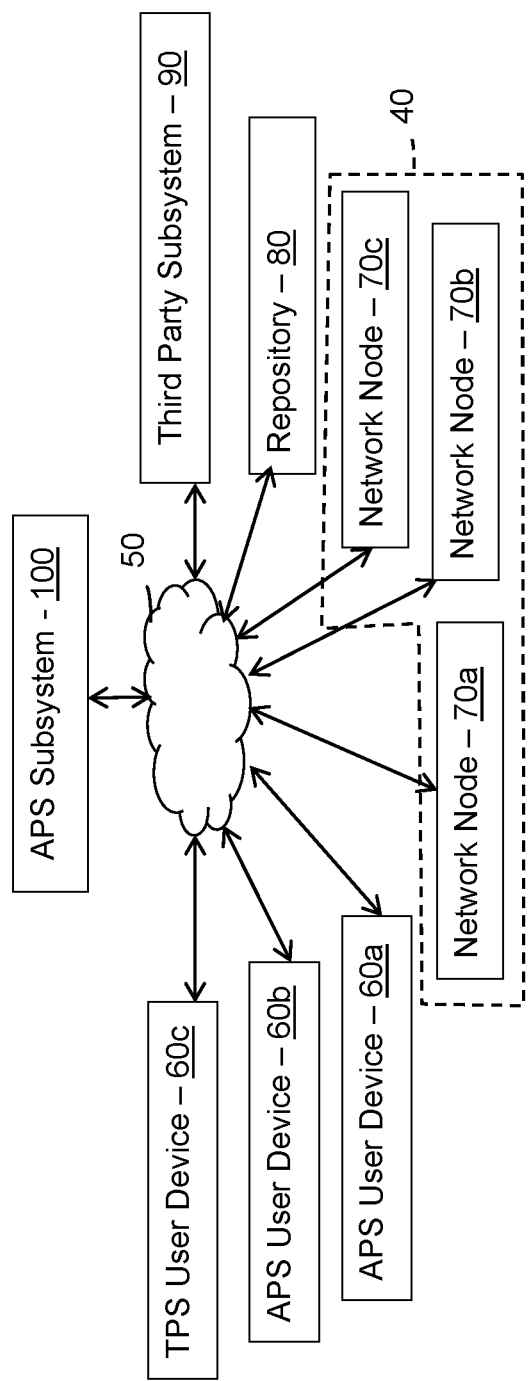
FIG. 1 is a schematic view of an illustrative system for providing an authentication processing service of the disclosure.
Figures 1A, 1B, 1C:
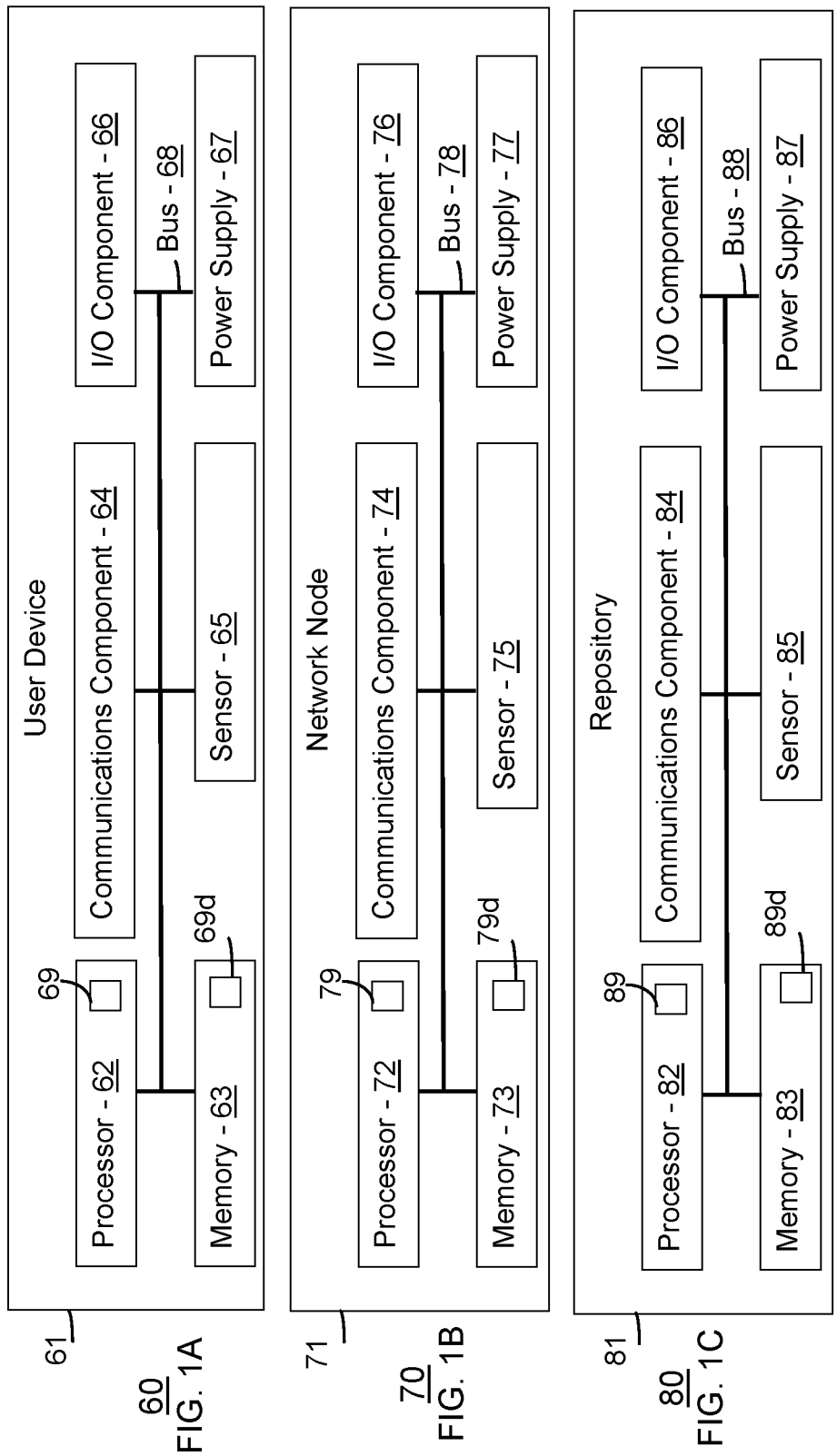
FIG. 1A is a more detailed schematic view of a user device of the system of FIG. 1.
FIG. 1B is a more detailed schematic view of a network node of the system of FIG. 1.
FIG. 1C is a more detailed schematic view of a repository of the system of FIG. 1.
Figure 1F:
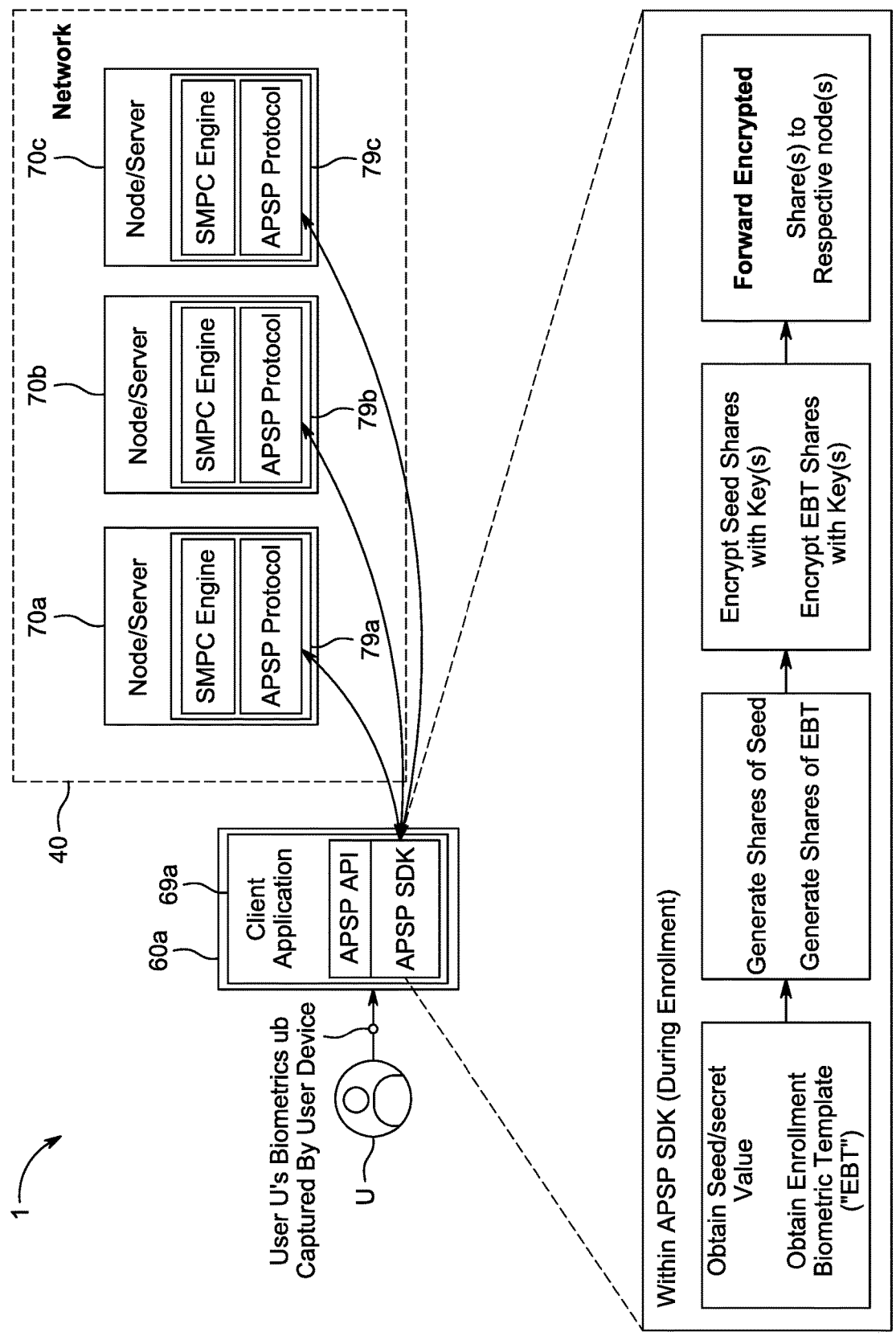
FIG. 1F is a more detailed schematic view of a portion of the system of FIG. 1.
Figure 2A:
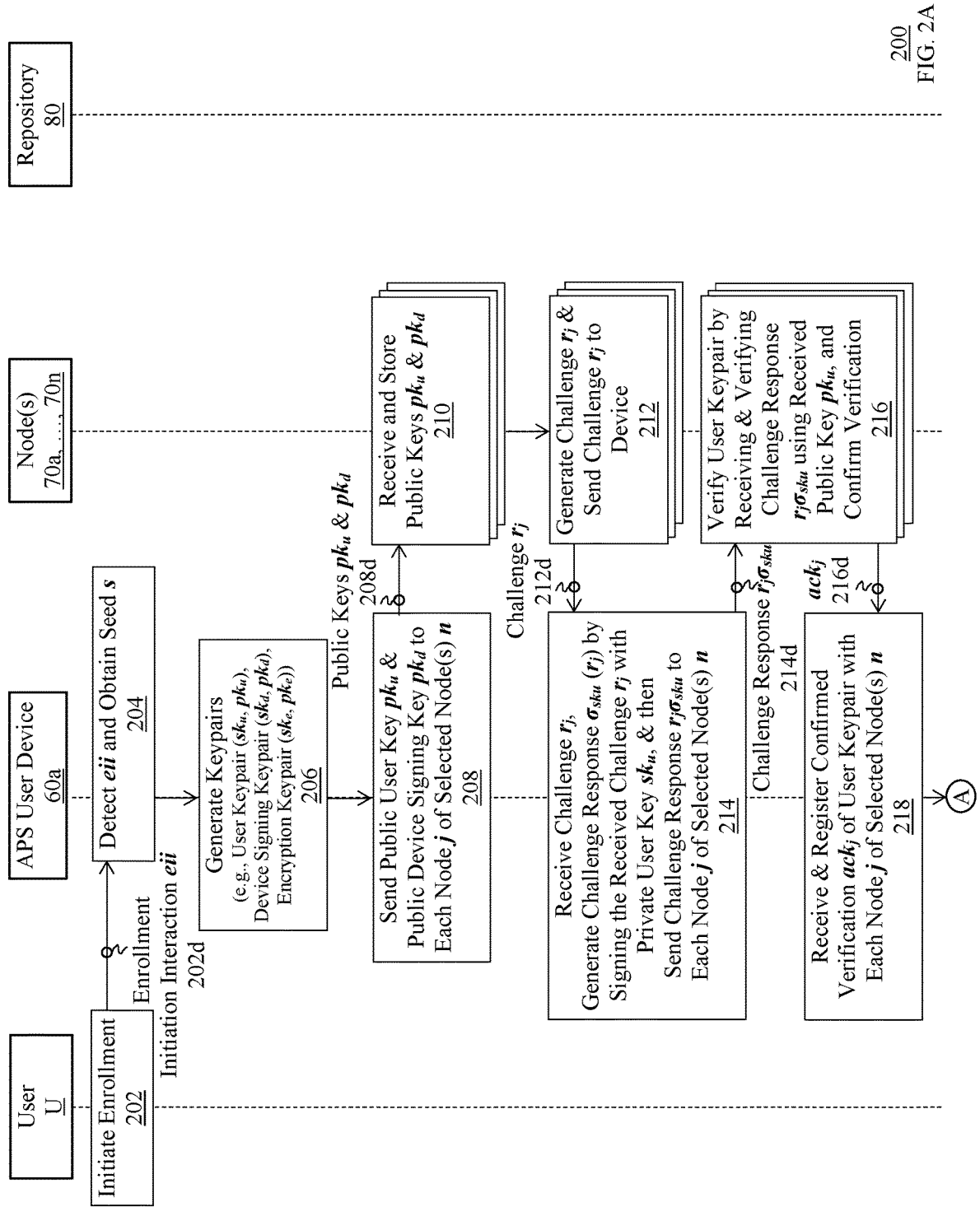
Figure 3:
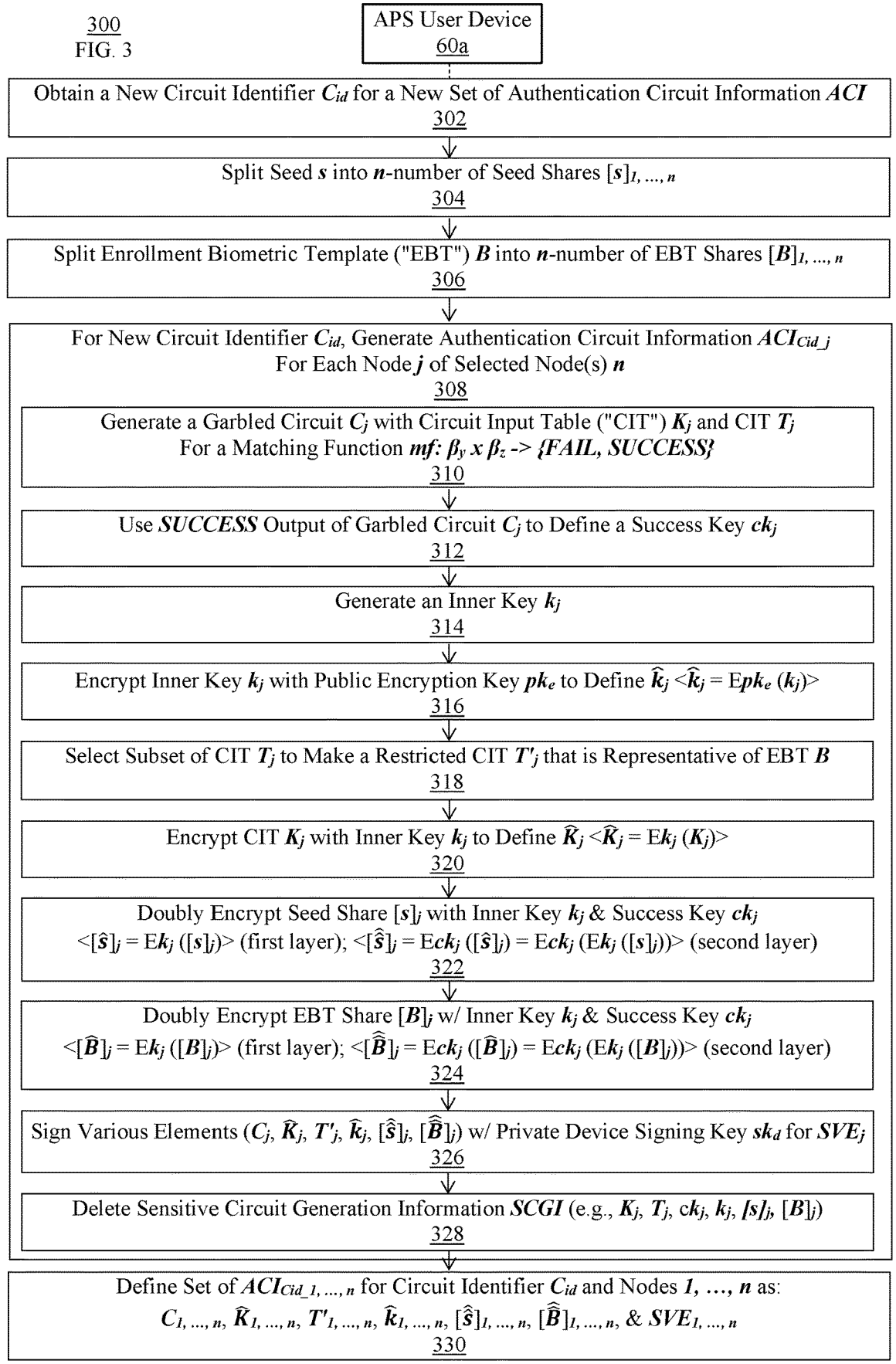
FIG. 3 illustrates a flowchart of an exemplary process for generating one or more sets of authentication circuit information for a set of network nodes using secure multi-party computation.
Figure 4A:
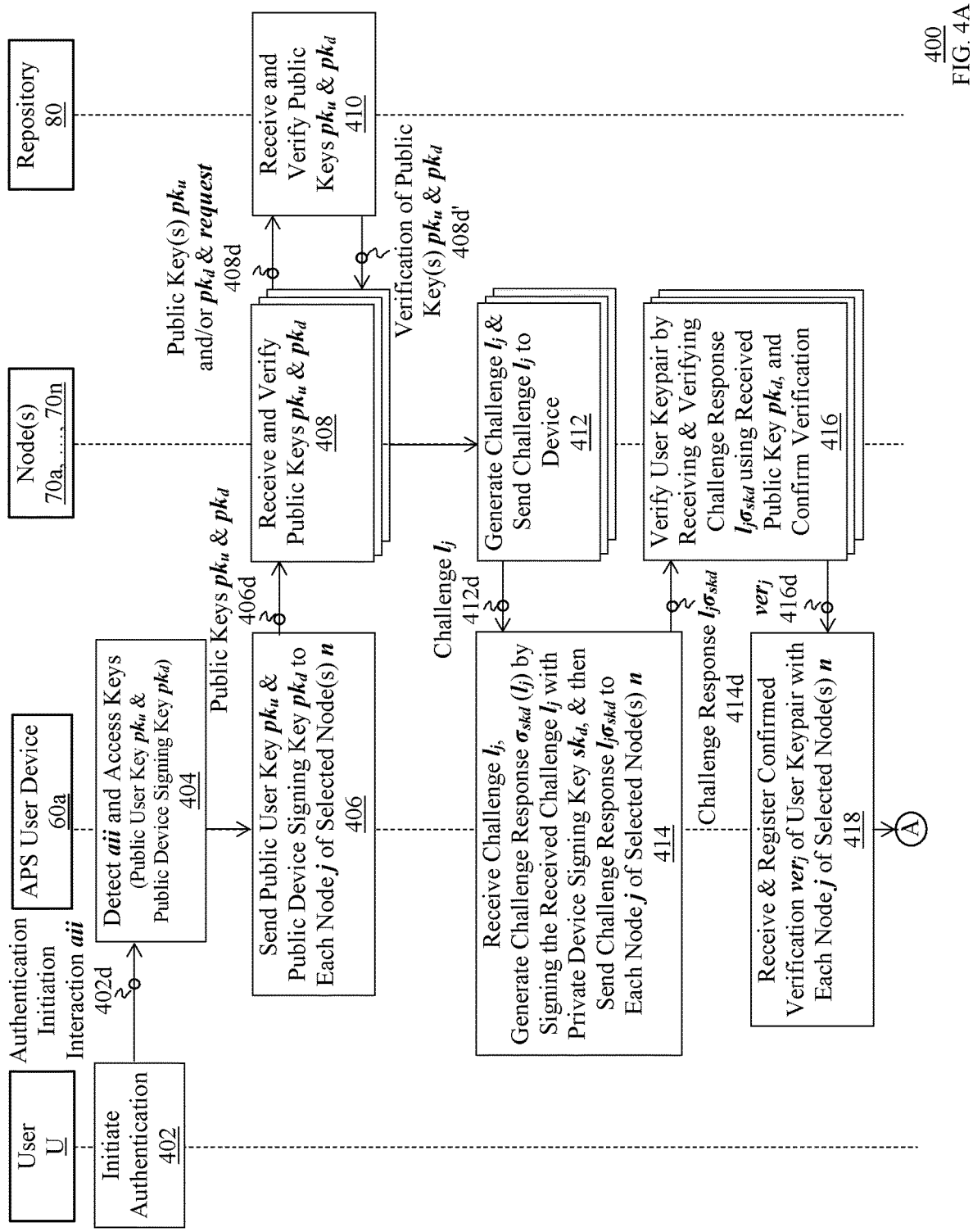
FIGS. 4A, 4B, and 4C illustrate a flowchart of an exemplary process for authenticating an enrolled APS user of an enrolled APS user device with the APS platform.
Figure 4B:
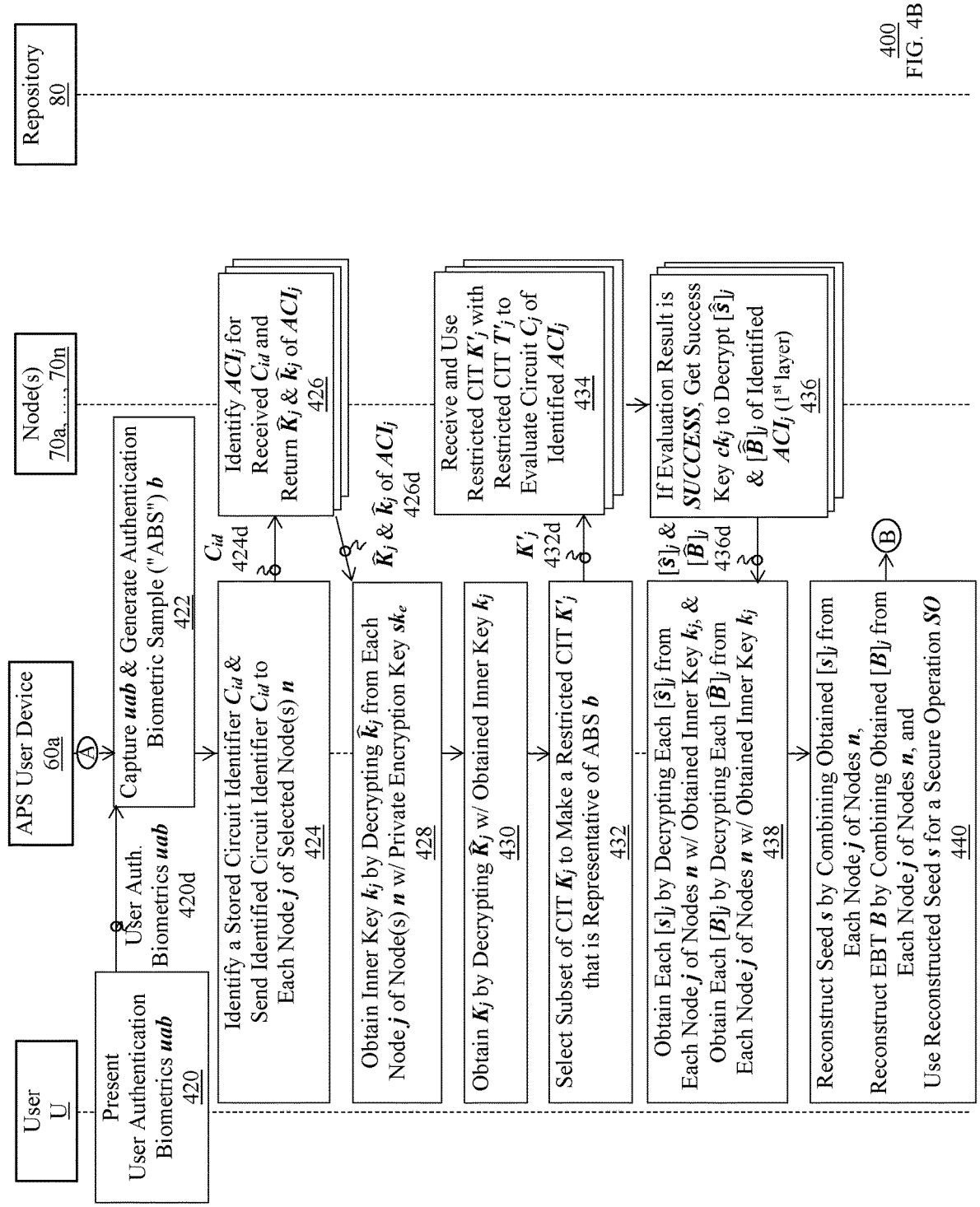
Figure 4C:
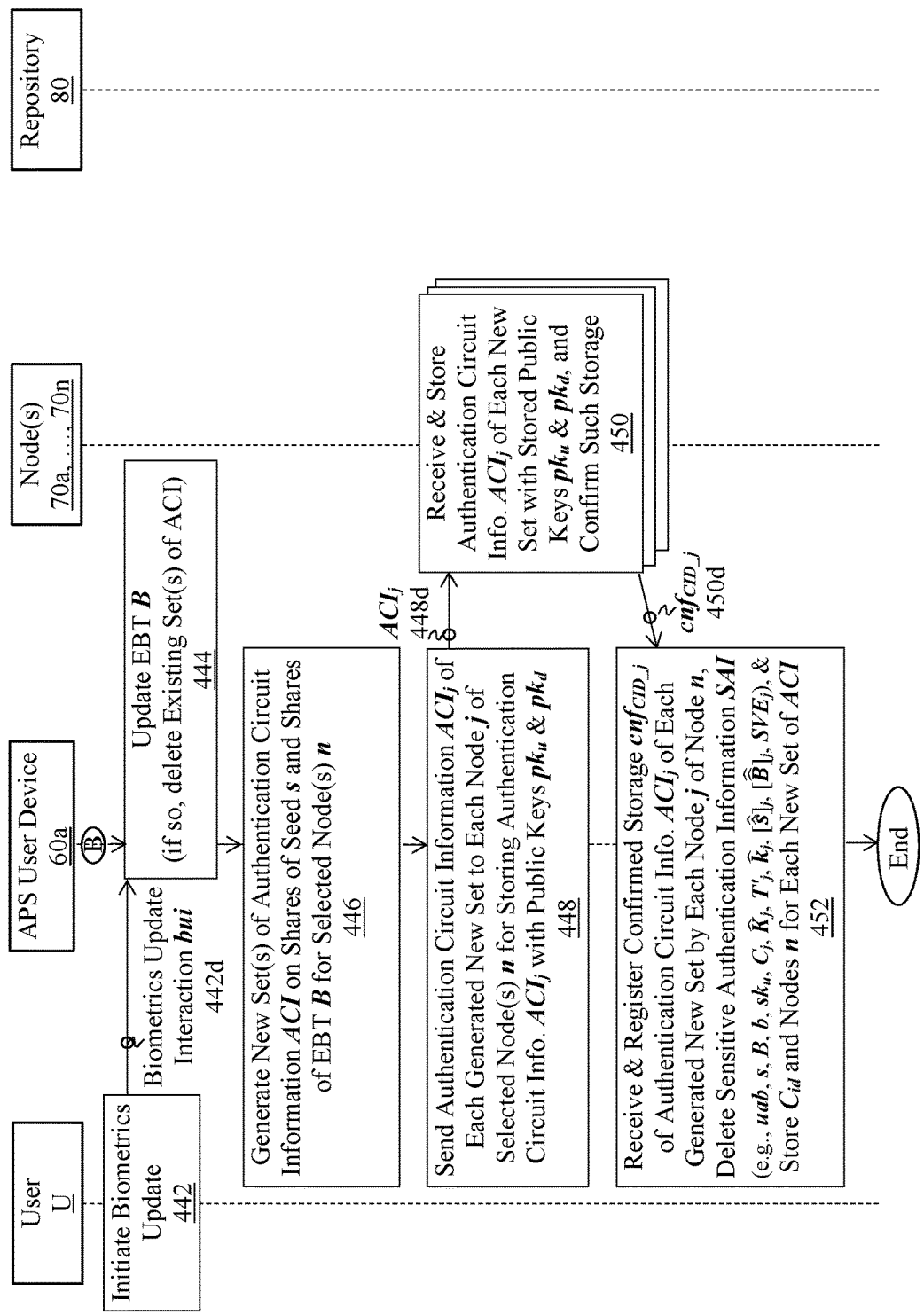
Figure 6:
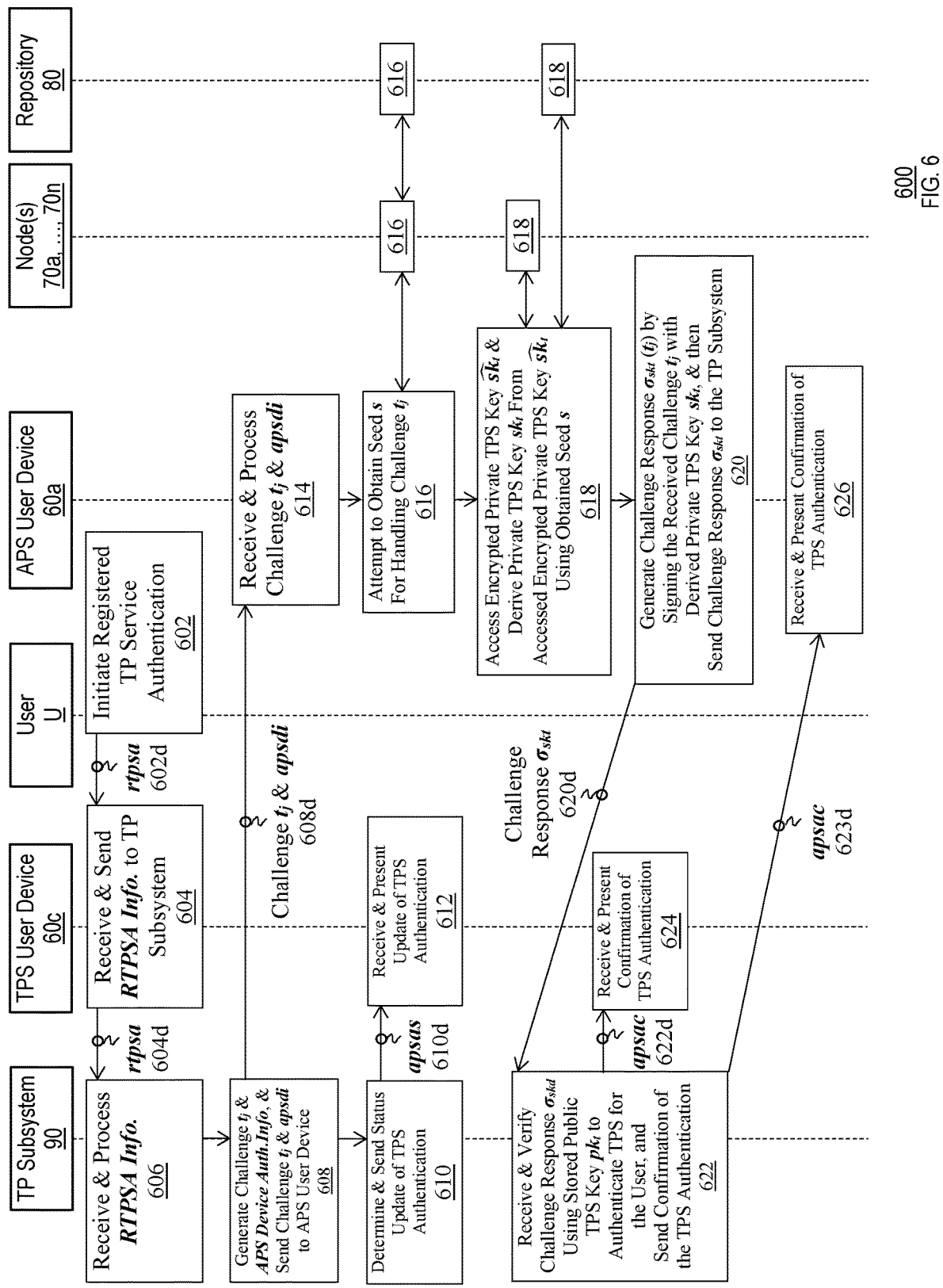
FIG. 6 illustrates a flowchart of an exemplary process for authenticating an enrolled APS user of an enrolled APS user device with a registered third party service using the APS platform.
Figure 7C:
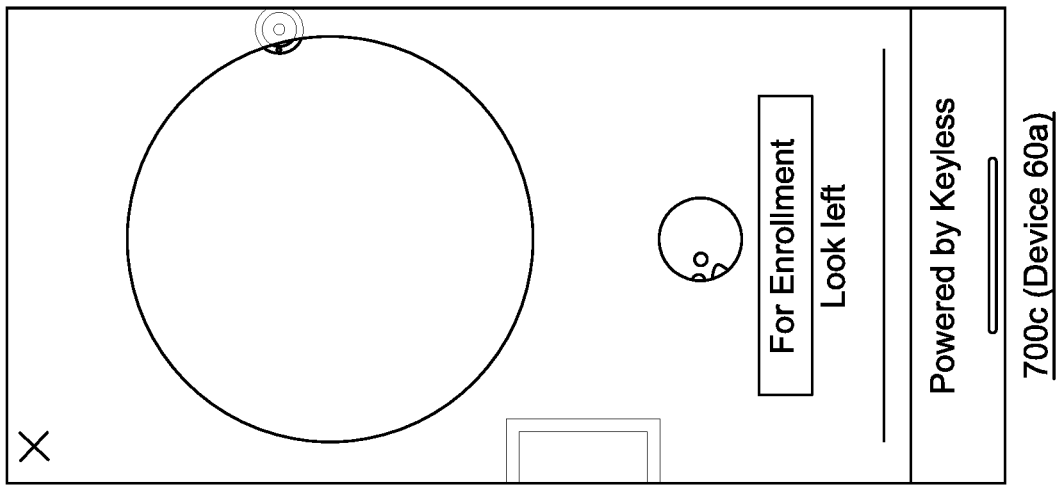
FIGS. 7A, 7B, 7C, 7D, 7E, 7F, 7G, 7H, 7I, 7J, 7K, 7L, 7M, 7N, 7O, 7P, 7Q, 7R, 7S, 7T, 7U, 7V, and 7W illustrate exemplary screens of graphical user interfaces ("UIs") of one or more user devices carrying out the processes of FIGS. 2A-6.
Figure 7B:
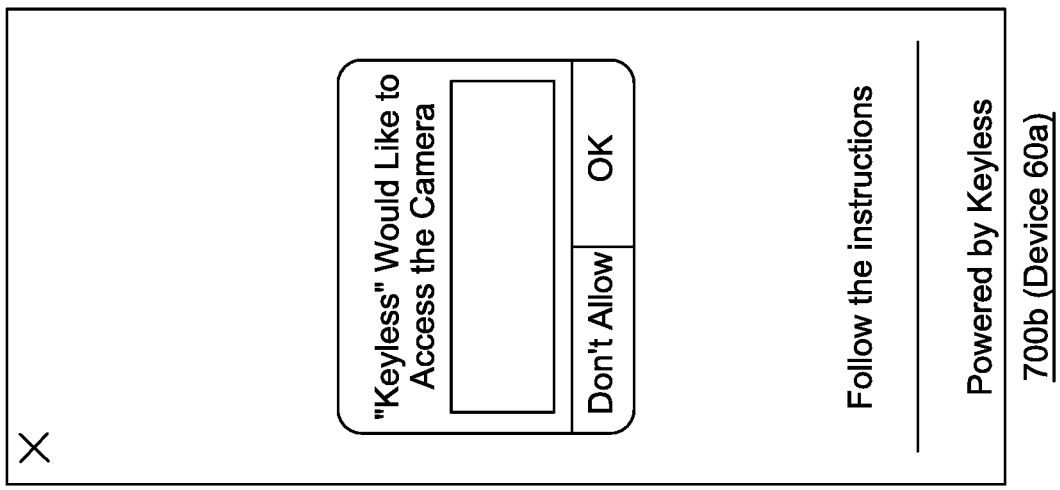
Figure 7A:
Figure 7F:
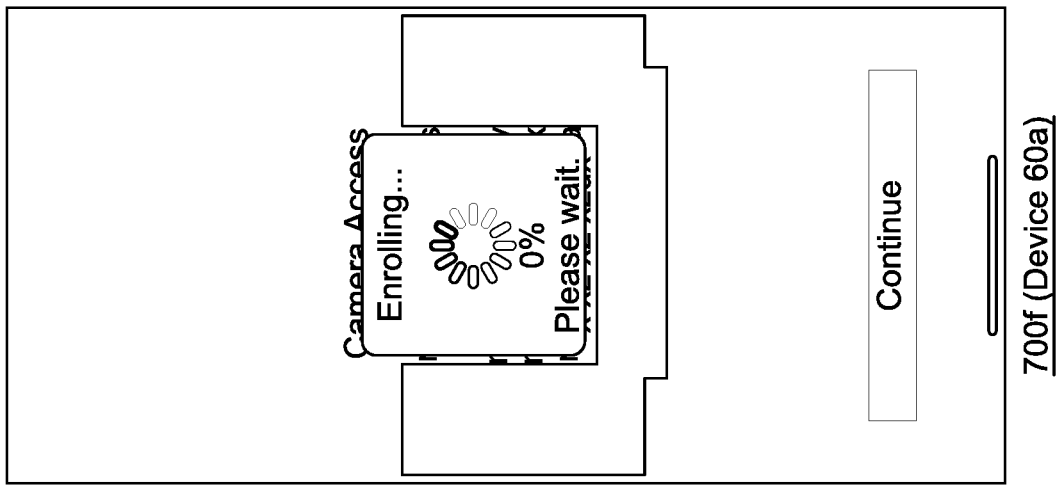
Figure 7E:
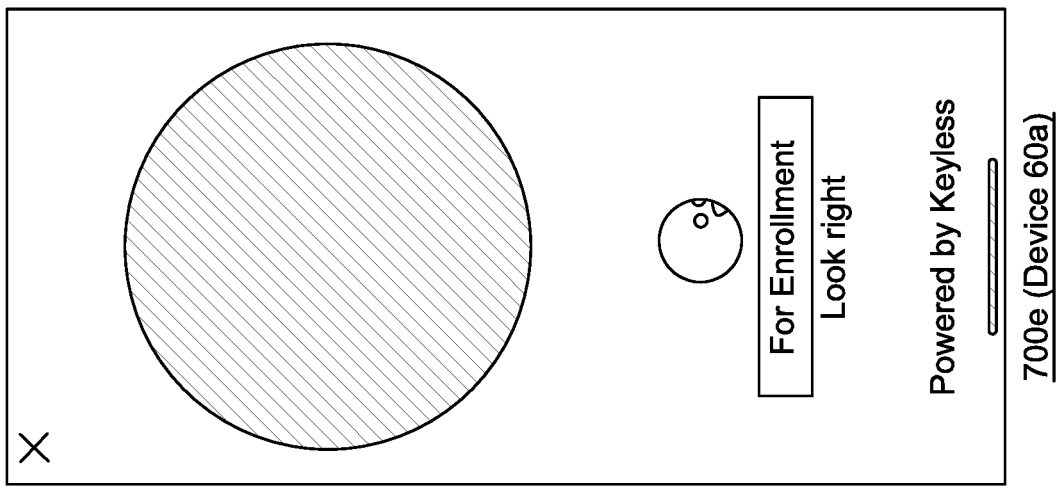
Figure 7D:
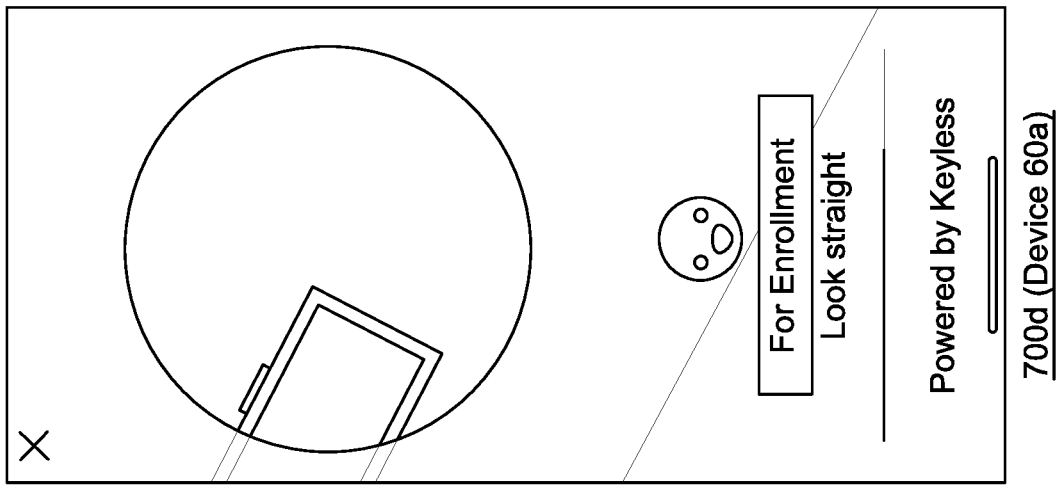
Figure 7I:
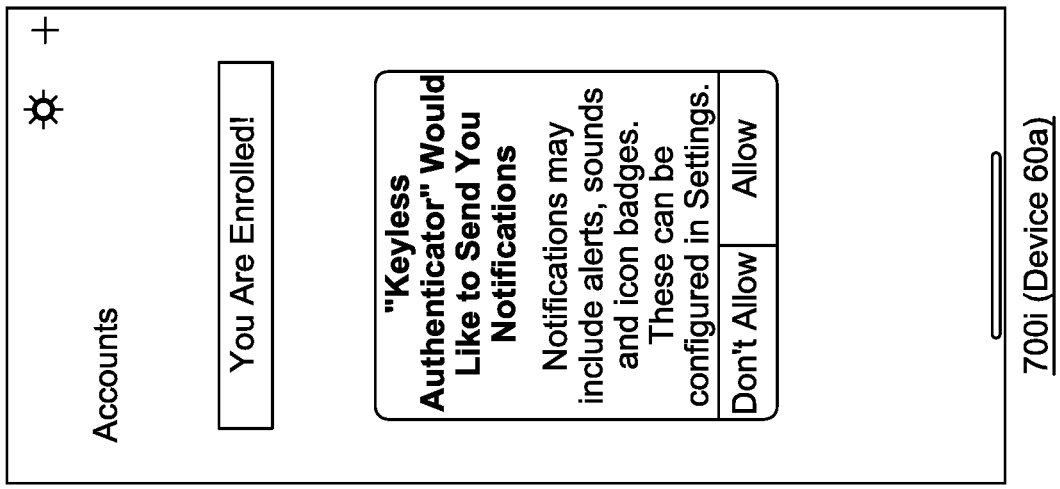
Figure 7H:
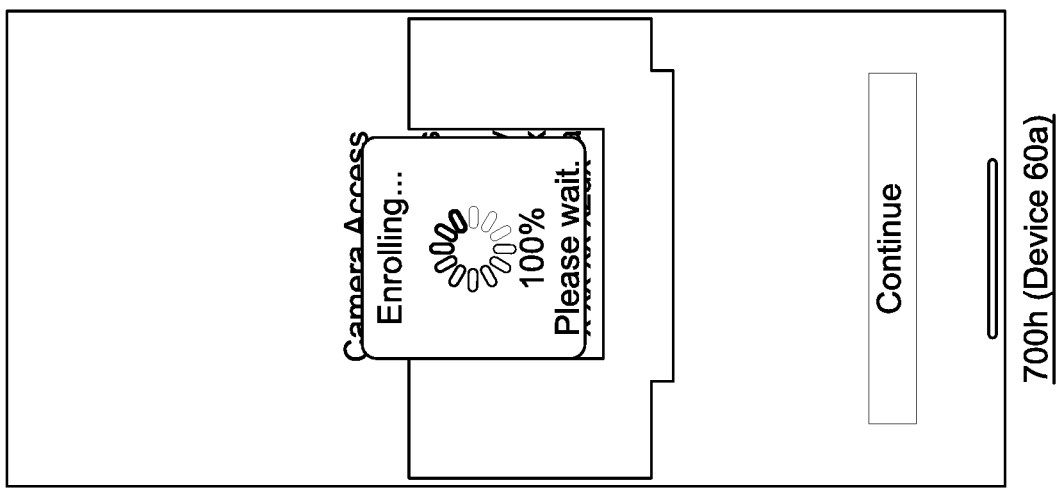
Figure 7G:
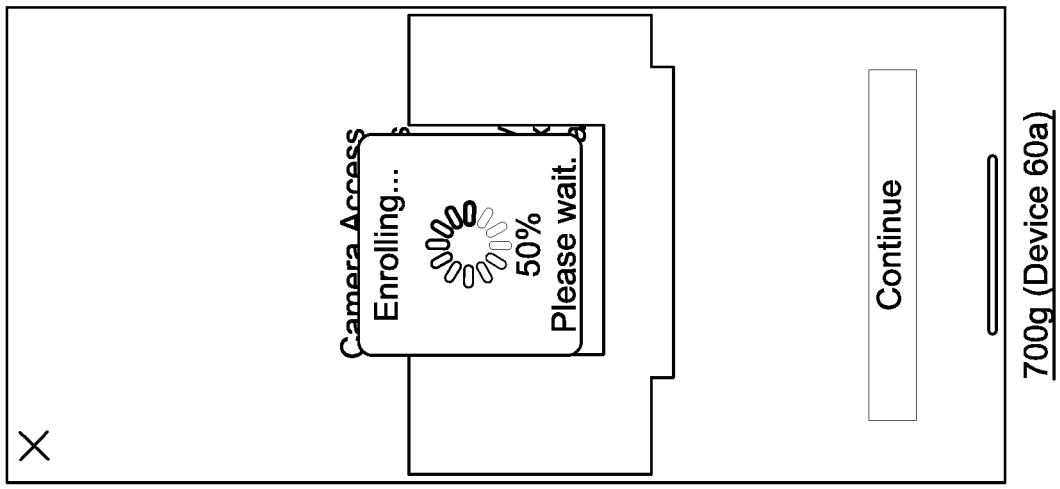
Figure 7J:
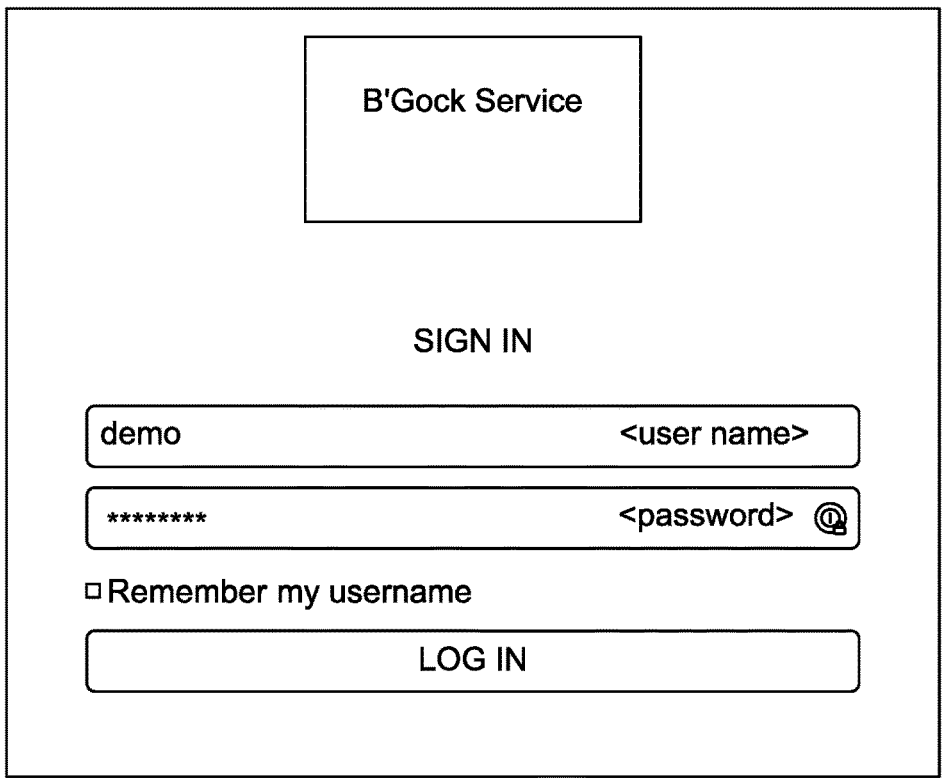
Figure 7K:
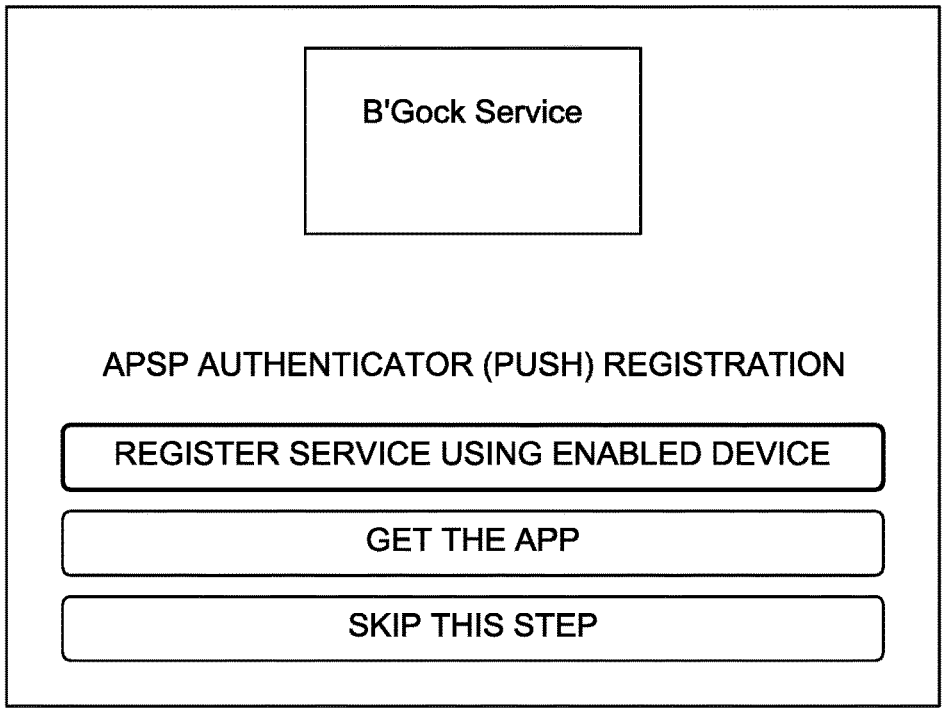
Figure 7L:
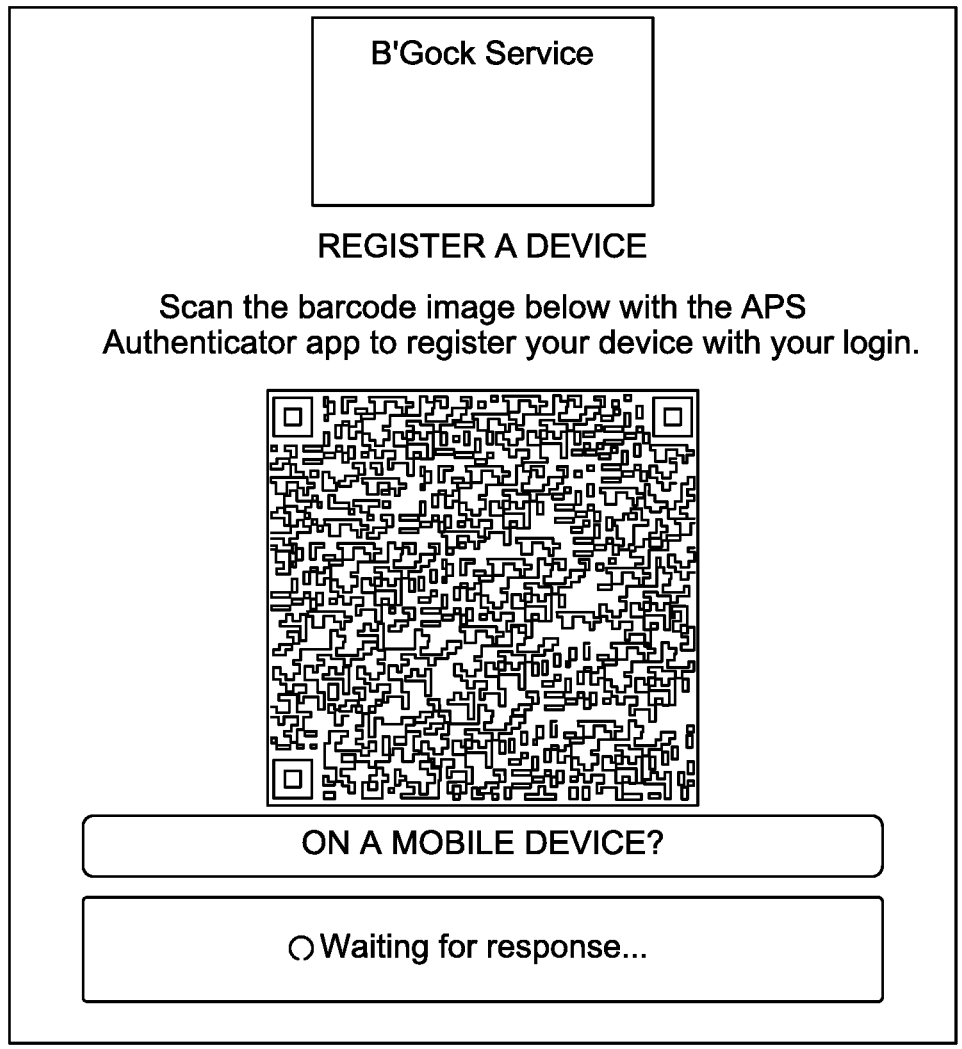
Figure 7O:
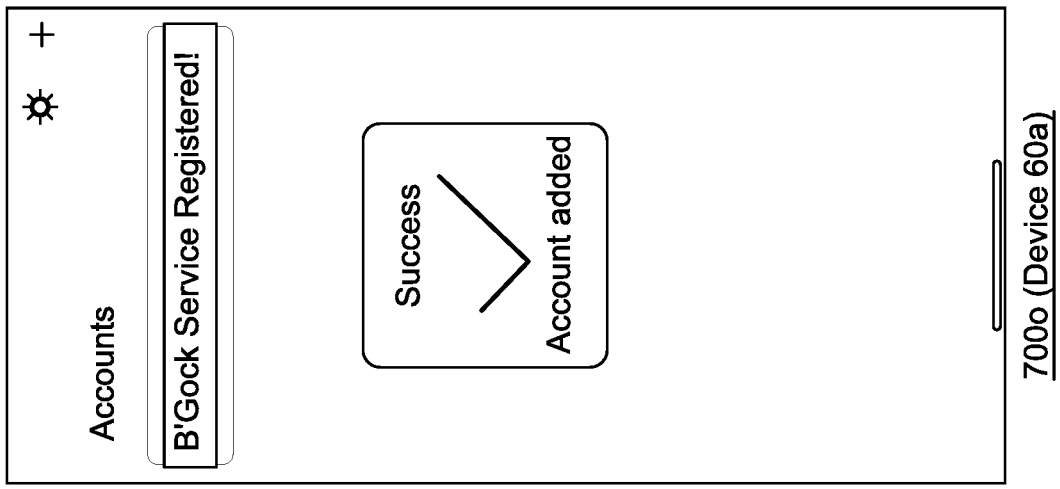
Figure 7N:
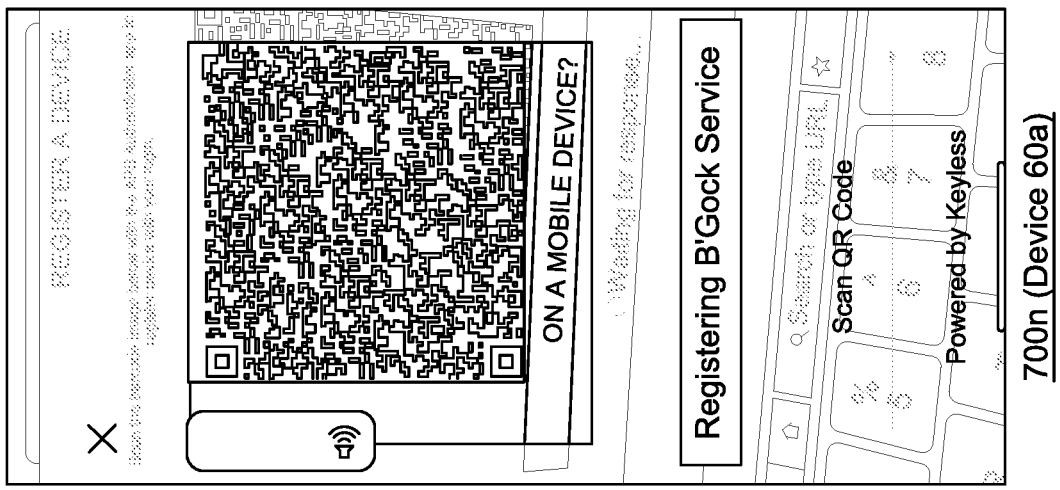
Figure 7M:
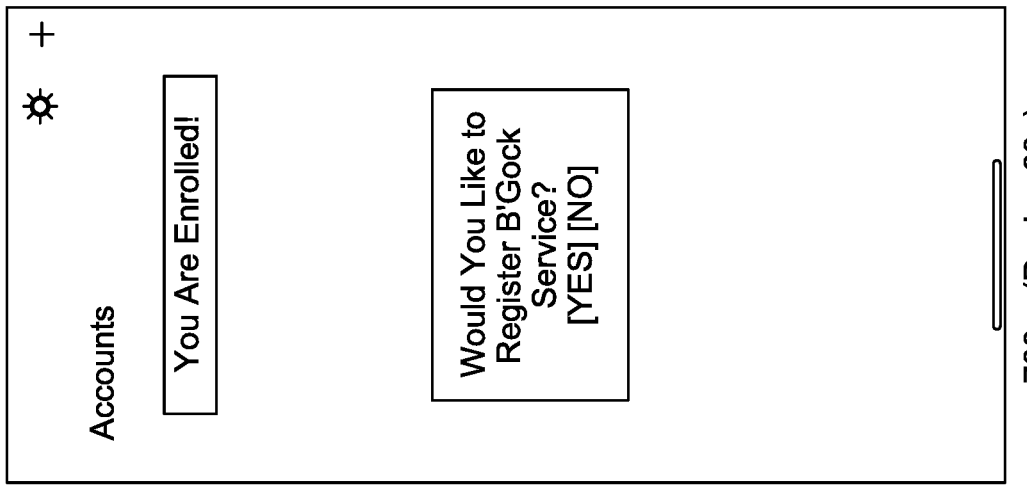
Figure 7P:
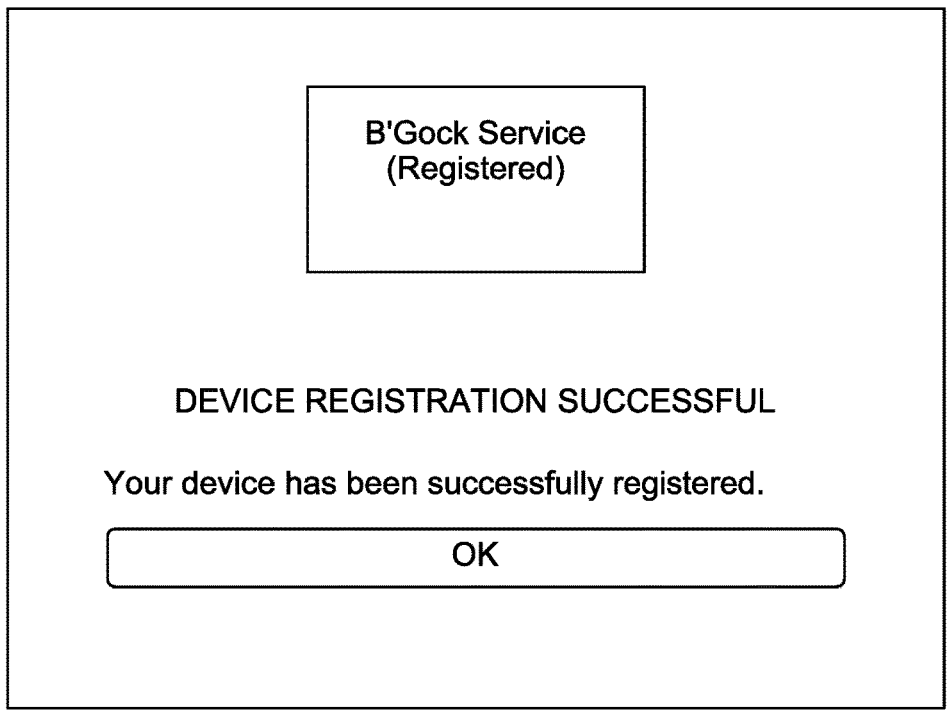
Figure 7Q:
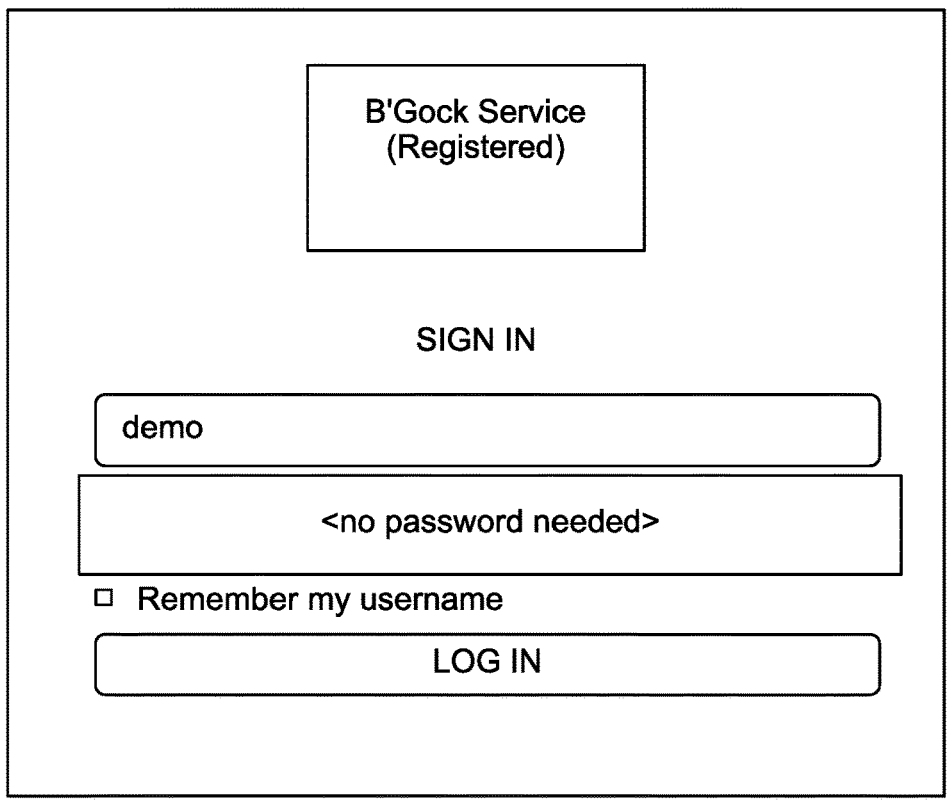
Figure 7R:
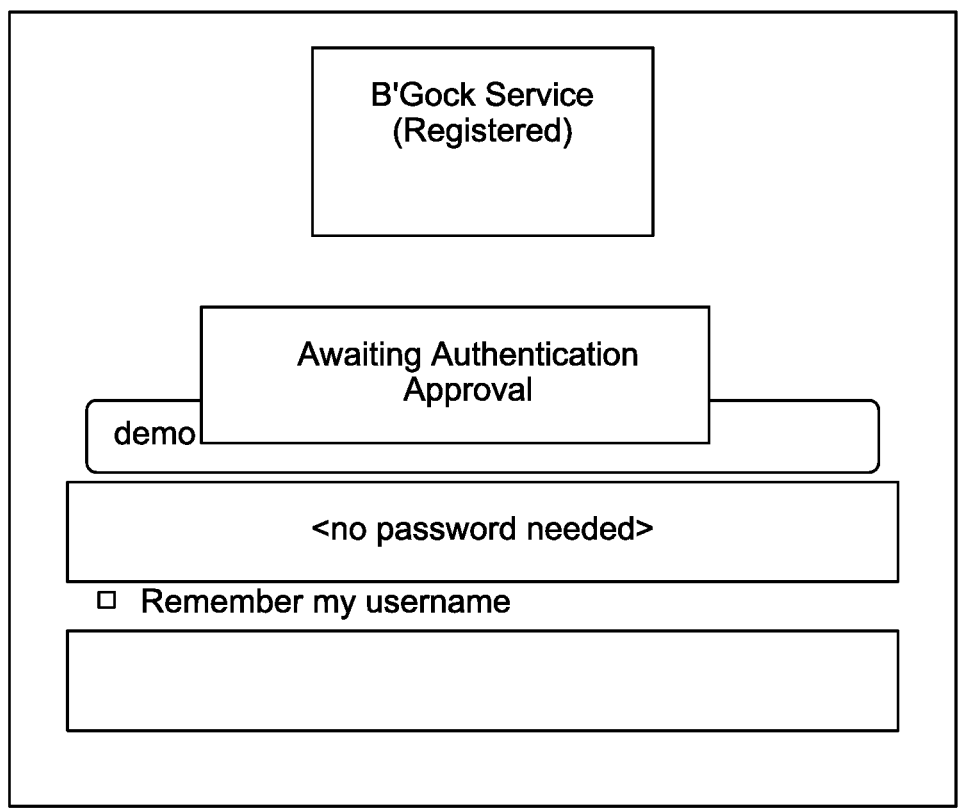
Figure 7U:
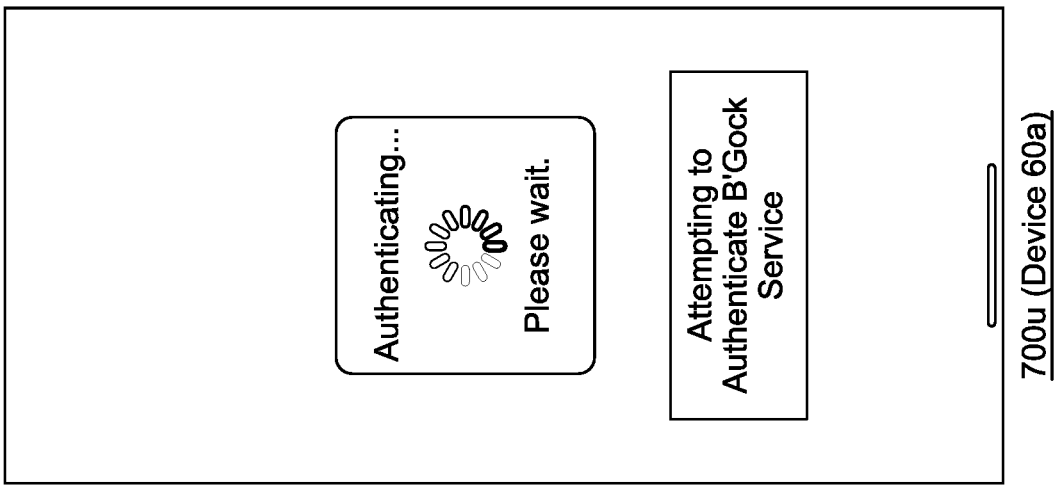
Figure 7T:
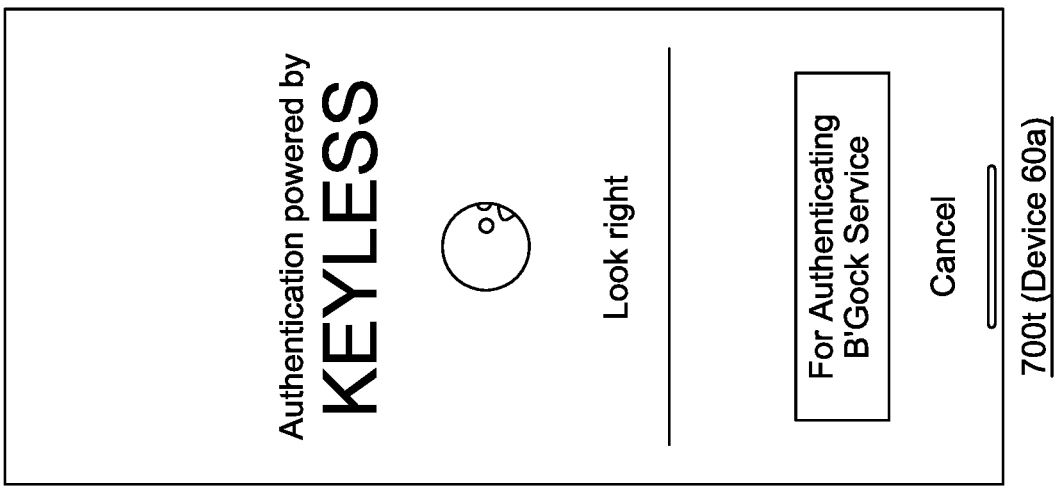
Figure 7S:
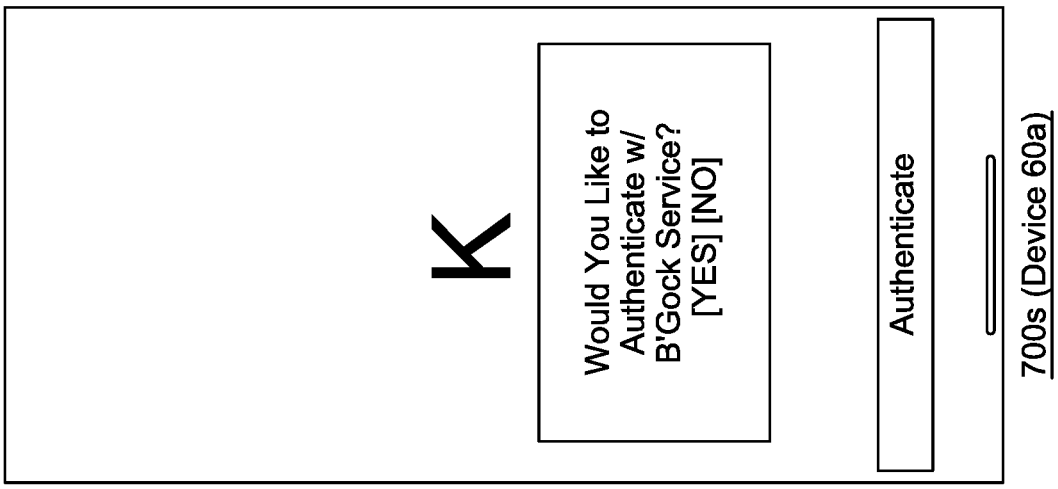
Figure 7W:
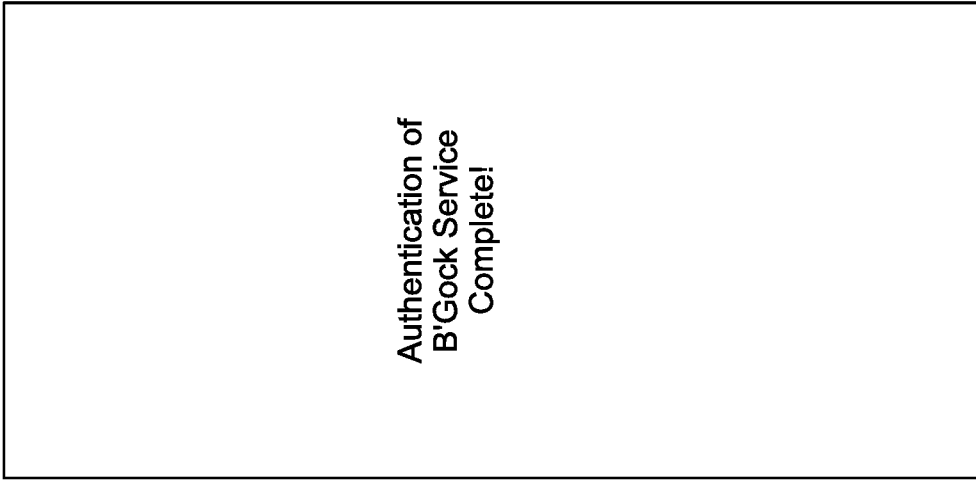
Figure 7V:
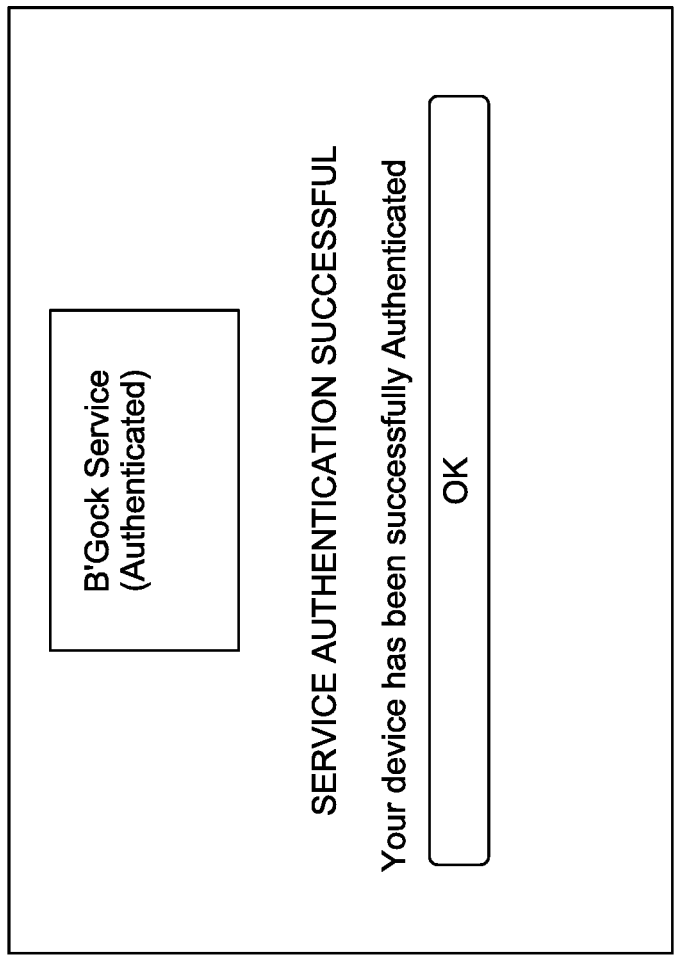

FIG. 1 shows a system 1 in which an authentication processing service ("APS") may be facilitated amongst various user devices 60 (e.g., one or more APS user devices (e.g., APS user devices 60a and 60b) and/or one or more third party service ("TPS") user devices (e.g., TPS user device 60c)), various network servers or network nodes 70, a repository 80, a third party subsystem 90, and an APS subsystem 100, FIG. 1A shows further details with respect to a particular embodiment of a user device 60 of system 1, FIG. 1B shows further details with respect to a particular embodiment of a network node 70 of system 1, FIG. 1C shows further details with respect to a particular embodiment of a repository 80 of system 1, FIG. 1D shows further details with respect to a particular embodiment of a third party subsystem 90 of system 1, FIG. 1E shows further details with respect to a particular embodiment of an APS subsystem 10 of system 1, FIG. 1F shows further details with respect to a particular embodiment of a portion of system 1, FIGS. 2A and 2B illustrate a flowchart of an exemplary process for enrolling a user device 60 and a user thereof with an APS platform, FIG. 3 illustrates a flowchart of an exemplary process for generating one or more sets of authentication circuit information for a set of network nodes 70 using secure multi-party computation, FIGS. 4A-4C illustrate a flowchart of an exemplary process for authenticating an enrolled APS user of an enrolled APS user device 60 with the APS platform, FIG. 5 illustrates a flowchart of an exemplary process for registering a third party service of third party subsystem 90 with an enrolled APS user of an enrolled APS user device 60, FIG. 6 illustrates a flowchart of an exemplary process for authenticating an enrolled APS user of an enrolled APS user device 60 with a registered third party service of third party subsystem 90 using the APS platform, FIGS. 7A-7W illustrate exemplary screens of graphical user interfaces ("UIs") of one or more user devices 60 carrying out the processes of FIGS. 2A-6, and FIGS. 8 and 9 illustrate flowcharts of other exemplary processes for using an authentication processing service.

FIGS. 1-1F

FIG. 1 is a schematic view of an illustrative system 1 in which authentication processing may be facilitated utilizing a user device and one or more network nodes. For example, as shown in FIG. 1, system 1 may include an authentication processing service ("APS") subsystem 100, one or more user devices 60 (e.g., user devices 60a-60c), one or more network nodes 70 (e.g., network nodes 70a-70c), at least one repository 80, and at least one third party subsystem 90, and at least one communications network 50 through which APS subsystem 100 and at least one user device 60 and/or at least one network node 70 and/or at least one repository 80 and/or at least one third party enabler subsystem 90 may communicate.

As shown in FIG. 1A, and as described in more detail below, a user device 60 (e.g., one, some, or each of devices 60a-60c of FIG. 1) may include a processor component 62, a memory component 63, a communications component 64, a sensor 65, an input/output ("I/O") component 66, a power supply component 67, a housing 61, and/or a bus 68 that may provide one or more wired or wireless communication links or paths for transferring data and/or power to, from, or between various other components of user device 60. In some embodiments, one or more components of user device 60 may be combined or omitted. Moreover, user device 60 may include other components not combined or included in FIG. 1A and/or several instances of the components shown in FIG. 1A. For the sake of simplicity, only one of each of the components of user device 60 is shown in FIG. 1A. I/O component 66 may include at least one input component (e.g., button, mouse, keyboard, etc.) to receive information from a user and/or at least one output component (e.g., audio speaker, video display, haptic component, etc.) to provide information to a user, such as a touch screen that may receive input information through a user's touch of a display screen and that may also provide visual information to a user via that same display screen. Memory 63 may include one or more storage mediums, including for example, a hard-drive, flash memory, permanent memory such as read-only memory ("ROM"), semi-permanent memory such as random access memory ("RAM"), any other suitable type of storage component, or any combination thereof (e.g., for storing data (e.g., user APSP data 69d)). Communications component 64 may be provided to allow user device 60 to communicate with one or more other user devices 60 and/or network nodes 70 and/or repository 80 and/or third party subsystem 90 and/or APS subsystem 100 using any suitable communications protocol (e.g., via communications network 50). Communications component 64 can be operative to create or connect to a communications network (e.g., network 50). Communications component 64 can provide wireless communications using any suitable short-range or long-range communications protocol, such as Wi-Fi (e.g., an 802.11 protocol), Bluetooth, radio frequency systems (e.g., 1200 MHz, 2.4 GHz, and 5.6 GHz communication systems), near field communication ("NFC"), infrared, protocols used by wireless and cellular telephones and personal e-mail devices, or any other protocol supporting wireless communications.

Communications component 64 can also be operative to connect to a wired communications network or directly to another data source wirelessly or via one or more wired connections. Communications component 64 may be a network interface that may include the mechanical, electrical, and/or signaling circuitry for communicating data over physical links that may be coupled to network 50. Such network interface(s) may be configured to transmit and/or receive any suitable data using a variety of different communication protocols, including, but not limited to, TCP/IP, UDP, ATM, synchronous optical networks ("SONET"), any suitable wireless protocols, Frame Relay, Ethernet, Fiber Distributed Data Interface ("FDDI"), and/or the like. In some embodiments, one, some, or each of such network interfaces may be configured to implement one or more virtual network interfaces, such as for Virtual Private Network ("VPN") access.

Sensor 65 may be any suitable sensor that may be configured to sense any suitable data for user device 60 (e.g., location-based data via a GPS sensor system, motion data, environmental data, biometric data, etc.). Sensor 65 may be a sensor assembly that may include any suitable sensor or any suitable combination of sensors operative to detect movements of user device 60 and/or of a user thereof and/or any other characteristics of user device 60 and/or of its environment (e.g., physical activity or other characteristics of a user of user device 60, light content of the device environment, gas pollution content of the device environment, noise pollution content of the device environment, altitude of the device, etc.). Sensor 65 may include any suitable sensor(s), including, but not limited to, one or more of a GPS sensor, wireless communication sensor, accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like. Sensor 65 may include any suitable sensor components or subassemblies for detecting any suitable movement of user device 60 and/or of a user thereof. For example, sensor 65 may include one or more three-axis acceleration motion sensors (e.g., an accelerometer) that may be operative to detect linear acceleration in three directions (i.e., the x- or left/right direction, the y- or up/down direction, and the z- or forward/backward direction). As another example, sensor 65 may include one or more single-axis or two-axis acceleration motion sensors that may be operative to detect linear acceleration only along each of the x- or left/right direction and the y- or up/down direction, or along any other pair of directions. In some embodiments, sensor 65 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). Sensor 65 may be operative to directly or indirectly detect rotation, rotational movement, angular displacement, tilt, position, orientation, motion along a non-linear (e.g., arcuate) path, or any other non-linear motions. Additionally or alternatively, sensor 65 may include one or more angular rate, inertial, and/or gyro-motion sensors or gyroscopes for detecting rotational movement. For example, sensor 65 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by sensor 65 for detecting motion on user device 60, such as any suitable pressure sensors, altimeters, or the like. Using sensor 65, user device 60 may be configured to determine a velocity, acceleration, orientation, and/or any other suitable motion attribute of user device 60. Sensor 65 may include any suitable sensor components or subassemblies for detecting any suitable biometric data and/or health data and/or sleep data and/or mindfulness data and/or the like of a user of user device 60. For example, sensor 65 may include any suitable biometric sensor that may include, but is not limited to, one or more facial recognition sensors, fingerprint scanners, iris scanners, retinal scanners, voice recognition sensors, gait sensors, hair sensors, hand geometry sensors, signature scanners, keystroke dynamics sensors, vein matching sensors, heart beat sensors, body temperature sensors, odor or scent sensors, behavioral biometric sensors (e.g., user behavioral modeling of movement, orientation, gesture, pausality, etc.), DNA sensors, sensors for any unclonable or extremely difficult to replicate personal function, and/or any other suitable sensors for detecting any suitable metrics related to any suitable characteristics of a user, which may also include health-related optical sensors, capacitive sensors, thermal sensors, electric field ("eField") sensors, and/or ultrasound sensors, such as photoplethysmogram ("PPG") sensors, electrocardiography ("ECG") sensors, galvanic skin response ("GSR") sensors, posture sensors, stress sensors, photoplethysmogram sensors, and/or the like. These sensors can generate data providing health-related information associated with the user. For example, PPG sensors can provide information regarding a user's respiratory rate, blood pressure, and/or oxygen saturation. ECG sensors can provide information regarding a user's heartbeats. GSR sensors can provide information regarding a user's skin moisture, which may be indicative of sweating and can prioritize a thermostat application to determine a user's body temperature. One or more biometric sensors may be multi-modal biometric sensors and/or operative to detect long-lived biometrics, modern liveness (e.g., active, passive, etc.) biometric detection, and/or the like. Sensor 65 may include a microphone, camera, scanner (e.g., a barcode scanner or any other suitable scanner that may obtain product identifying information from a code, such as a linear barcode, a matrix barcode (e.g., a quick response ("QR") code), or the like), proximity sensor, light detector, temperature sensor, motion sensor, biometric sensor (e.g., a fingerprint reader or other feature (e.g., facial) recognition sensor, which may operate in conjunction with a feature-processing application that may be accessible to user device 60 for attempting to authenticate a user), line-in connector for data and/or power, and/or combinations thereof. In some examples, each sensor can be a separate device, while, in other examples, any combination of two or more of the sensors can be included within a single device. For example, a gyroscope, accelerometer, photoplethysmogram, galvanic skin response sensor, and temperature sensor can be included within a wearable electronic device, such as a smart watch, while a scale, blood pressure cuff, blood glucose monitor, SpO2 sensor, respiration sensor, posture sensor, stress sensor, and asthma inhaler can each be separate devices. While specific examples are provided, it should be appreciated that other sensors can be used and other combinations of sensors can be combined into a single device. Using one or more of these sensors, user device 60 can determine physiological characteristics of the user while performing a detected activity, such as a heart rate of a user associated with the detected activity, average body temperature of a user detected during the detected activity, any normal or abnormal physical conditions associated with the detected activity, or the like. In some examples, a GPS sensor or any other suitable location detection component(s) of user device 60 can be used to determine a user's location (e.g., geo-location and/or address and/or location type (e.g., library, school, office, zoo, etc.)) and movement, as well as a displacement of the user's motion. An accelerometer, directional sensor, and/or gyroscope can further generate activity data that can be used to determine whether a user of user device 60 is engaging in an activity, is inactive, or is performing a gesture. Any suitable activity of a user may be tracked by sensor 65, including, but not limited to, steps taken, flights of stairs climbed, calories burned, distance walked, distance run, minutes of exercise performed and exercise quality, time of sleep and sleep quality, nutritional intake (e.g., foods ingested and their nutritional value), mindfulness activities and quantity and quality thereof (e.g., reading efficiency, data retention efficiency), any suitable work accomplishments of any suitable type (e.g., as may be sensed or logged by user input information indicative of such accomplishments), and/or the like. User device 60 can further include a timer that can be used, for example, to add time dimensions to various attributes of the detected physical activity, such as a duration of a user's physical activity or inactivity, time(s) of a day when the activity is detected or not detected, and/or the like. Sensor 65 may include any suitable sensor components or subassemblies for detecting any suitable characteristics of any suitable condition of the lighting of the environment of user device 60. For example, sensor 65 may include any suitable light sensor that may include, but is not limited to, one or more ambient visible light color sensors, illuminance ambient light level sensors, ultraviolet ("UV") index and/or UV radiation ambient light sensors, and/or the like. Any suitable light sensor or combination of light sensors may be provided for determining the illuminance or light level of ambient light in the environment of user device 60 (e.g., in lux or lumens per square meter, etc.) and/or for determining the ambient color or white point chromaticity of ambient light in the environment of user device 60 (e.g., in hue and colorfulness or in x/y parameters with respect to an x-y chromaticity space, etc.) and/or for determining the UV index or UV radiation in the environment of user device 60 (e.g., in UV index units, etc.). A suitable light sensor may include, for example, a photodiode, a phototransistor, an integrated photodiode and amplifier, or any other suitable photo-sensitive device. In some embodiments, more than one light sensor may be integrated into user device 60. Sensor 65 may include any suitable sensor components or subassemblies for detecting any suitable characteristics of any suitable condition of the air quality of the environment of user device 60. For example, sensor 65 may include any suitable air quality sensor that may include, but is not limited to, one or more ambient air flow or air velocity meters, ambient oxygen level sensors, volatile organic compound ("VOC") sensors, ambient humidity sensors, ambient temperature sensors, and/or the like. Any suitable ambient air sensor or combination of ambient air sensors may be provided for determining the oxygen level of the ambient air in the environment of user device 60 (e.g., in $O_2$% per liter, etc.) and/or for determining the air velocity of the ambient air in the environment of user device 60 (e.g., in kilograms per second, etc.) and/or for determining the level of any suitable harmful gas or potentially harmful substance (e.g., VOC (e.g., any suitable harmful gasses, scents, odors, etc.) or particulate or dust or pollen or mold or the like) of the ambient air in the environment of user device 60 (e.g., in HG % per liter, etc.) and/or for determining the humidity of the ambient air in the environment of device 100 (e.g., in grams of water per cubic meter, etc. (e.g., using a hygrometer)) and/or for determining the temperature of the ambient air in the environment of user device 60 (e.g., in degrees Celsius, etc. (e.g., using a thermometer)). Sensor 65 may include any suitable sensor components or subassemblies for detecting any suitable characteristics of any suitable condition of the sound quality of the environment of user device 60. For example, sensor 65 may include any suitable sound quality sensor that may include, but is not limited to, one or more microphones or the like that may determine the level of sound pollution or noise in the environment of user device 60 (e.g., in decibels, etc.). Sensor 65 may also include any other suitable sensor for determining any other suitable characteristics about a user of user device 60 and/or the environment of user device 60 and/or any situation within which user device 60 may be existing. For example, any suitable clock and/or position sensor(s) may be provided to determine the current time and/or time zone within which user device 60 may be located. Sensor 65 may be embedded in a body (e.g., housing 61) of user device 60, such as along a bottom surface that may be operative to contact a user, or can be positioned at any other desirable location. In some examples, different sensors can be placed in different locations inside or on the surfaces of user device 60 (e.g., some located inside housing 61 and some attached to an attachment mechanism (e.g., a wrist band coupled to a housing of a wearable device), or the like). In other examples, one or more sensors can be worn by a user separately as different parts of a single user device 60 or as different devices. In such cases, the sensors can be configured to communicate with user device 60 using a wired and/or wireless technology (e.g., via communications component 64). In some examples, sensors can be configured to communicate with each other and/or share data collected from one or more sensors. In some examples, user device 60 can be waterproof such that the sensors can detect a user's activity in water.

Power supply 67 can include any suitable circuitry for receiving and/or generating power, and for providing such power to one or more of the other components of user device 60. For example, power supply assembly 67 can be coupled to a power grid (e.g., when device 60 is not acting as a portable device or when a battery of the device is being charged at an electrical outlet with power generated by an electrical power plant). As another example, power supply assembly 67 may be configured to generate power from a natural source (e.g., solar power using solar cells). As another example, power supply assembly 67 can include one or more batteries for providing power (e.g., when device 60 is acting as a portable device). User device 60 may also be provided with a housing 61 that may at least partially enclose one or more of the components of user device 60 for protection from debris and other degrading forces external to user device 60. Each component of user device 60 may be included in the same housing 61 (e.g., as a single unitary device, such as a portable media device or server) and/or different components may be provided in different housings (e.g., a keyboard input component may be provided in a first housing that may be communicatively coupled to a processor component and a display output component that may be provided in a second housing, such as in a desktop computer set-up). In some embodiments, user device 60 may include other components not combined or included in those shown or several instances of the components shown.

Processor 62 may be used to run one or more applications, such as an application 69 that may be accessible from memory 63 (e.g., as a portion of user APSP data 69d) and/or any other suitable source (e.g., from network 50 via APS subsystem 100 or any other subsystem and an active internet or other suitable data connection). Application 69 may include, but is not limited to, one or more operating system applications, firmware applications, communication applications (e.g., for enabling communication of data between user devices 60 and APS subsystem 100 and/or nodes 70 and/or repository 80 and/or third party subsystem 90), third party service applications (e.g., wallet applications, banking applications social media applications, etc.), internet browsing applications (e.g., for interacting with a website provided by a third party subsystem 90 and/or by APS subsystem 100 for enabling user device 60 to interact with an online service), application programming interfaces ("APIs"), software development kits ("SDKs"), APS applications (e.g., a web application or a native application that may be at least partially produced by APS subsystem 100 for enabling user device 60 to interact with an online service and/or one or more network nodes 70 and/or repository 80 and/or a third party subsystem 90), or any other suitable applications. For example, processor 62 may load an application 69 as a user interface program to determine how instructions or data received via an input component of I/O component 66 or other component of client subsystem 70 (e.g., sensor 65 and/or communications component 64) may manipulate the way in which information may be stored (e.g., in memory 63) and/or provided to the user via an output component of I/O component 66 and/or to another subsystem via communications component 64. As one example, application 69 may provide a user with the ability to interact with an authentication processing service platform ("APSP") of system 1, where application 69 may be a third party application that may be running on user device 60 (e.g., an application associated with APS subsystem 100 and/or third party subsystem 90) that may be loaded on user device 60 (e.g., using communications component 64) via an application market, such as the Apple App Store or Google Play, or that may be accessed via an internet application or web browser (e.g., by Apple Safari or Google Chrome) that may be running on user device 60 and that may be pointed to a uniform resource locator ("URL") whose target or web resource may be managed by or otherwise affiliated with the APSP.

User device 60 may be any portable, mobile, wearable, implantable, or hand-held electronic device configured to operate with the APSP of system 1. Alternatively, user device 60 may not be portable during use, but may instead be generally stationary. User device 60 can include, but is not limited to, a media player, video player, still image player, game player, other media player, music recorder, movie or video camera or recorder, still camera, other media recorder, radio, medical equipment, domestic appliance, smart appliance (e.g., smart door knob, smart door lock, etc.), transportation vehicle instrument, musical instrument, calculator, cellular telephone, other wireless communication device, personal digital assistant, remote control, pager, computer (e.g., a desktop, laptop, tablet, server, etc.), monitor, television, stereo equipment, set up box, set-top box, wearable device (e.g., an Apple Watch™ by Apple Inc.), boom box, modem, router, printer, kiosk (e.g., a public kiosk that may be used to provide a personal virtual device by enrolling and/or authenticating various users through distinct enrollment and/or authentication processes), beacon (e.g., a Bluetooth low energy beacon transmitter device), and any combinations thereof.

As shown in FIG. 1B, network node 70 (e.g., one, some, or each of nodes 70a-70c of FIG. 1) may include a processor component 72 that may be similar to processor 62, an application 79 that may be similar to application 69, a memory component 73 that may be similar to memory component 63 (e.g., for storing data (e.g., node APSP data 79d)), a communications component 74 that may be similar to communications component 64, a sensor 75 that may be similar to sensor 65, an I/O component 76 that may be similar to I/O component 66, a power supply component 77 that may be similar to power supply component 67, a housing 71 that may be similar to housing 61, and/or a bus 78 that may be similar to bus 68. One, some, or each communications component 64 and/or one, some, or each communications component 74 may be a network interface that may include the mechanical, electrical, and signaling circuitry for communicating data over physical links coupled to network 50.

As shown in FIG. 1C, repository 80 may include a processor component 82 that may be similar to processor 62, an application 89 that may be similar to application 69, a memory component 83 that may be similar to memory component 63 (e.g., for storing data (e.g., repository APSP data 89*d*)), a communications component 84 that may be similar to communications component 64, a sensor 85 that may be similar to sensor 65, an I/O component 86 that may be similar to I/O component 66, a power supply component 87 that may be similar to power supply component 67, a housing 81 that may be similar to housing 61, and/or a bus 88 that may be similar to bus 68. One, some, or each communications component 64 and/or one, some, or each communications component 84 may be a network interface that may include the mechanical, electrical, and signaling circuitry for communicating data over physical links coupled to network 50.

As shown in FIG. 1D, third party subsystem 90 may include a processor component 92 that may be similar to processor 62, an application 99 that may be similar to application 69, a memory component 93 that may be similar to memory component 63 (e.g., for storing data (e.g., third party APSP data 99*d*)), a communications component 94 that may be similar to communications component 64, a sensor 95 that may be similar to sensor 65, an I/O component 96 that may be similar to I/O component 66, a power supply component 97 that may be similar to power supply component 67, a housing 81 that may be similar to housing 61, and/or a bus 98 that may be similar to bus 68. One, some, or each communications component 64 and/or one, some, or each communications component 94 may be a network interface that may include the mechanical, electrical, and signaling circuitry for communicating data over physical links coupled to network 50.

As shown in FIG. 1E, APS subsystem 100 may include a processor component 12 that may be similar to processor 62, a memory component 13 that may be similar to memory component 63 (e.g., for storing data (e.g., APS subsystem APSP data 19*d*)), a communications component 14 that may be similar to communications component 64, a sensor 15 that may be similar to sensor 65, an I/O component 16 that may be similar to I/O component 66, a power supply component 17 that may be similar to power supply component 67, a housing 11 that may be similar to housing 61, and/or a bus 18 that may be similar to bus 68. APS subsystem APSP data 19*d* may include one or more data sources or data structures that may include any suitable data and/or applications (e.g., application 69 for use by user device 60 and/or application 79 for use by a network node and/or an application 19 that may be run by processor 12 of APS subsystem 100 and/or the like) for facilitating an authentication processing service or APSP that may be provided by APS subsystem 100 and/or any other entities of system 1 to one or more users. Some or all portions of APS subsystem 100 may be operated, managed, or otherwise at least partially controlled by an entity responsible for providing to one or more users or entities of system 1 an authentication processing service or APSP, which may be referred to herein as a Keyless™ platform.

APS subsystem 100 may communicate with one or more user devices 60 and/or network nodes 70 and/or repository 80 and/or third party enabler subsystems 90 via one or more communications networks 50, and/or any user device 60 may communicate with any other user device 60 and/or network node 70 and/or repository 80 and/or subsystem 90 via one or more communications networks 50, and/or any network node 70 may communicate with any other network node 70 and/or user device 60 and/or repository 80 and/or subsystem 90 via one or more communications networks 50. Network 50 may be the internet or any other network, such that when interconnected, a user device 60 may access information (e.g., an API, SDK, protocol, application, etc. (e.g., from data structure 19*d* of APS subsystem 100, as may be provided as an authentication processing service via processor 12 of APS subsystem 100)) as if such information were stored locally at that user device (e.g., in memory component 63).

A user device 60 may be configured to enroll and then authenticate itself and a user with the APSP of system 1 by following any suitable APSP protocols, such as by using any suitable client application (e.g., any suitable APSP-enabled application) that may be running on the user device, while various nodes 70 may be used to store cryptographically protected shares of a user's biometric data and keys. For example, as shown in FIG. 1F, a client application 69*a* (e.g., an APSP app (e.g., as may be created and/or managed or otherwise at least partially under the auspices of APS subsystem 100)) may be run on a user device 60*a* that may include an APSP API and/or an APSP SDK, which may be at least partially defined by APS subsystem 100. An APSP API of a client application 69 may be configured to enable interaction with any suitable user device components (e.g., biometric sensors, like a camera, for capturing images indicative of the user's biometrics). An APSP SDK of a client application 69 may be configured to include or define a client-/user-side secure multi-party computation ("SMPC") protocol engine and/or a communication protocol for enabling interaction between the user device and various network nodes (e.g., for processing of a captured biometrics image and/or determining a seed/secret value and/or for generating shares of the biometrics and/or shares of the seed and/or encrypting the shares with one or more keys and/or forwarding encrypted shares to various respective nodes and/or performing any other suitable tasks (e.g., passing the captured user biometrics through a neural network to extract embedding)). Moreover, as shown in FIG. 1F, each one of network nodes 70 (e.g., nodes 70*a*-70*c*) may be configured to run any suitable application(s) (e.g., respective applications 79*a*-79*c*) that may include any suitable SMPC engine(s) and/or any suitable APSP protocol(s), which may be at least partially defined by APS subsystem 100.

During APSP enrollment of a user device 60*a*, which may be referred to herein as an APS user device 60*a* that may be used to capture a user's biometrics or otherwise for user enrollment and/or user authentication with the APSP, as compared to a TPS user device (e.g., TPS user device 60*c*) that may not be used to capture a user's biometrics or otherwise for user enrollment and/or user authentication with the APSP but may nevertheless be used by a user to interact with a third party subsystem 90 that may benefit from the enrollment/authentication of the APSP, the APS user device may be configured to generate or otherwise obtain any suitable seed (e.g., secret value (e.g., any value that may be confidential and/or lack predictability)) that may be used to provide or define any suitable keys. Certain ones of such keys (e.g., public key(s)) may be communicated to and stored on repository 80 and/or one or more network nodes 70 by the APS user device 60 for enabling registration and enrollment of the APS user device and a user thereof with the APSP. Repository 80 may be any suitable subsystem that may be operative to store any suitable data (e.g., as at least a portion of repository APSP data 89*d*) for associating a user identifier and/or device identifier with any suitable keys (e.g., using blockchain, distributed identities ("DIDs"), etc.), such that the data may be accessible by various other entities of the system (e.g., via network 50) (e.g., for associating various device identifiers (e.g., various public device signing keys of various devices) with a particular user identifier (e.g., a public user key)). For example, repository 80 may be distinct from each network node, or may be a network node, or may be a part of APS subsystem 100. As shown in FIG. 1F, APS user device 60*a* may also be configured to capture any suitable user biometrics ub of a device user U (e.g., using sensor 65 and/or any other suitable features of that user device 60*a*). For example, during enrollment, the APS user device may be configured to capture any suitable user enrollment biometrics of the user, and those captured user enrollment biometrics may be used by the APS user device to generate an enrollment biometric template ("EBT") (e.g., a user's face may be captured as an image by the user device (e.g., using a camera sensor), and a cropped and/or resized version of that image may be provided as input to a neural network to produce an embedding that may be used as the EBT (e.g., an EBT may be obtained as a feature vector from the captured user enrollment biometrics)).

Furthermore, during such enrollment, the APS user device may be configured to split each one of the seed and the EBT into any suitable number of shares, encrypt each seed share and each EBT share with one or more keys, store the encrypted seed share(s) on one or more network nodes 70, store the encrypted EBT share(s) on one or more network nodes 70, and delete the seed and the EBT and all their shares from the APS user device (e.g., pursuant to the APSP protocol). The number of seed shares, the number of biometric template shares, and the number of nodes used during the enrollment may differ from one another, may be the same as one another other, or any two of the numbers may be the same as each other but different from the third number. In some embodiments, each seed share may be stored on a respective different node such that the number of seed shares may be equal to the number of nodes storing a seed share, and each biometric template share may be stored on a respective different node such that the number of biometric template shares may be equal to the number of nodes storing a biometric template share, where the number of seed shares may be equal to the number of biometric template shares such that the number of nodes storing seed shares may be equal to the number of nodes storing biometric template shares but such that the set of nodes storing the seed shares may or may not be the same as the set of nodes storing the biometric shares such that those sets may share all nodes, some nodes, or no nodes with each other. In some embodiments, the number of seed shares may not be equal to the number of biometric template shares. In some embodiments, two or more seed shares may be stored on one node (e.g., a more trusted or more favored node) while fewer seed shares may be stored on another node (e.g., a less trusted or less favored node). Similarly, in some embodiments, two or more biometric template shares may be stored on one node (e.g., a more trusted or more favored node) while fewer biometric template shares may be stored on another node (e.g., a less trusted or less favored node). In this way, a more trusted or favored node can replace two or more nodes in the protocol when reconstructing a seed and/or a biometric template. In some embodiments, all encrypted shares (e.g., of a seed and/or of a template) could be sent to a single node, or a single node could receive the entire encrypted seed without it first being split into numerous seed shares and/or a single node could receive the entire encrypted biometric template without it first being split into numerous biometric template shares. In some embodiments, a biometric template may not be shared with one or more nodes during enrollment (e.g., if the SMPC protocol does not need to re-generate any features (e.g., garbled circuits) through use of the biometric template). Each share may be doubly encrypted. For example, each share may be first encrypted with a random key that may be generated by the device. Then, for example, each share may be doubly encrypted with a success key that may be disclosed by the authentication protocol after successful authentication (e.g., a key disclosed by the success of an authentication protocol of the APSP (e.g., the success of an SMPC protocol (e.g., successful evaluation of a matching function (e.g., successful evaluation of the user's EBT with respect to an authentication biometric sample of the user)))). Such a success key may be unknown to any network node until an authentication attempt by an enrolled APS user device. During such an authentication attempt, the enrolled APS user device may be enabled by the APSP to generate an authentication biometric sample of the user that may then be shared with and successfully evaluated by a network node with respect to the user's EBT (e.g., using SMPC for protecting the accessibility of the EBT itself) for revealing the success key to the network node. Such a success key may be changed with each authentication attempt.

Therefore, during enrollment with the APSP of system 1, an APS user device 60 may be configured to register a user and the device itself with the APSP and store encrypted seed material and encrypted biometric data in a distributed form on various nodes using any suitable threshold secret sharing (e.g., using Shamir's secret sharing), such as a secret sharing scheme that may be chosen so that the seed material may be split into several pieces or shares, a number of which may be required to reconstruct the seed material, whereby each share may be encrypted and stored on a respective node (e.g., one share on one node), and whereby the seed may not be disclosed or accessible by an entity unless that entity has access to at least a required number of shares. In some embodiments, a first secret sharing scheme may be used for the seed sharing and a second secret sharing scheme may be used for the biometric template sharing, where the first secret sharing scheme may be the same as the second secret sharing scheme or the first secret sharing scheme may differ from the second secret sharing scheme in any suitable way(s). At the end of such enrollment, the seed, the biometrics, and some other sensitive information may not be stored on or accessible to the APS user device or any central server or individual entity, but, instead, only encrypted shares of the seed (or the encrypted seed) and only encrypted shares of the biometrics (or the encrypted biometric template) may be distributed amongst various network nodes (or on a single node). In addition to storing encrypted shares of the seed and encrypted shares of the EBT on various nodes, during enrollment with the APSP, the APS user device may also be configured to generate and store on the network nodes any suitable mechanisms that may later (e.g., during authentication) enable any suitable protocol(s) (e.g., any suitable SMPC protocol(s), which may include any suitable secure two-party computation protocol(s)) to be carried out by the nodes for performing a matching function between the EBT of the enrollment and a later (e.g., during authentication) obtained authentication biometric sample ("ABS") for potentially revealing the success key(s) to the node(s). Any suitable SMPC protocol(s) and/or any suitable SMPC protocol building tools (e.g., tool(s) with which an SMPC protocol may be built for use by the APSP) may be used by the APSP, including, but not limited to, Yao's garbled circuits, homomorphic (e.g., fully or somewhat homomorphic) encryption techniques, Goldreich-Micali-Wigderson protocol, zero-knowledge protocol, and/or the like.

After enrollment with the APSP, APS user device 60 may then be used to authenticate its user with the APSP. The APS user device may be configured to follow an APSP protocol for such authenticating. APS user device 60 may be configured to authenticate the device itself with the APSP (e.g., by properly signing, with a private key of the device, a challenge from each one of the various network nodes that may have access (e.g., locally and/or via repository 80) to a corresponding public key used during the device registration phase of the enrollment). Then, APS user device 60 may be configured to authenticate its user, first by capturing any suitable user authentication biometrics of its user that may then be used to generate an ABS (e.g., user authentication biometrics similar to the user enrollment biometrics used to generate the EBT of the enrollment (e.g., picture(s) of the user's face, scan(s) of the user's fingerprints, etc.)). This ABS may then be encrypted or otherwise protected such that it may be securely shared by the APS user device with the various network nodes (e.g., encrypted without any node having direct access to the ABS itself) and then such a protected ABS may be used by each network node to evaluate a matching function (e.g., a set intersection) between the ABS and the EBT according to the enrolled SMPC protocol (e.g., using a garbled circuit, such that neither the ABS nor the EBT may be directly accessed by any node). If the evaluation carried out by a particular network node is successful (e.g., if the evaluation indicates that the two biometric datapoints are from the same person with high probability), the particular network node may return its respective encrypted EBT share and/or its respective encrypted seed share to the APS user device (e.g., after partial decryption of the share(s) using a success key revealed to the network node based on the successful evaluation). Therefore, if a matching function performed by a node during APS authentication (e.g., authentication of an APS user/APS user device, as opposed to TPS authentication (e.g., authentication of a TPS or any suitable secure operation based on an APS authentication)) results in a successful evaluation of a user's EBT and ABS, then the success key can be revealed to the node (e.g., for enabling the node to partially decrypt the doubly encrypted seed share on the node and/or for enabling the node to partially decrypt the doubly encrypted EBT share on the node), all without the node ever having access to the EBT itself.

If an evaluation of a user's EBT and ABS is successful at a sufficient number (e.g., 1 or more (e.g., m-number for m out of n secret sharing)) of the network nodes (e.g., if user authentication with the APSP is successful at a sufficient number of the nodes), the APS user device may receive and further decrypt enough seed shares from the node(s) for recovering or reconstructing the seed (or receive and further decrypt the seed from a node). Such a recovered or reconstructed seed may then be used by the APS user device for any suitable purpose, such as for enabling any suitable secure operation (e.g., seamless authentication, unique identification, access control, key generation, e-signature, etc.), with any suitable service locally on the APS user device (e.g., using the reconstructed seed or a key derived therefrom for encrypting/decrypting a hard drive portion of the device's memory, for encrypting or signing a cryptocurrency transaction with a user's digital wallet on the device for publishing on the blockchain, etc.) and/or with any suitable service provided by any suitable third party subsystem 90 (e.g., using the reconstructed seed or a key derived therefrom for enabling secure user access via a third party app or website browser to a server of a third party website (e.g., a social network site or banking site) or an identity and access management ("IAM") server), in any suitable sector (e.g., e-wallets, fintech, banking, enterprise, A&D/travel, healthcare, government, etc.). A secure operation may be any process that generates, persists, and/or uses secret keys (including private keys) using a recovered or reconstructed seed of the APSP and/or using one or more revealed success keys. For example, an APS user device may be configured to perform any suitable action with a recovered seed, including but not limited to, deriving a DID key and issuing a signed claim associated with a user's identity, deriving a crypto wallet secret key to perform a cryptocurrency transaction, deriving a list of crypto wallet public keys to check a user's balance, deriving a third party key and then using that third party key to sign or encrypt a challenge from a third party, and/or the like. Once a seed is recovered and used by the APS user device for any suitable purpose (e.g., a one-time use), the seed should once again be deleted from the APS user device (e.g., pursuant to the APSP protocol).

Therefore, between the end of APS enrollment (see, e.g., process 200) and APS successful APS authentication (see, e.g., process 400), as well as between authentications, the seed, the biometrics, and some other sensitive information may not be stored on or accessible to the APS user device or any central server or individual entity, but, instead, only encrypted shares of the seed (or the encrypted seed) and only encrypted shares of the biometrics (or the encrypted biometric template) may be distributed amongst various network nodes (or on a single node). Enrollment biometrics of a user may be captured and processed (e.g., by feature extraction through a neural network) as an EBT that, along with a secret seed, may then be split and one-way encrypted on the user device. These one-way encrypted biometric shares and one-way encrypted secret seed shares may be stored in many places (e.g., on various network nodes (e.g., different shares on different nodes) and/or various network domains and/or various control domains and/or the like) along with related SMPC features (e.g., enrolled garbled circuits), while the shares and underlying biometrics and secret seed are deleted from the user device. Later, the user device may then capture and process other user biometrics as an ABS, and the enrolled SMPC features of the nodes may be used to evaluate a comparison of the ABS to the EBT on each node to determine whether or not the encrypted seed share on the node may be returned from the node to the user device for potential recombination with other returned seed shares from other nodes for recovering the seed on the user device for use in a secure authentication-dependent operation. Benefits of such enrollment and authentication according to the APSP are numerous, including, but not limited to, avoiding the long term storage of sensitive information (e.g., the seed, a biometric template, or even shares thereof) on a user device or on any central server (e.g., between APS enrollment and APS authentication or between distinct authentications), consistent cross-platform user experience (e.g., for APS user devices of various types and/or running various operating systems, for TPS user devices of various types and/or running various operating systems, for different phases of the APSP (e.g., APS enrollment, APS authentication, TPS enrollment, TPS authentication, various secure operations, etc.)), fast and local user authentication on its own user device, maintaining a user's ability to be in control of its personal data, and/or the like. The security provided by this APSP may allow for a user and a decentralized and distributed system, rather than a central server (e.g., a company's central server), to be in control, as there may be no secret seed enabling authentication that is permanently stored on any one entity (e.g., no honeypot, no authentication secrets stored on a user device or on a single network node, etc.), and the APSP may provide a true password-less environment through SMPC. The APSP system may be robust such that if one or more portions (e.g., nodes) of the system are down (e.g., not functioning properly), the APSP may still function properly. Different nodes may be controlled (e.g., managed, maintained, operated, etc.) by different entities, which may allow control and costs to be split, which may increase the robustness of the system. The privacy provided by this APSP may be compliant with General Data Protection Regulation ("GDPR"). Zero-knowledge biometric authentication may be enabled, and a user may be enabled by the APSP to control what data is shared via selective data disclosure.

The APSP may solve a credential storage problem by providing a way to authenticate a user's biometrics for enabling a secure operation that may use distributed computation, threshold cryptography, and/or SMPC to recombine or otherwise recover a user's secret. With the APSP, users (e.g., their biometrics) may become their passwords and control their credentials through biometrics. The APSP may create a zero-knowledge system to achieve biometric authentication for enabling a secure operation without having to share the biometric template data or seed with those that may depend on the result of the authentication (e.g., a third party subsystem (e.g., a social media website's server or IAM server)). During an enrollment phase of the APSP, a user may register itself (e.g., register the user's biometrics) and its user device with the APSP network. This may include storing encrypted key material and encrypted biometric data (e.g., an encrypted EBT) in a distributed form on one or more nodes using threshold secret sharing.

During an authentication phase of the APSP, the user may first authenticate its device (e.g., through appropriate handling of a network node challenge) and then provide authentication biometrics for generating an ABS for enabling user authentication. The ABS may be encrypted on the user's device, and may be matched against the encrypted EBT sent to the network node(s) during enrollment (e.g., using enrolled SMPC features (e.g., enrolled garbled circuits)). None of the nodes may be able to decrypt the encrypted EBT or the encrypted ABS. Matching may be performed using an SMPC protocol (e.g., based on Yao's garbled circuit technique). Therefore, the APSP protocol may remain secure even if some of the nodes and user devices are compromised. Specifically, secret user information (e.g., biometric data, seed, etc.) may not be disclosed if an adversary is able to control all nodes, or if an adversary is able to control the APS user device and a subset of the nodes below a user-defined threshold. Further, the privacy of the data stored on the nodes may not depend on the amount of entropy associated with the biometric signal, as every piece of information stored on the nodes may either be pseudorandom or encrypted (e.g., using advanced encryption standard ("AES") with (random) 128-bit keys and/or using Rivest-Shamir-Adleman ("RSA")-2048). Therefore, the strength of the keys (e.g., a user's secret key, the seed, etc.) may be independent of the amount of entropy associated with the biometric signal. This can make brute-force offline attacks on the data stored on the nodes impractical.

Each node 70 may be any suitable server or device or subsystem that may be independently operated or at least partially managed by a single entity (e.g., a manager of APS subsystem 100). In some embodiments, a node 70 may be provided by a user device 60 for use by another user (e.g., one user device 60 of system 1 may be configured to operate as a node 70 for another user device 60 of system 1). Nodes 70 of system 1 ought to be available and non-colluding. For example, an APSP network 40 (e.g., a decentralized and/or distributed network) of system 1 may include two or more nodes 70. In some embodiments, an APSP network 40 may include one or more user devices that may be at least partially configured as a node for one or more other user devices. Network 40 may be designed to scale to a geographically-distributed, large number of users. As a result, the APSP protocol may be configured to adhere to one or more suitable design requirements, including, but not limited to, the capacity of the network (e.g., the number of users that the network can handle) ought to increase linearly with the number of nodes, if a number of the nodes fail, the network ought to still be operational for the vast majority of the users, and/or the like. At any point in time a user device may be enrolled with or authenticating with a particular (e.g., fixed) subset of the nodes in the network. Adding new nodes may enable more users to leverage the network. Additionally or alternatively, through the use of threshold secret sharing, recovering a seed may require only a small number of nodes in the network to be operational at any point in time. To reduce latency, the nodes can be strategically placed close to their users. Given the availability of geographically distributed data centers from major cloud providers, this may be a simple and cost-effective way to improve user experience and provide quality of service. For segregated networks (e.g., enterprise, etc.), nodes can be deployed within the perimeter of the segregated network. For air-gapped networks (e.g., military, intelligence, and disaster recovery networks, etc.), nodes can be deployed inside the air-gapped network. The APSP may use secret sharing and encryption of sensitive data by enabling an APS user device to generate and forward encrypted shares of various private information (e.g., seed, biometric template, etc.) to appropriate network nodes. This may provide two layers of security if a particular node is compromised, as (1) an adversary must be able to recover a sufficient number of shares to reconstruct the user's secrets, which may substantially raise the bar for the adversary, who must be able to compromise a considerable number of nodes, and (2) the adversary must be able to decrypt the shares, each of which may be encrypted under an independent key (e.g., a success key). In an example in which Yao's garbled circuit technique may be used for an SMPC protocol of the APSP, a garbled circuit may be configured to output a valid success key only if the ABS is close to (e.g., within a threshold distance of) the EBT because of the security properties of the garbled circuit protocol. As a result, an attacker of a corrupted node will generally not be able to compute the circuit output key (e.g., the success key) unless it interacts with a trusted device, and the authentication is successful.

FIGS. 2A-7W

Various processes may be carried out in order for a user of a user device to be authenticated by the APSP for executing any suitable secure operation (e.g., for securely accessing a third party website or app), including, but not limited to, processes 200-600 of FIGS. 2A-6. FIGS. 2A and 2B illustrate a flowchart of an exemplary process 200 for enrolling an APS user device and a user thereof with the APSP. FIG. 3 illustrates a flowchart of an exemplary process 300 for generating one or more sets of authentication circuit information for a set of network nodes using secure multi-party computation, which may be used by process 200. FIGS. 4A-4C illustrate a flowchart of an exemplary process 400 for authenticating an enrolled APS user of an enrolled APS user device with the APSP. FIG. 5 illustrates a flowchart of an exemplary process 500 for registering a third party service with an enrolled APS user of an enrolled APS user device. FIG. 6 illustrates a flowchart of an exemplary process 600 for authenticating an enrolled APS user of an enrolled APS user device with a registered third party service using the APSP. FIGS. 7A-7W illustrate exemplary screens of graphical user interfaces ("UIs") of one or more user devices carrying out the processes of FIGS. 2A-6 (e.g., each UI may be presented by any suitable I/O component 66 of any suitable user device 60 during processes 200-600). Each UI of FIGS. 7A-7W may be a graphical user interface ("GUI") that may include various layers, windows, screens, templates, elements (e.g., buttons, sliders, labels, status bars, etc.), menus, and/or other components of a currently running application (e.g., application 69) that may be displayed by any suitable display of the device's I/O component. Additionally or alternatively, for a running application, various other types of non-visual information may be provided to a user as various other types of a UI via various other output components of the user device (e.g., audible, tactile, etc.). The operations of the processes described may be achieved with a wide variety of graphical elements and visual schemes. Therefore, the embodiments of FIGS. 7A-7W are not intended to be limited to the precise user interface conventions adopted herein. Rather, embodiments may include a wide variety of user interface styles, including non-graphical or otherwise non-visual interface styles.

FIG. 2A, FIG. 2B, and FIGS. 7A-7I

FIGS. 2A and 2B illustrate a flowchart of an exemplary process 200 for enrolling an APS user device and a user thereof with the APSP. Process 200 is shown being implemented by APS user device 60a, its user U, a selection of nodes 70 (e.g., a number n of selected nodes 70 (e.g., nodes 70a, 70b, 70c, . . . , 70n)), and repository 80. However, process 200 may be implemented using any other suitable components or subsystems or entities of system 1 of FIG. 1 or otherwise. Process 200 may provide a seamless user experience for securely and efficiently enrolling user U and its user device 60a with the APSP. To facilitate the following discussion regarding the operation of system 1 for enrolling user U and its user device 60a with the APSP according to process 200 of FIGS. 2A and 2B, reference is made to various components of system 1 of the schematic diagrams of FIGS. 1-1F, and to screens 700a-700i that may be representative of a graphical user interface of APS user device 60a during such a process (e.g., as shown in FIGS. 7A-7I). The operations described may be achieved with a wide variety of graphical elements and visual schemes. Therefore, the embodiments of FIGS. 7A-7I are not intended to be limited to the precise user interface conventions adopted herein. Rather, embodiments may include a wide variety of user interface styles.

Process 200 may begin at operation 202, where user U may initiate enrollment by carrying out any suitable enrollment initiation interaction eii 202d with an APS application 69 that may be running on the user's APS user device 60a. For example, as shown by screen 700a of FIG. 7A, the UI of APS device 60a may present an "ENROLL" option for user U to select with its enrollment initiation interaction eii in order to proceed with process 200 for enrolling with the APSP. In advance of operation 202, APS application 69 may be accessed by device 60a in any suitable manner (e.g., as an app downloaded from APS subsystem 100 or any suitable app store or otherwise) and user U may carry out any suitable account set-up operations with respect to the application, although any set-up operations not shown may or may not be required.

At operation 204, APS user device 60a may detect such an enrollment initiation interaction eii and, in response to such detection, user device 60a may obtain any suitable secret value or seed s in any suitable manner (e.g., according to application 69). For example, seed s may be a random cryptographic element generated by application 69 or securely imported from another application (e.g., a cryptographic wallet and/or as a result of a protocol (e.g. key negotiation)). For example, seed s may be generated as a random string of some length v (e.g., v=256 bits), uniformly selected from $\{0,1\}v$ in any suitable manner. It can also be a pseudorandom string generated from some other secret, or it could be provided by an app that uses the APSP (e.g., it can be the root seed of a cryptographic wallet that may use a Bitcoin Improvement Proposal ("BIP") 32 or 44 deterministic key generator. The seed may be generated on the APS user device (e.g., using the APS application that may be running on the APS user device), with or without any suitable piece(s) of randomness from one or more other sources, such as through asking one or more nodes or third party subsystem(s) for some randomness (e.g., when a user device may be limited in its ability to generate random data).

At operation 206, user device 60a may then derive or otherwise generate one or more keys and/or one or more key pairs (e.g., according to application 69). For example, user device may obtain any suitable constant string c (e.g., "user_id") and then use that constant string c and seed s to generate a private user key $sk_u$, such as by defining private user key $sk_u = HMAC_s(c)$. For such a hash-based message authentication code ("HMAC"), the APSP may use HMAC-SHA256, but, in other embodiments, HMAC could be instantiated with other collision-resistant hash functions without impacting the security of the protocol. Further, HMAC can be replaced by any suitable pseudorandom function family ("PRF") (e.g., any suitable efficiently-computable function of the PRF), where private user key $sk_u$ may be generated using any PRF computed over seed s and constant string c. Alternatively, the APSP may use $HMAC_s$ (c) as a source of randomness for any suitable key generation algorithm (e.g., an elliptic curve digital signature algorithm ("ECDSA")) that may be used to generate private user key $sk_u$. A counterpart public user key $pk_u$ to private user key $sk_u$ may also be generated at operation 206 in any suitable manner (e.g., for providing user keypair $(sk_u, pk_u)$). For example, private user key $sk_u$ may be used as a private key for an ECDSA, and the corresponding public counterpart is public user key $pk_u$ (e.g., $pk_u = sk_u \times G$, where G may be the elliptic curve base point). Therefore, user keypair $(sk_u, pk_u)$ may be deterministically generated from seed s. In some embodiments, constant string c may not be utilized. In some embodiments, private user key $sk_u$ may be defined as seed s. A public/private cryptosystem may come with a key generation process, and the key generation process may require some randomness. For example, a suitable public/private cryptosystem may be selected, and the corresponding key generation process of the selected cryptosystem may be used to obtain private user key $sk_u$ and public user key $pk_u$, where seed s or some transformation of seed s may be used as the source of randomness for that key generation process. A random device signing keypair ($sk_d$, $pk_d$) may also be generated at operation 206 (e.g., a keypair for an EdDSA signing key). For example, a private device signing key $sk_d$ may be generated as a random integer of any suitable size (e.g., 256 bits) and then a counterpart public device signing key $pk_d$ to private device signing key $sk_d$ may also be generated in any suitable manner (e.g., for providing random device signing keypair ($sk_d$, $pk_d$)), such as where private device signing key $sk_d$ may be used as a private key for an Edwards-curve digital signature algorithm ("EdDSA") or an ECDSA, and the corresponding public counterpart is public device signing key $pk_d$ (e.g., $pk_d=sk_d \times G$, where G may be the elliptic curve base point). As described herein, such a signing keypair may be used to authenticate a user device through a randomized challenge-response protocol based on a zero-knowledge proof of knowledge. A random encryption keypair ($sk_e$, $pk_e$) may also be generated at operation 206. As described herein, such an encryption keypair may be used to encrypt a symmetric encryption key used to encrypt data (e.g., biometric shares and seed shares) that may be sent to various network nodes. A random TPS keypair ($sk_t$, $pk_t$) may be generated (e.g., at operation 526 of process 500). Such a TPS keypair may be generated using EdDSA, while one, some, or each of user keypair ($sk_u$, $pk_u$), device signing keypair ($sk_d$, $pk_d$), and encryption keypair ($sk_e$, $pk_e$) may be generated using ECDSA. Although, any suitable keypair of the APSP may be generated using any suitable process.

At operation 208, APS device 60a may send public user key $pk_u$ and public device signing key $pk_d$ as data 208d to each node j of a selected set of nodes n (e.g., each node 70 of nodes 70a, . . . , 70n) of system 1 (e.g., according to application 69). The APS protocol may be configured to use a threshold secret sharing scheme to mitigate attacks that involve compromising a (possibly large) subset of the network nodes. In a (m, n) threshold secret sharing scheme, a seed s may be shared (e.g., as split shares) with a set of parties P in such a way that any subset Q of P such that |Q|≥m can reconstruct the secret value s, but no subset Q' of P can recover seed s as long as |Q'|<m. A user device may select the set of nodes (e.g., any set of one or more nodes) based on any suitable characteristics, including, but not limited to, speed, availability, capacity, trust, and/or the like. A secret sharing technique may allow for a particular or any value m and/or a particular or any value n, where n may be any number greater than or equal to m (e.g., m=2, and n=3). The APSP may be configured to enable a user to choose m and n (e.g., using any suitable user interface on a user device) or to enable a third party to choose m and n (e.g., for a particular use case (e.g., for a particular secure operation)). APS application 69 may be configured to select the set of nodes n from network 40 randomly or based on any suitable enterprise policies. For example, certain policies can be pre-defined before the instantiation of the protocol. If needed, the policies can also be updated and correspondingly the user can interact with a new set of nodes in the network after the policy update. A node may be chosen based on its response time, but other selection policies are also appropriate. While the minimum number of nodes n may be 1, this number provides no redundancy and no ability to use secret sharing or distributing shares of a secret.

A more typical minimum number of nodes n may be 3, where the number of nodes m to be n or n−1 or the like, or any other suitable number.

At operation 210, each node j of selected nodes n may receive data 208d from user device 60a and store (e.g., according to application 79 of that particular node 70) the public user key $pk_u$ and public device signing key $pk_d$ of data 208d (e.g., keys $pk_u$ and $pk_d$ may be stored together (e.g., in a linked fashion) as a portion of node APSP data 79d in memory 73 of the node).

At operation 212, each node j may generate a challenge $r_j$ (e.g., a partially random data structure) for the public keys received at that node, and then the node may send that challenge $r_j$ as at least a portion of data 212d back to user device 60a (e.g., according to application 79 of that particular node 70).

At operation 214, user device 60a may receive challenge $r_j$ of data 212d from one or each of nodes n, generate a challenge response $r_j\sigma_{sku}$ for each received challenge $r_j$ by signing that challenge $r_j$ with the device's private user key $sk_u$ (e.g., challenge response $r_j\sigma_{sku}=Sign_{sku}(r_j)$), and then send that challenge response $r_j\sigma_{sku}$ back to the appropriate node j as at least a portion of data 214d (e.g., according to application 69 of user device 60a).

At operation 216, one, some, or each node j of selected nodes n may receive data 214d from user device 60a, attempt to verify the public user key $pk_u$ of earlier received data 208d using the challenge response $r_j\sigma_{sku}$ of recently received data 214d, generate a verification acknowledgment $ack_j$ that may be indicative of whether or not the node was able to verify the public user key (e.g., confirm or deny verification), and then the node may send that verification acknowledgment $ack_j$ as at least a portion of data 216d back to user device 60a (e.g., according to application 79 of that particular node 70). This may enable the node to verify whether or not public user key $pk_u$ is indeed the public user key of user device 60a. If the node is unable to verify, then the node may delete the keys (e.g., as stored at operation 210).

At operation 218, user device 60a may receive and register verification acknowledgment $ack_j$ of data 216d from one or each node j of nodes n (e.g., according to application 69 of user device 60a). If the received $ack_j$ is indicative of a positive verification by node j, then user device 60a may determine that its public keys $pk_u$ and $pk_d$ have been received, stored, and verified by that particular node, whereby user device 60a may be enabled to proceed with the enrollment of process 200 (e.g., to operations 220/222). However, if the received $ack_j$ is indicative of a negative verification by node j, then user device 60a may determine that its public keys $pk_u$ and $pk_d$ have not been received, stored, and verified by that particular node, whereby user device 60a may be configured to repeat operations 208-218 for at least each node that provided such a negative verification of its challenge.

Once a positive verification is registered by user device 60a for each node j of selected nodes n at operation 218, process 200 may advance to operation 220, where user U may present user enrollment biometrics ueb (e.g., as user enrollment biometric identifier information or user enrollment biometric information 220d) to user device 60a by carrying out any suitable user biometrics enrollment interaction with device 60a. APS user device 60a may be configured to capture such enrollment biometrics ueb for generating an enrollment biometric template ("EBT") B at operation 222 (e.g., according to APS application 69 (e.g., different users may use different biometrics, different devices may use different sensors, different types of data may be captured in addition to biometrics (e.g., device environment data), and/or the set of characteristics and associated actions themselves may change from one enrollment to the next, etc.)). For example, as shown by screen 700*b* of FIG. 7B, the UI of APS device 60*a* may optionally present a user approval request for accessing any suitable sensor(s) or other device components (e.g., a camera of device 60*a*) for capturing user biometrics, a request which the user may accept or deny. If accepted or automatically allowed, the UI of APS device 60*a* may present instructions on how the user ought to present user enrollment biometrics ueb to user device 60*a* for capture. For example, as shown by one or more of screens 700*c*-700*e* of FIGS. 7C-7E, while the user's face (not shown) may be in the line of sight of a device camera sensor, device 60*a* may instruct the user to look left, then eventually look straight at the camera, and then eventually look right. This may enable device 60*a* to capture user enrollment biometrics ueb in the form of a video or photograph sequence of the user's face rotating. This may enable "liveness" detection of the user (e.g., as may instructing the user to carry out any other suitable action while biometrics are captured, such as winking with one eye then with the other eye, or smiling then frowning, or saying a word or phrase, etc.). This may help prevent spoofing and/or capturing biometrics of an unwilling user.

Any suitable biometrics of a user may be captured in any suitable manner by any suitable sensor(s) of user device 60*a* in response to a user presenting itself to the user device in any suitable manner(s) at operation 220. For example, any information that may be sensed about the user by any sensor 65 described herein or otherwise may be used to define the user enrollment biometrics ueb to be captured by the user device 60*a*, including, but not limited to, facial information, fingerprint information, iris information, retinal scan information, movement, orientation, gesture, gait, pausality, speech information, any suitable behavioral biometrics, sequenced DNA, the output of any physically unclonable function, and/or the like. Biometric traits may be physiological or behavioral characteristics that may uniquely identify a user. Because of the uniqueness of these traits, several authentication techniques based on biometric signals have been introduced, including with respect to biometrics modalities including fingerprints, face, iris, voice, speech, and keystroke dynamics. Biometrics may capture intrinsic characteristics of the user (e.g., something that the user is), thus removing the need for a user to memorize any secret (e.g., a password or PIN), or to possess a physical device (e.g., a hardware token or a smart card). The experience may typically be more user-friendly than other modalities. Further, biometric authentication may generally be more secure than passwords, whereas the security of biometric authentication systems is largely independent of the user's choices and behavior.

However, biometric signals may be somewhat noisy. For example, multiple measurements collected from the same user may tend to vary slightly due to several factors, including, but not limited to, sensor noise, changes in collection environment (e.g., environmental lighting when EBT is captured may be different than environmental lighting when ABS is captured), changes in collection sensors (e.g., device used to capture EBT may be different than device used to capture ABS), and natural variations in the physiological characteristic being sampled (e.g., user without beard to capture EBT different than user with beard to capture ABS). For instance, the image collected from a fingerprint may change between samples because of the amount of pressure of the finger on the sensor, the angle at which the finger touches the sensor, and skin dryness. Similarly, individual pixels of the images used for face authentication may be affected by lighting, the position of the user's face within the frame, presence of facial hair, and/or the like (e.g., the user may grow a beard between when its enrollment biometrics are captured for generating EBT B and when its authentication biometrics are captured for generating ABS b). Therefore, because of this noise, the APSP may be configured not to directly compare raw biometric signals (e.g., pixels in a fingerprint image of a user's enrollment biometrics and pixels in a fingerprint image of a user's authentication biometrics). Instead, the APSP may be configured to extract relevant features from the raw signals (e.g., the relative location and the orientation of minutiae points in fingerprint images) and match these features using any suitable pattern recognition systems. For example, at operation 222, user device 60*a* may not only be configured to capture user enrollment biometrics ueb (e.g., raw biometric signals), but may also be configured to generate an enrollment biometric template ("EBT") B based on such captured user enrollment biometrics ueb using any suitable techniques (e.g., according to application 69). For example, if captured ueb is an image of the user's face, device 60*a* may be configured to perform a tight square crop containing the user's face, scale it to 160×160 pixels, and then feed the pre-processed image into a convolutional neural network (e.g., that may be run on device 60*a*) that may produce an embedding for constituting EBT B for the user's captured ueb (e.g., for an image x, the embedding may be represented as $f(x) \in \mathbb{R}^d$, which may embed x into a d-dimensional Euclidean space, and the network nodes may be trained (e.g., by the SMPC protocol) such that the Euclidean distances (e.g., closenesses) in the embedding space when evaluating the user's EBT with respect to an ABS may correspond to the face similarity (e.g., such that faces of same person have smaller distances and faces of different persons have larger distances)). Therefore, in some embodiments, operation 222 may use a neural network or otherwise to process captured ueb into one or more vectors for defining EBT B, such that the vector(s) of such an EBT B may later be compared to vector(s) of an ABS for computing a distance therebetween (e.g., with a matching function of an SMPC). However, any suitable enrollment biometrics ueb may be used in any suitable manner to define any suitable enrollment biometric template B (e.g., fingerprint biometrics ueb may be transferred into a set as EBT B). Generally, data may be collected from any or all sensors of the user device for any amount of time (e.g., while asking the user to cooperate or in the background without explicitly asking for the user's cooperation (e.g., when sensing the gait of a user that may be walking while carrying the device)), then a subset of the raw collected data may be selected based on any suitable data quality check(s), and then the raw data (e.g., subset or otherwise) may be processed using any suitable algorithms (e.g., legacy feature extraction, machine learning, etc.) and/or encoding of time-series information (e.g., for liveness checks (e.g., as may be distinct from snap-shot image data). For example, this may reveal a set and/or vector and/or matrix and/or the like that may be used to define EBT B, as any suitable representation (e.g., string of bits or digital representation) of the sensed data (e.g., user biometric data and/or device environmental data).

At operation 224, user device 60*a* may then generate one or more sets of authentication circuit information ACI on seed s and EBT B for the selected nodes n using secure multi-party computation (e.g., according to application 69). Operation 224 may be carried out in any suitable manner for enabling SMPC by the APSP to allow for each node j of nodes a to carry out a comparison on EBT B and a later generated authentication biometrics sample ABS without the node having access to the actual EBT or to the actual ABS. For example, operation 224 may generate/define a cryptographic process for biometric authentication ("CPBA") that can be used at any later time to authenticate the user via evaluating a matching function on a fixed EBT and another input ABS provided at authentication-time, allow the user to perform cryptographic operations (e.g., optionally), and/or refresh or re-upload new instances of the cryptographic process to allow follow-up authentications (e.g., optionally). With the ACI, the CPBA may be prepared by the user device and uploaded to the node(s). In general, the CPBA may be created by the user device and node(s) cooperating together (e.g., the burden may be shared between the device and node(s) or more heavily handled by the device or more heavily handled by the node(s). Alternatively to garbled circuits, there are many other suitable protocol(s) and/or protocol tool(s) that may be used for CPBA. Generally, the ACI of operation 224 may be re-usable, but might be usable only once for security purposes in one or more embodiments. In general, the process may be based on any SMPC technique(s), as listed in previous comment. Biometrics (e.g., user biometrics and/or device environment biometrics) may be captured and used as inputs (e.g., EBT and ABS) to the CPBA, which may enable a secure operation as an output to the CPBA, where each one of the node(s) may be used by the CPBA to run a comparison on the inputs without any node having direct access to one or both of the inputs and then to use a successful result of the comparison (e.g., a revealed success key) to provide the output (e.g., to enable a secure operation). The generation of a particular set of authentication circuit information ACI by operation 224 may be carried out by a particular iteration of process 300 of FIG. 3.

FIG. 3

FIG. 3 illustrates a flowchart of an exemplary process 300 for generating a set of authentication circuit information for a set of network nodes using secure multi-party computation, which may be used by process 200. Process 300 is shown being implemented by APS user device 60a (e.g., according to application 69). However, process 300 may be implemented using any other suitable components or subsystems or entities of system 1 of FIG. 1 or otherwise. For example, process 300 may be carried out one or more times by operation 224 of process 200 of FIGS. 2A and 2B and/or one or more times by operation 446 of process 400 of FIGS. 4A-4C.

Process 300 may begin at operation 302, where a new circuit identifier $C_{id}$ may be obtained for the new set of authentication circuit information to be generated. Circuit identifier $C_{id}$ may be defined or accessed or generated or otherwise obtained in any suitable manner (e.g., randomly generated or defined sequentially by device 60a) and may be of any suitable size and constitution (e.g., an 8 bit identifier) such that each new set of authentication circuit information to be generated by the remainder of process 300 may be associated with its own unique circuit identifier $C_{id}$, whereby different sets of authentication circuit information may be differentiated by their different unique circuit identifiers $C_{ids}$.

At operation 304, seed s may be split into n-number of seed shares $[s]_{1, \ldots, n}$, such that the number of seed shares [s] generated may be equal to the number of selected nodes n being used by the enrollment process 200, whereby a particular one of the seed shares $[s]_{1, \ldots, n}$ may be associated with a particular one of the selected nodes n. Alternatively, more seed shares may be generated than selected nodes, with two or more seed shares being provided to a single node. Seed s may be split into n-number of seed shares $[s]_{1, \ldots, n}$ according to any suitable secret sharing scheme, such as Shamir's secret sharing. As an example, for a (m, n) scheme, at least m seed shares of the total n seed shares may be required to reconstruct the seed. Additionally or alternatively, any suitable verifiable secret sharing scheme may be used, such as Feldman's secret sharing scheme, which may provide assurances that could prevent one or more nodes from providing invalid shares.

At operation 306, EBT B may be split into n-number of EBT shares $[B]_{1, \ldots, n}$, such that the number of EBT shares [B] generated may be equal to the number of selected nodes n being used by the enrollment process 200, whereby a particular one of the EBT shares $[B]_{1, \ldots, n}$ may be associated with a particular one of the selected nodes n. Alternatively, more EBT shares may be generated than selected nodes, with two or more EBT shares being provided to a single node. EBT B may be split into n-number of EBT shares $[B]_{1, \ldots, n}$ according to any suitable secret sharing scheme, such as Shamir's secret sharing. As an example, for a (m, n) scheme, at least m EBT shares of the total n EBT shares may be required to reconstruct the EBT. Additionally or alternatively, any suitable verifiable secret sharing scheme may be used, such as Feldman's secret sharing scheme, which may provide assurances that could prevent one or more nodes from providing invalid shares. The scheme(s) used to for the seed shares may be the same or different than the scheme(s) used for the EBT shares.

At operation 308, for new circuit identifier $C_{id}$ of operation 302, new authentication circuit information $ACI_{Cid\_j}$ may be generated for a particular node j of selected nodes n using a respective particular seed share [s]) and a respective particular EBT share $[B]_j$. Operation 308 may be carried out by process 300 n-times (e.g., serially or in parallel), once for each of the nodes n. As shown, each one of such n-iterations of operation 308 may include carrying out operations 310-328 of process 300.

At operation 310, for generating new authentication circuit information $ACI_{Cid\_j}$ for node j, a garbled circuit $C_j$ may be generated. The garbled circuit may be generated in accordance with any suitable SMPC protocol and may be designed to be agnostic to the underlying biometrics, and may support several modalities, including face recognition, fingerprints, speech recording, and iris scanning. For example, a circuit with an underlying function (e.g., a comparison function), may be described as a Boolean circuit with 2-input logic gates. Such a function may be generated or otherwise obtained by user device 60a, and then the function may be transformed or garbled (e.g., encrypted) into the garbled circuit by user device 60a (e.g., a collection of Boolean gates defining the function may be transformed into the garbled Boolean circuit). The garbled circuit $C_j$ may be generated with a circuit input table ("CIT") $K_j$ and a CIT $T_j$ for a matching function mf: $\beta_y \times \beta_z \to \{FAIL, SUCCESS\}$. For example, the APSP may be configured to use a highly optimized SMPC construction, such as one based on a primitive called garbled circuits for evaluation of "closeness" between enrolled biometrics and authenticating biometrics of a user (e.g., between an EBT and an ABS of a user). Garbled circuits may enable private computation without the parties revealing their inputs. Here, the computation of closeness may be performed between user device 60a and the n-set of nodes 70. Therefore, with this garbled circuit technique, two parties can compute a shared matching function mf($\beta_y$, $\beta_z$) on their respective inputs $\beta_y$ and $\beta_z$, disclosing only the output of the function. This may be achieved by representing function f($\beta_y$, $\beta_z$) as a Boolean circuit and then by "garbling" the truth table of each Boolean gate so that the circuit can be evaluated provided appropriate decryption keys representing $\beta_y$ and $\beta_z$. However, none of the intermediate gate outputs may be disclosed to the parties. The APSP may use garbled circuits to implement a distance function that may be applied to vectors representing an enrollment biometric template and vectors representing an authentication biometric sample, although the EBT and ABS may be defined in other forms besides vectors and the function may be defined to operate on such other form(s). The distance between the vectors may then be compared to a fixed threshold, and the garbled circuit may output the result of this comparison, thus hiding the actual distance. For example, a garbled circuit may be configured to compute a closeness or distance d between the two inputs $\beta_y$ and $\beta_z$ (e.g., two biometric samples (e.g., the EBT as $\beta_y$ and the ABS as $\beta_z$)) of its matching function mf($\beta_y$, $\beta_z$) and then to compare the computed distance d with a threshold $\tau$, where the circuit may be configured to output a SUCCESS output (e.g., a non-0 string set to be a success key $ck_j$) if d<$\tau$ and to output a FAIL output (e.g., a string of 0's) if d≥$\tau$. Such a threshold $\tau$ may be defined in any suitable way and may vary based on the specific application (e.g., for a specific matching function and/or specific type of EBT and/or ABS). More generally, a matching function may be used to maximize the true accepts (e.g., correct successes) and minimize the false accepts (e.g., incorrect successes) of the whole system. The threshold may be selected in order to satisfy the trade-off (e.g., to allow as many correct biometric samples in as possible, while rejecting as many false samples as possible).

With garbled circuits, one party (e.g., the circuit generator (e.g., user device 60a)) may construct a Boolean circuit that may compute function f(•, •) and may "encrypt" or "garble" it. The other party (e.g., the circuit evaluator (e.g., node j)) may compute the output of the circuit and may share it with the circuit generator party. The circuit may include binary gates g connected by three types of wires p: (1) input wires that may assume the value of the parties' inputs, (2) output wires that may be set to the output of function f(•, •) at the end of the evaluation, and (3) intermediate wires that may carry intermediate values as they propagate throughout the circuit. The generator may associate a pair of keys or labels ($l_p^0$, $l_p^1$) to each wire p of the circuit. One of the labels may correspond to bit value 0, while the other one of the labels may correspond to bit value 1. For each gate g with input wires (y, z) with inputs $b_y$, $b_z \in \{0, 1\}$ and output wire k, the generator may compute four ciphertexts (e.g., one for each gate input combination) using $l_y^0$, $l_y^1$, $l_z^0$, $l_z^1$ as encryption keys. Specifically, the generator may compute all four instances of $$E^k_{(l_y^{by}, l_z^{bz})}(l_k^{g(by,bz)}),$$

where g($b_y$, $b_z$) may represent the output of gate g on inputs $b_y$, $b_z$. These ciphertexts may create a "garbled" gate and may be forwarded to the evaluator.

To decrypt the gates and evaluate the circuit, the evaluator may need two input labels corresponding to the pair ($l_y^{by}$, $l_z^{bz}$) associated with the computation being carried. While intermediate wire labels may be computed as the output of preceding gates, input labels may be sent from the generator to the evaluator. The generator labels may be sent as-is, for example, because their values may not disclose whether they represent a 0 or a 1 bit value. However, the generator may not know the evaluator's input, and therefore may not directly send only the correct labels to the evaluator. As an alternative, the generator may send all evaluator labels to the generator. However, the evaluator may selectively use values different from the evaluator's true input in order to learn information about the generator's input by observing multiple outputs of function f(•, •). To address this issue, the generator and the evaluator may run an oblivious transfer ("OT") protocol instance for each of the evaluator's input bits. Specifically, the evaluator's input to each OT instance may be one of the evaluator's input bits, while the generator's input may be the two corresponding input labels. At the end of such a process, the evaluator may learn all the evaluator's input labels, while the generator may learn nothing.

The APSP may use a novel variant of the garbled circuit protocol, where the party acting as generator (e.g., user device 60a) may have two inputs (e.g., two biometric samples (e.g., the EBT as $\beta_y$ and the ABS as $\beta_z$)) of its matching function mf($\beta_y$, $\beta_z$), albeit at different points in time (e.g., respectively, during enrollment and during authentication), and where the party acting as the evaluator (e.g., node j) may have effectively no input. This may allow the APSP to remove the OT phase, which may typically account for a substantial portion of the computation and communication costs of a typical garbled circuit protocol. To achieve this, the evaluator's input labels may be stored (e.g., encrypted) on the network node. During authentication, the node may return the labels to the user's device, which may decrypt the input labels and select the appropriate subset of the labels based on the second input (e.g., the ABS as $\beta_z$). As a result, at this point, the node may receive all the information needed to compute the output of the authentication (e.g., the garbled circuit, the evaluator's input, and the generator's input).

As mentioned, the garbled circuit may be configured to compute a closeness or distance d between the two inputs $\beta_y$ and $\beta_z$ of its matching function mf($\beta_y$, $\beta_z$), such as the distance between biometric EBT as $\beta_y$ and biometric ABS as $\beta_z$, and then to compare the computed distance d with a threshold $\tau$. While the function may be configured to output a 1 when d<$\tau$, the garbled circuit may be configured to output a SUCCESS output that may be an encrypted version of "1" that may be set as a valid success key $ck_j$ when d<$\tau$, and while the function may be configured to output a 0 when d≥$\tau$, the garbled circuit may be configured to output a FAIL output that may be an encrypted version of "0" that may be set as null (e.g., a string of 0's) when d≥$\tau$. Thus, as described herein, an SMPC protocol of the APSP may configure a garbled circuit to output a valid success key $ck_j$ only if the ABS is close to (e.g., within a threshold distance of) the EBT because of the security properties of the garbled circuit protocol. As a result, a corrupted node may not be able to compute the valid success key $ck_j$ unless it interacts with a trusted device, and the authentication is successful. The matching or distance function that may be used may depend on the specific biometric modality of the EBT and ABS. For instance, Hamming distance may be used for iris scan biometrics, while Euclidean distance may be used for facial scan biometrics. The APSP may be configured to implement each distance function by simply providing an appropriate Boolean representation for circuit garbling and evaluation. During authentication, a node and the user device may jointly reconstruct the inputs for the garbled circuit, where the node may use the encrypted template that was established during enrollment, while the user device may collect and encrypt a new biometric sample for authentication. Upon receiving the encrypted sample from the user, the node can evaluate their copy of the garbled circuit. If the authentication is successful, the node may recover a different share of the seed, and sends it to the user device. Once the user has received a sufficient number of seed shares, the user device may reconstruct the seed. While Hamming distance may be a specific realization of Manhattan and Euclidean distances over a binary field, there is no reason to limit a matching function to any specific distance or even metric. The APSP may operate effectively as long as the matching function is able to determine the "topological" notion of closeness. For example, the matching function may be operative to make an evaluation as to whether or not the EBT and ABS are close (e.g., likely from the same user and/or from the same environment), whereby there may not need to be an explicitly computable "distance" between the EBT and ABS, but only an evaluation output indicative of whether or not the EBT and ABS are close.

Therefore, at operation 310, for generating new authentication circuit information $ACI_{Cid\_j}$ for node j, a garbled circuit $C_j$ may be generated with a CIT $K_j$ and a CIT $T_j$ for a matching function mf $\beta_y \times \beta_z \to \{FAIL, SUCCESS\}$, where each CIT may be a random string (e.g., an encrypted input table that may be instructions for the program to determine inputs).

At operation 312, the SUCCESS output (e.g., output label) of garbled circuit C) is determined and used to define a success key $ck_j$ (e.g., success key $ck_j$ may be set as equal to the SUCCESS output of garbled circuit C) (e.g., a string of bits of any suitable length)). For example, success key $ck_j$ may be generated as a part of circuit generation operation 310 by the user device. The whole circuit $C_j$ may be generated by the device, and success key $ck_j$ may be part of the circuit. Success key $ck_j$ may be a random symmetric cryptographic key generated by circuit $C_j$.

At operation 314, an inner key $k_j$ may be generated. Inner key $k_j$ may be generated independently of circuit $C_j$ (e.g., using any suitable randomness generation technique). Inner key $k_j$ may be a random symmetric cryptographic key generated by user device 60a.

At operation 316, inner key $k_j$ may be encrypted with public encryption key $pk_e$ to define encrypted key $\hat{k}_j$ (e.g., $\hat{k}_j = Epk_e(k_j)$). This may enable device 60a to securely communicate and store encrypted key $\hat{k}_j$ remotely (e.g., on node j rather than on device 60a) while also enabling device 60a to later retrieve that encrypted key $\hat{k}_j$ for re-accessing inner key $k_j$ (e.g., using private encryption key $sk_e$).

At operation 318, a subset of CIT $T_j$ may be selected to define a restricted CIT $T'_j$ that may be representative of EBT B. This may enable restricted CIT $T'_j$ to be an instantiation of EBT B. While CIT $T_j$ may be a table operative to connect input keys to input values, operation 318 may define CIT $T'_j$ by restricting or adjusting CIT $T_j$ by removing half of each input label (e.g., a 0 bit or a 1 bit) from all of the input labels of CIT $T_j$ based on each bit of EBT B. The user device may choose and/or restrict the input for the circuit (e.g., partition the input). This may allow user device 60a to secure (e.g., encrypt or otherwise protect) EBT B for entry by node 70 as an input into the circuit Cj without that node 70 being able to retrieve EBT B. or to replace EBT B by different input when evaluating circuit Cj.

At operation 320, CIT $K_j$ may be encrypted with inner key $k_j$ to define encrypted CIT $\hat{K}_j$ (e.g., $\hat{K}_j = Ek_j(K_j)$). While a subset of CIT $K_j$ may later be selected to define a restricted CIT $K'_j$ that may be representative of an ABS (e.g., at operation 432 of the authentication process 400 of FIGS. 4A-4C), such an operation is not yet ripe to occur during enrollment process 200, in which process 300 may be occurring, because such ABS has not yet been defined (e.g., user authentication biometrics have not yet been captured). Therefore, operation 320 may keep CIT $K_j$ as variable, but may encrypt CIT $K_j$ with inner key $k_j$ to define encrypted CIT $\hat{K}_j$, which may be shared with the evaluator node j during this enrollment process without enabling evaluator node j to access CIT $K_j$.

At operation 322, seed share $[s]_j$ may be doubly encrypted to define a doubly encrypted seed share $[\hat{\hat{s}}]_j$. For example, seed share $[s]_j$ may first be encrypted with inner key $k_j$ to define a singly encrypted seed share $[\hat{s}]_j$ (e.g., $[\hat{s}]_j = Ek_j([s]_j)$) for enabling a first layer of seed share encryption, and then singly encrypted seed share $[\hat{s}]_j$ may be encrypted with success key $ck_j$ to define doubly encrypted seed share $[\hat{\hat{s}}]_j$ (e.g., $[\hat{\hat{s}}]_j = Eck_j([\hat{s}]_j) = Eck_j(Ek_j([s]_j))$) for enabling a second layer of seed share encryption. Therefore, the seed share may first be encrypted with a key (e.g., inner key $k_j$) that may not be accessible to evaluator node j, and then that encrypted seed share may be encrypted with a key (e.g., success key $ck_j$) that may at some point (e.g., during the authentication phase) be made accessible to evaluator node j (e.g., if evaluator node j is able to have circuit $C_j$ return a SUCCESS output result (e.g., in response to a successful authentication)).

At operation 324, EBT share $[B]_j$ may be doubly encrypted to define a doubly encrypted EBT share $[\hat{\hat{B}}]_j$. For example, EBT share $[B]_j$ may first be encrypted with inner key $k_j$ to define a singly encrypted EBT share $[\hat{B}]_j$ (e.g., $[\hat{B}]_j = Ek_j([B]_j)$) for enabling a first layer of EBT share encryption, and then singly encrypted EBT share $[\hat{B}]_j$ may be encrypted with success key $ck_j$ to define doubly encrypted EBT share $[\hat{\hat{B}}]_j$ (e.g., $[\hat{\hat{B}}]_j = Eck_j([\hat{B}]_j) = Eck_j(Ek_j([B]_j))$) for enabling a second layer of EBT share encryption. Therefore, the EBT share may first be encrypted with a key (e.g., inner key $k_j$) that may not be accessible to evaluator node j, and then that encrypted EBT share may be encrypted with a key (e.g., success key $ck_j$) that may at some point (e.g., during the authentication phase) be made accessible to evaluator node j (e.g., if evaluator node j is able to have circuit $C_j$ return a SUCCESS output result (e.g., in response to a successful authentication)).

At operation 326, various elements generated during the generation of authentication circuit information $ACI_{Cid\_j}$ for each node j for new circuit identifier $C_{id}$ of operation 308, such as each one of circuit $C_j$ of operation 310, encrypted key $\hat{k}_j$ of operation 316, restricted CIT $T'_j$ of operation 318, encrypted CIT $\hat{K}_j$ of operation 320, doubly encrypted seed share $[\hat{\hat{s}}]_j$ of operation 322, and doubly encrypted EBT share $[\hat{\hat{B}}]_j$ of operation 324, may be signed with private device signing key $sk_d$ to define signatures $SVE_j$.

At operation 328, various elements (sensitive circuit generation information SCGI) generated during the generation of authentication circuit information $ACI_{Cid\_j}$ for each node j for new circuit identifier $C_{id}$ of operation 308 may be deleted from user device 60a. For example, such sensitive circuit generation information SCGI to be deleted from user device 60a at operation 328 may include seed share $[s]_j$ of operation 304, EBT share $[B]_j$ of operation 306, CIT Kj of operation 310, CIT Tj of operation 310, success key $ck_j$ of operation 312, and inner key $k_j$ of operation 314. Deletion of such SCGI from user device 60a during this enrollment process may prevent such information from being accessed by device 60a if device 60a were somehow compromised.

At operation 330, after each one of operations 310-328 of operation 308 has been completed for each node j of selected nodes n, a set of authentication circuit information $ACI_{Cid\_1, \ldots, n}$ for circuit identifier $C_{id}$ and nodes 1, . . . , a may be defined to include circuits $C_{1, \ldots, n}$ as generated by the n iterations of operation 310, encrypted keys $\hat{k}_{1, \ldots, n}$ as generated by the n iterations of operation 316, restricted CITs $T'_{1, \ldots, n}$ as generated by the n iterations of operation 318, encrypted CITs $\hat{K}_{1, \ldots, n}$ as generated by the n iterations of operation 320, doubly encrypted seed shares $[\hat{s}]_{1, \ldots, n}$ as generated by the n iterations of operation 322, doubly encrypted EBT shares $[\hat{B}]_{1, \ldots, n}$ as generated by the a iterations of operation 324, and signatures $SVE_{1, \ldots, n}$ as generated by the n iterations of operation 326. Such a set of authentication circuit information $ACI_{Cid\_1, \ldots, n}$ for circuit identifier $C_{id}$ may be eventually shared with and stored on respective nodes $70_{1, \ldots, n}$ for furthering the enrollment of user device 60a and its user U with the network nodes of the APSP. Process 300 may end after operation 330.

The operations shown in process 300 of FIG. 3 are only illustrative and that existing operations may be modified or omitted, additional operations may be added, and the order of certain operations may be altered.

FIG. 2A, FIG. 2B, and FIGS. 7A-7I (Continued)

After process 300, process 200 may resume at operation 224, where it may be determined if one or more additional sets of authentication circuit information ACI ought to be generated (e.g., by repeating process 300 one or more additional times for generating a new unique circuit identifier and associated authentication circuit information). However, once an appropriate number of sets of authentication circuit information ACI has been generated, process 200 may advance from operation 224 to operation 226. The APSP may be configured to have at least a threshold number of such sets of unique circuit identifier and associated circuit information available to a user device and its associated network nodes, because each authentication attempt may consume one such set, whereby a certain number of failed authentication attempts may render a user device unable to authenticate without re-enrolling.

At operation 226, each generated set of authentication circuit information $ACI_{Cid\_1, \ldots, n}$ for each unique circuit identifier $C_{id}$ may be sent as data 226d to respective nodes $70_{1, \ldots, n}$ for furthering the enrollment of user device 60a and its user U with the network nodes of the APSP. For example, each node j may be sent authentication circuit information $ACI_{Cid\_j}$ for each unique circuit identifier $C_{id}$ (e.g., circuit $C_j$ of each unique circuit identifier $C_{id}$, encrypted key $\hat{k}_j$ of each unique circuit identifier $C_{id}$, restricted CIT $T'_j$ of each unique circuit identifier $C_{id}$, encrypted CIT $\hat{K}_j$ of each unique circuit identifier $C_{id}$, doubly encrypted seed share $[\hat{s}]_j$ of each unique circuit identifier $C_{id}$, doubly encrypted EBT share $[\hat{B}]_j$ of each unique circuit identifier $C_{id}$, and signatures $SVE_j$ of each unique circuit identifier $C_{id}$).

At operation 228, each node j of nodes $70_{1, \ldots, n}$ may receive (e.g., as data 226d) its respective authentication circuit information $ACI_{Cid\_j}$ for each unique circuit identifier $C_{id}$, attempt to verify the signatures $SVE_j$ of the received authentication circuit information $ACI_{Cid\_j}$ for each unique circuit identifier $C_{id}$ using public device signing key $pk_d$ of earlier received data 208d, generate a verification acknowledgment $ack'_{CID\_j}$ that may be indicative of whether or not the node was able to verify the signatures $SVE_j$ of the received authentication circuit information $ACI_{Cid\_j}$ for each unique circuit identifier $C_{id}$ (e.g., confirm or deny such verification), and then the node may send that verification acknowledgment $ack'_{CID\_j}$ as at least a portion of data 228d back to user device 60a (e.g., according to application 79 of that particular node 70). This may enable the node to verify the signatures $SVE_j$ of the received authentication circuit information $ACI_{Cid\_j}$ for each unique circuit identifier $C_{id}$ using public device signing key $pk_d$ of user device 60a. If this verification is negative, the ACI would be rejected by the node and the node may even delete the stored keys $pk_u$ and $pk_d$.

At operation 230, user device 60a may receive and register verification acknowledgment $ack'_{CID\_j}$ of data 228d from one or each node j of nodes n for each unique circuit identifier $C_{id}$ (e.g., according to application 69 of user device 60a). If the received $ack'_{CID\_j}$ is indicative of a positive verification by node j for a particular unique circuit identifier $C_{id}$, then user device 60a may determine that its authentication circuit information $ACI_{Cid\_j}$ may be stored against its public keys $pk_u$ and $pk_d$ by node j, whereby user device 60a may be enabled to proceed with the enrollment of process 200 by advancing from operation 230 to operation 232. However, if the received $ack'_j$ is indicative of a negative verification by node j for a particular unique circuit identifier $C_{id}$, then user device 60a may determine that its authentication circuit information $ACI_{Cid\_j}$ may not be stored against its public keys $pk_u$ and $pk_d$ by node j, whereby user device 60a may be configured to repeat one or more of operations 224 and 226 for at least each node and each unique circuit identifier $C_{id}$ that provided such a negative verification.

Once a positive verification is registered by user device 60a for a node j for its respective authentication circuit information $ACI_{Cid\_j}$ for a unique circuit identifier $C_{id}$, process 200 may advance to operation 232, where user device 60a may generate & send a store/publish instruction $SPI_{CID\_j}$ as at least a portion of data 232d to that particular node j for instructing that node to storing its received authentication circuit information $ACI_{Cid\_j}$ for a unique circuit identifier $C_{id}$ with public keys $pk_u$ and $pk_d$, and for instructing that node to publish those public keys $pk_u$ and $pk_d$.

At operation 234, each node j of nodes $70_{1, \ldots, n}$ may receive (e.g., as data 232d) its respective store/publish instruction $SPI_{Cid\_j}$ for authentication circuit information $ACI_{Cid\_j}$ for a particular unique circuit identifier $C_{id}$, and, in response to such receipt, the node may store the received authentication circuit information $ACI_{Cid\_j}$ with the stored public keys $pk_u$ and $pk_d$ of user device 60a for enrolling user device 60a and its user U with the node, and the node may send the stored public keys $pk_u$ and $pk_d$ of user device 60a as at least a portion of data 234d to repository 80, and the node may generate an enrollment verification acknowledgment $ack''_{CID\_j}$ that may be indicative of that node fully enrolling the authentication circuit information $ACI_{Cid\_j}$ for a particular unique circuit identifier $C_{id}$ with the stored public keys of user device 60a, and then the node may send that verification acknowledgment $ack''_{CID\_j}$ as at least a portion of data 235$d$ back to user device 60$a$ (e.g., according to application 79 of that particular node 70).

At operation 236, repository 380 may receive data 234$d$ and store public keys pk$_u$ and pk$_d$ of user device 60$a$ (e.g., as a portion of data 89$d$ in repository memory 383).

At operation 238, user device 60$a$ may receive and register verification acknowledgment ack"$_{CID\_j}$ of data 235$d$ from one or each node j of nodes n for each unique circuit identifier C$_{id}$ (e.g., according to application 69 of user device 60$a$). If the received ack"$_{CID\_j}$ is indicative of a positive verification by node j for a particular unique circuit identifier C$_{id}$, then user device 60$a$ may determine that its authentication circuit information ACI$_{Cid\_j}$ has been stored against its public keys pk$_u$ and pk$_d$ by node j, and that its public keys pk$_u$ and pk$_d$ have been stored on repository 80 (if appropriate), whereby user device 60$a$ may be enabled to end the enrollment process 200. Ending enrollment process 200 may include confirming that no sensitive enrollment information SEI remains on device 60$a$. This may include deleting any or each of the following items of information SEI of each applicable node j for each applicable circuit identifier C$_{id}$ and/or for the entire enrollment process: user enrollment biometrics ueb of the enrollment process, seed s of the enrollment process, EBT B of the enrollment process, private user key sk$_u$ of the enrollment process, circuit C$_j$ of each one of the n-nodes of each unique circuit identifier C$_{id}$, encrypted CIT $\hat{K}_j$ of each one of the n-nodes of each unique circuit identifier C$_{id}$, restricted CIT T'$_j$ of each one of the n-nodes of each unique circuit identifier C$_{id}$, encrypted key $\hat{k}_j$ of each one of the n-nodes of each unique circuit identifier C$_{id}$, doubly encrypted seed share $[\hat{s}]_j$ of each one of the n-nodes of each unique circuit identifier C$_{id}$, doubly encrypted EBT share $[\hat{B}]_j$ of each one of the n-nodes of each unique circuit identifier C$_{id}$, and signatures SVE$_j$ of each one of the n-nodes of each unique circuit identifier C$_{id}$. This deletion of sensitive enrollment information SEI (e.g., at operation 238) and of sensitive circuit generation information SCGI (e.g., at operation 328 or otherwise (e.g., at operation 238)) from user device 60$a$ during this enrollment process may prevent such information from being accessed by device 60$a$ if device 60$a$ were somehow compromised after enrollment. Moreover, certain information, even before deletion, may never be provided to certain portions of memory 63 of user device 60$a$. For example, an APSP SDK of the client APS application 69$a$ of user device 60$a$ may retain at least seed s and EBT B and/or any other suitable data of the SEI and/or of the SCGI inside the APSP SDK and not allow such data to be provided to other portions of the APS application 69$a$ and/or to other applications of device 60$a$. The APSP SDK may be configured never to save such data to a permanent storage of device memory 63 (e.g., a flash memory portion of memory 63), but only in device volatile memory or otherwise of device memory 63 (e.g., a RAM portion of memory 63), and may be configured to overwrite such data with zeroes or otherwise delete such data (e.g., overwrite with 0's then overwrite with 1's then overwrite with random data) once the values are no longer necessary for the enrollment process (e.g., at operation 328 and/or operation 238). Ending enrollment process 200 may also include storing data indicative of each unique circuit identifier C$_{id}$ and its associated nodes 1, . . . n on enrolled user device 60$a$ (e.g., as a portion of data 69$d$ (e.g., in permanent storage (e.g., a flash memory portion of memory 63))) for later retrieval, at operation 406 and/or at operation 424 of process 400). Some of the keys generated at operation 206 (e.g., public user key pk$_u$ (but not private user key sk$_u$ of deleted sensitive enrollment information SEI), private device signing key sk$_d$ (with or without public device signing key pk$_d$, which may be computed using private device signing key sk$_d$), and private encryption key sk$_e$ (with or without public encryption key pk$_e$, which may be computed using private encryption key sk$_e$)), may also be stored on enrolled user device 60$a$ (e.g., as a portion of data 69$d$ (e.g., in permanent storage (e.g., a flash memory portion of memory 63))) before ending enrollment process 200. As shown, screens 700$f$-700$h$ of FIGS. 7F-7H may be provided by application 69 of user device 60$a$ during such enrollment, but screen 700$i$ of FIG. 7I may be presented when such enrollment is complete and confirmed (e.g., after operation 238), at which time a user may be presented with any suitable enrolled options (e.g., whether or not to enable push notifications from the APSP on the enrolled device). However, if the received ack"$_j$ is indicative of a negative verification by node j for a particular unique circuit identifier C$_{id}$, then user device 60$a$ may determine that its authentication circuit information ACI$_{Cid\_j}$ may not have been stored against its public keys pk$_u$ and pk$_d$ by node j, and/or that its public keys pk$_u$ and pk$_d$ have not been stored on repository 80 (if appropriate), whereby user device 60$a$ may be configured to repeat one or more of operations 222-232 for at least each node and each unique circuit identifier C$_{id}$ that provided such a negative verification. In some embodiments of a repository 80 (e.g., as a public blockchain), a user device may be able to independently verify if the public keys have been published to the repository.

The operations shown in process 200 of FIGS. 2A and 2B are only illustrative and that existing operations may be modified or omitted, additional operations may be added, and the order of certain operations may be altered. Much of enrollment process 200 may be carried out transparently to user U for providing a more seamless and efficient user experience. For example, operations 204-222 may be transparent to user U (e.g., between being presented with screen 700$a$ of FIG. 7A and being presented with screen 700$b$ of FIG. 7B). As another example, operations 222-238, including the entirety of one or more iterations of process 300, may be transparent to user U (e.g., between being presented with screen 700$f$ of FIG. 7F and being presented with screen 700$i$ of FIG. 7I).

FIGS. 4A-4C. FIGS. 7S7U, and FIG. 7W

FIGS. 4A-4C illustrate a flowchart of an exemplary process 400 for authenticating an enrolled APS user of an enrolled APS user device with the APSP. Process 400 is shown being implemented by APS user device 60$a$, its user U, a selection of nodes 70 (e.g., a number n of selected nodes 70 (e.g., nodes 70$a$, 70$b$, 70$c$, . . . , 70$n$)), and repository 80. However, process 400 may be implemented using any other suitable components or subsystems or entities of system 1 of FIG. 1 or otherwise. Process 400 may provide a seamless user experience for securely and efficiently authenticating an enrolled APS user U and its enrolled APS user device 60$a$ with the APSP. To facilitate the following discussion regarding the operation of system 1 for authenticating user U and its user device 60$a$ with the APSP according to process 400 of FIGS. 4A-4C, reference is made to various components of system 1 of the schematic diagrams of FIGS. 1-1F, and to screens 700$s$-700$u$ and 700$w$ that may be representative of a graphical user interface of APS user device 60$a$ during such a process (e.g., as shown in FIGS. 7S-7U and 7W). The operations described may be achieved with a wide variety of graphical elements and visual schemes. Therefore, the embodiments of FIGS. 7S-7U and 7W are not intended to be limited to the precise user interface conventions adopted herein. Rather, embodiments may include a wide variety of user interface styles.

Process 400 may begin at operation 402, where user U may initiate enrollment by carrying out any suitable authentication initiation interaction aii 402d with an APS application 69 that may be running on the user's enrolled APS user device 60a (e.g., a device that has been enrolled with the APSP (e.g., via process 200)). For example, as shown by screen 700s of FIG. 7S, the UI of APS device 60a may present selectable options "[YES]" and "[NO]" associated with a request to authenticate (e.g., authenticate for enabling a particular secure operation (e.g., accessing a particular service (e.g., a "B'Gock" service as particularly described with respect to FIGS. 5 and 6))), and the user may be enabled to select one of the options with its authentication initiation interaction aii in order to proceed with process 400 for authentication with the APSP. Such an authentication option presentation may be provided as a push notification (e.g., as may have been accepted by the user at screen 700i of an enrollment process) in response to the user device receiving any suitable request or challenge for enabling a particular secure operation that may be facilitated through authentication with the APSP. In advance of operation 402, APS application 69 may be accessed by device 60a in any suitable manner (e.g., as an app downloaded from APS subsystem 100 or any suitable app store or otherwise) and user U may first enroll itself and the device with the APSP (e.g., via process 200 of FIGS. 2A and 2B).

At operation 404, APS user device 60a may detect an affirmative authentication initiation interaction aii (e.g., an interaction indicative of an interest in initiating authentication) and, in response to such detection, user device 60a may access certain keys associated with the earlier device enrollment, including public user key $pk_u$ (e.g., as may be stored in memory 63 of device 60a) and public device signing key $pk_d$ (e.g., as may be stored in memory 63 of device 60a or as may be computed using private device signing key $sk_d$ as may be stored in memory 63 of device 60a). These keys may then be used (e.g., during operations 406-418) to authenticate device 60a with the nodes of the APSP (e.g., similarly to operations 208-218 of enrollment process 200, but perhaps through signing using different private device keys).

At operation 406, APS device 60a may send public user key $pk_u$ and public device signing key $pk_d$ as data 406d to each node j of a selected set of nodes n (e.g., each node 70 of nodes 70a, . . . , 70n) of system 1 (e.g., according to application 69), where information indicative of that set of nodes n may have been stored on the device during enrollment (e.g., at operation 238). For example, a particular available stored circuit identifier may be identified at operation 406 and the set of nodes n stored for that identifier (e.g., at operation 238) may be used. A single user and/or a single APS user device may be enrolled with multiple different sets of nodes, and the user might have to choose a particular one of the multiple sets for a particular authentication process (e.g., using a particular circuit identifier).

At operation 408, each node j of selected nodes n may receive data 406d from user device 60a and may then make a determination (e.g., according to application 79 of that particular node 70) whether the public user key $pk_u$ and public device signing key $pk_d$ of data 208d have already been verified (e.g., at operation 216 of enrollment process 200) by making an internal determination through review of any suitable node data 79d of that particular node j at operation 408, and/or whether the public user key $pk_u$ and public device signing key $pk_d$ of data 208d have already been and remain stored together at repository 80 (e.g., at operation 236 of enrollment process 200) by sending the keys and a repository request as data 408d to repository 80 and then receiving by data 408d' from repository 80 a verification that those same public keys have already been and remain stored together at repository 80 (e.g., based on any suitable receive and verify operation 410 by repository 80). If either one or both of such an internal verification at the node and such a repository verification by the repository is an affirmative verification of an existing link between keys $pk_u$ and $pk_d$ as provided by data 406d, then the node may enable the advancement of process 400 from operation 408 to operation 412, otherwise process 400 may fail or be reverted back to a re-enrollment process of the device with the node.

At operation 412, each node j may generate a challenge $l_j$ (e.g., a partially random data structure) for the public keys received and verified at operation 408, and then the node may send that challenge $l_j$ as at least a portion of data 412d back to user device 60a (e.g., according to application 79 of that particular node 70).

At operation 414, user device 60a may receive challenge $l_j$ of data 412d from one or each of nodes n, generate a challenge response $l_j\sigma_{skd}$ for each received challenge $l_j$ by signing that challenge $l_j$ with the device's private device signing key $sk_d$ (e.g., challenge response $l_j\sigma_{skd}=\text{Sign}_{skd}(l_j)$), and then send that challenge response $l_j\sigma_{skd}$ back to the appropriate node j as at least a portion of data 414d (e.g., according to application 69 of user device 60a).

At operation 416, one, some, or each node j of selected nodes n may receive data 414d from user device 60a, attempt to verify the public device signing key $pk_d$ of earlier received data 406d using the challenge response $l_j\sigma_{skd}$ of recently received data 414d, generate a verification acknowledgment $ver_j$ that may be indicative of whether or not the node was able to verify the public device signing key $pk_d$ (e.g., confirm or deny verification), and then the node may send that verification acknowledgment $ver_j$ as at least a portion of data 416d back to user device 60a (e.g., according to application 79 of that particular node 70). This may enable the node to verify whether or not public device signing key $pk_d$ is indeed the public device signing key of user device 60a and/or whether a processing error may have occurred on the node and/or on the user device and/or whether an attempt to authenticate as the user is being attempted by an attacker.

At operation 418, user device 60a may receive and register verification acknowledgment $ver_j$ of data 416d from one or each node j of nodes n (e.g., according to application 69 of user device 60a). If the received verification acknowledgment $ver_j$ is indicative of a positive verification by node j, then user device 60a may determine that its public keys $pk_u$ and $pk_d$ have been received, stored, and verified by that particular node, which may be indicative of the device being authenticated, whereby user device 60a may be enabled to proceed further with the authentication of process 400 (e.g., to operations 420/422 (e.g., for authenticating the user of the device)). While operations 208-218 of the enrollment process may enable each node to verify that device 60a is in possession of private user key $sk_u$ (e.g., a counterpart to public user key $pk_u$) for allowing enrollment, operations 406-418 of the authentication process may enable each node to verify that device 60a is in possession of private device signing key $sk_d$ (e.g., a counterpart to public device signing key $pk_d$) for satisfying a first of at least two forms of authentication (e.g., a device authentication of at least two forms of authentication that may also include a user authentication). For example, the APSP may be configured to require that an enrolled user authenticate its enrolled user device with the APSP (e.g., at operations 406-418 (e.g., a first factor authentication)) and that an enrolled user provide its biometric template to authenticate the user itself with the APSP (e.g., at operations 422-438 (e.g., a second factor authentication)), which may be a form of two factor authentication, before enabling the user device to reconstruct its seed s and/or its EBT B. However, if the received verification acknowledgment $ver_j$ is indicative of a negative verification by node j, then user device 60a may determine that its public keys $pk_u$ and $pk_d$ have not been received, stored, and verified by that particular node, which may be indicative of the device not being authenticated, whereby user device 60a may be configured to repeat operations 404-418 for at least each node that provided such a negative verification of its challenge or to re-enroll the device (e.g., at process 200).

Once a positive verification is registered by user device 60a for a sufficient number (e.g., number m) of nodes j of selected nodes n at operation 418, process 400 may advance to operation 420, where user U may present user authentication biometrics uab (e.g., as user authentication biometric identifier information or user authentication biometric information 420d) to user device 60a by carrying out any suitable user biometrics authentication interaction with device 60a, which may be configured to capture such authentication biometrics uab for generating an authentication biometric sample ("ABS") b at operation 422 (e.g., according to APS application 69). For example, as shown by screen 700t of FIG. 7T, the UI of APS device 60a may present instructions on how the user ought to present user authentication biometrics uab to user device 60a for capture. For example, similarly to as shown by one or more of screens 700c-700e of FIGS. 7C-7E, while the user's face (not shown) may be in the line of sight of a device camera sensor, device 60a may instruct the user to look left, then eventually look straight at the camera, and then eventually look right (e.g., as shown in FIG. 7T). This may enable device 60a to capture user authentication biometrics uab in the form of a video or photograph sequence of the user's face rotating. This may enable "liveness" detection of the user (e.g., as may instructing the user to carry out any other suitable action while biometrics are captured, such as winking with one eye then with the other eye, or smiling then frowning, or saying a word or phrase, etc.). This may help prevent spoofing and/or capturing biometrics of an unwilling user. Just as any suitable enrollment biometrics ueb of a user may be captured in any suitable manner(s) by any suitable sensor(s) of user device 60a at operation 222 in response to a user presenting itself to the user device in any suitable manner(s) at operation 220 of enrollment process 200, any suitable authentication biometrics uab of a user may be captured in any suitable manner(s) by any suitable sensor(s) of user device 60a at operation 422 in response to a user presenting itself to the user device in any suitable manner(s) at operation 420 of authentication process 400 (e.g., according to an APS application of the APS user device). Moreover, just as any suitable EBT B may be generated in any suitable manner(s) using any suitable enrollment biometrics ueb at operation 222 of enrollment process 200, any suitable ABS b may be generated in any suitable manner(s) using any suitable authentication biometrics uab at operation 422 of authentication process 400 (e.g., according to an APS application of the APS user device). As mentioned, operation 222 may use any suitable neural network(s) to process captured ueb for defining EBT B. Similarly, operation 422 may use any suitable neural network(s) to process captured uab for defining ABS b, where such neural network(s) used at operation 422 may be the same as or different than the neural network(s) used at operation 222. However, the manner in which enrollment biometrics are captured may differ in any suitable way(s) from the manner in which the authentication biometrics are captured (e.g., the amount of information captured (e.g., the quality or resolution of the capture) may be less for the ABS than for the EBT). For example, this may help ensure high quality of an enrollment template and, as such, less false rejects and false accepts during authentications, while the differences can include, but are not limited to, amount of data captured, possible additional/different collaboration from the user, possible quality checks and repeated capture of data, other processing techniques, and/or the like.

At operation 424 (if not previously at operation 406), user device 60a may then identify (e.g., according to APS application 69) a stored unique circuit identifier $C_{id}$ and its associated set of nodes n (e.g., as may be stored in a list on device 60a (e.g., in local permanent storage) at operation 238 of enrollment process 200 and/or at operation 452 of an earlier iteration of authentication process 400). This may be done at random from all available circuit identifiers. The identified unique circuit identifier $C_{id}$ may then be sent as at least a portion of data 424d to each node j of the nodes n associated with that unique circuit identifier $C_{id}$ and then that identified and shared unique circuit identifier $C_{id}$ may be removed from device 60a (e.g., that identified and shared unique circuit identifier $C_{id}$ may be removed from the stored list such that the same circuit identifier $C_{id}$ may not be selected again for use in another authentication attempt at another iteration of operation 424 of authentication process 400).

At operation 426, each node j of nodes $70_{1, \ldots, n}$ may receive (e.g., as data 424d) the identified and shared unique circuit identifier $C_{id}$, identify the respective authentication circuit information $ACI_{Cid\_j}$ of that unique circuit identifier $C_{id}$ as previously received and stored on that node j (e.g., as previously received and stored in memory 73 of the node at operations 228/234 of enrollment process 200 and/or at operation 450 of an earlier iteration of authentication process 400), and then return certain elements of that identified authentication circuit information $ACI_{Cid\_j}$ as at least a portion of data 426d to user device 60a, where such elements may include encrypted CIT $\hat{K}_j$ and encrypted key $\hat{k}_j$ (e.g., according to node application 79).

At operation 428, user device 60a may receive data 426d including encrypted CIT $\hat{K}_j$ and encrypted key $\hat{k}_j$ from one or each node j of nodes n and then obtain inner key $k_j$ by decrypting encrypted key $\hat{k}_j$ as received from each node j using the device's private encryption key $sk_e$ (e.g., according to APS application 69).

At operation 430, user device 60a may obtain CIT $K_j$ by decrypting encrypted CIT $\hat{K}_j$ as received from each node j using the obtained inner key $k_j$ (e.g., according to APS application 69).

At operation 432, a subset of obtained CIT $K_j$ may be selected to define a restricted CIT $K'_j$ that may be representative of ABS b (e.g., according to APS application 69). This may enable restricted CIT $K'_j$ to be an instantiation of ABS b. While CIT $K_j$ may be a table operative to connect input keys to input values, operation 432 may define CIT $K'_j$ by restricting or adjusting CIT $K_j$ by removing half of each input label (e.g., a 0 bit or a 1 bit) from all of the input labels of CIT $K_j$ based on each bit of ABS b. The user device may choose and/or restrict the input for the circuit (e.g., partition the input). This may allow user device 60a to secure (e.g., encrypt or otherwise protect) ABS b for entry by node 70 as an input into the circuit Cj without that node 70 being able to retrieve ABS b, or to replace ABS b by different input when evaluating circuit Cj. Operation 432 may also include user device 60a sending each restricted CIT $K'_j$ to its respective node j as at least a portion of data 432d.

At operation 434, each node j of nodes $70_1, \ldots, _n$ may receive (e.g., as data 432d) restricted CIT $K'_j$ and then use that restricted CIT $K'_j$ with restricted CIT $T'_j$ of the particular authentication circuit information $ACI_{Cid\_j}$ as previously received and stored on that node j (e.g., as previously received and stored in memory 73 of the node at operations 228/234 of enrollment process 200 and/or at operation 450 of an earlier iteration of authentication process 400) to evaluate circuit L of the particular authentication circuit information $ACI_{Cid\_j}$ (e.g., as previously received and stored in memory 73 of the node at operations 228/234 of enrollment process 200 and/or at operation 450 of an earlier iteration of authentication process 400). As mentioned, the circuit $C_j$ may be configured to compute a closeness or distance d between the two inputs $\beta_y$ and $\beta_z$ of its matching function mf($\beta_y$, $\beta_z$), such as the distance between EBT B as $\beta_y$ and ABS b as $\beta_z$ and then to compare the computed distance d with a threshold τ, but while using restricted CIT $K'_j$ and restricted CIT $K'_j$ as the respective inputs to the circuit $C_j$ for following the SMPC protocol. While the function may be configured to output a 1 when d<τ, the garbled circuit may be configured to output a SUCCESS output that may be an encrypted version of "1" that may be set as a valid success key $ck_j$ when d<τ, and while the function may be configured to output a 0 when d≥τ, the garbled circuit may be configured to output a FAIL output that may be an encrypted version of "0" that may be set as null (e.g., a string of 0's) when d≥τ. Thus, as described herein, an SMPC protocol of the APSP may configure a garbled circuit to output a valid success key $ck_j$ only if ABS b is close to (e.g., within a threshold distance of) EBT B because of the security properties of the garbled circuit protocol.

At operation 436, each node j of nodes $70_1, \ldots, _n$ may determine if its evaluation of operation 434 resulted in a SUCCESS output or a FAIL output. If a FAIL output is determined, then the node may return an authentication failure response (not shown) to user device 60a that may be used by user device 60a to repeat one, some, or each one of operations 420-432 with another stored circuit identifier $C_{id}$ or to carry out any other suitable operations. However, if a SUCCESS output is determined, then valid success key $ck_j$ may be revealed to the node and the node may use that valid success key $ck_j$ at operation 436 to decrypt doubly encrypted seed share $[\hat{\hat{s}}]_j$ of the particular authentication circuit information $ACI_{Cid\_j}$ as previously received and stored on that node j (e.g., as previously received and stored in memory 73 of the node at operations 228/234 of enrollment process 200 and/or at operation 450 of an earlier iteration of authentication process 400) for revealing singly encrypted seed share [ŝ]j. Moreover, if a SUCCESS output is determined, then valid success key $ck_j$ may be revealed to the node and the node may use that valid success key $ck_j$ at operation 436 to decrypt doubly encrypted EBT share $[\hat{\hat{B}}]_j$ of the particular authentication circuit information $ACI_{Cid\_j}$ as previously received and stored on that node j (e.g., as previously received and stored in memory 73 of the node at operations 228/234 of enrollment process 200 and/or at operation 450 of an earlier iteration of authentication process 400) for revealing singly encrypted EBT share $[\hat{B}]_j$. Then, the node may send the revealed singly encrypted seed share $[\hat{s}]_j$ and the revealed singly encrypted EBT share $[\hat{B}]_j$ as at least a portion of data 436d to user device 60a. Therefore, obtaining a SUCCESS evaluation result from a garbled circuit for revealing a valid success key may enable one layer of seed share decryption and/or one layer of EBT share decryption on the node (e.g., a layer that would not be enabled on the user device). At operation 436, the node may then delete its particular authentication circuit information $ACI_{Cid\_j}$ for the particular circuit identifier $C_{id}$ just used, in order to avoid jeopardizing certain security considerations, unless doing so would delete the only remaining authentication circuit information $ACI_{Cid\_j}$ on the node, otherwise re-enrollment may then be required.

At operation 438, user device 60a may receive singly encrypted seed share $[\hat{s}]_j$ and singly encrypted EBT share $[\hat{B}]_j$ from received data 436d from each node j, obtain each seed share $[s]_j$ by decrypting each singly encrypted seed share $[\hat{s}]_j$ from each node j of nodes n with obtained inner key $k_j$, and obtain each EBT share $[B]_j$ by decrypting each singly encrypted EBT share $[\hat{B}]_j$ from each node j of nodes n with obtained inner key $k_j$. Therefore, by only enabling inner key $k_j$ to be accessible by user device 60a, another layer of seed share decryption and/or another layer of EBT share decryption may be enabled on device 60a (e.g., a layer that would not be enabled on the node).

At operation 440, user device 60a may reconstruct seed s by combining at least m seed shares $[s]_j$ obtained at operation 438 (e.g., when the APSP is using a (m, n) threshold secret sharing scheme), reconstruct EBT B by combining at least m EBT shares $[B]_j$ obtained at operation 438 (e.g., when the APSP is using a (m, n) threshold secret sharing scheme), which may be carried out using any suitable secret sharing technique(s)/protocol(s), including, but not limited to Shamir's secret sharing, blind signature protocol, threshold combining, and/or the like, and then using the reconstructed seed s for carrying out any suitable secure operation SO, such as using the reconstructed seed s to derive a secret key of a third party service that may be registered with the APSP (e.g., as described with respect to FIGS. 5 and 6). If less than m seed shares $[s]_j$ are obtained at operation 438 (e.g., if less than m evaluations result in SUCCESS at operation 434), then the number of obtained seed shares may not be adequate for enabling the user device to reconstruct its seed. Similarly, if less than m EBT shares $[B]_j$ are obtained at operation 438 (e.g., if less than m evaluations result in SUCCESS at operation 434), then the number of obtained EBT shares may not be adequate for enabling the user device to reconstruct its EBT and, for example, process 400 may restart from operation 420. As shown, screen 700u of FIG. 7U may be provided by application 69 of user device 60a during such authentication (e.g., after operation 422), but screen 700w of FIG. 7W may be presented when such authentication is complete and confirmed (e.g., after operation 440), at which time process 400 may advance to operations 442/444. While reconstructed EBT B may not be used for carrying out the secure operation SO, reconstructed EBT B may be used for generating one or more new sets of authentication circuit information ACI (e.g., at least to replace the authentic circuit information for the unique circuit identifier $C_{id}$ used at operations 424-440 (e.g., as described with respect to operations 446-452)). Moreover, when EBT B is reconstructed or recovered at operation 440, that EBT B has been determined by the APSP to match successfully with ABS b generated at operation 422, such that APS user device 60a may be configured to use that EBT B and that ABS b to improve (e.g., train or otherwise adjust)

any suitable model(s) on APS user device 60a (e.g., without having to share such sensitive biometric data with any remote entities (e.g., APS subsystem 100, etc.), including, but not limited to, any suitable model(s) of any suitable neural network(s) that may be used at operation 222 for processing captured ueb, any suitable model(s) of any suitable neural network(s) that may be used at operation 422 for processing captured uab, and/or the like.

At operation 442, a user U may initiate a biometrics update by carrying out any suitable biometrics update interaction bui 442d with an APS application 69 that may be running on the user's and authenticated APS user device 60a (e.g., a device that has been authenticated with the APSP (e.g., via operations 402-440 of process 400)). Although not shown, the UI of APS device 60a may present selectable options "[YES]" and "[NO]" associated with a request to update EBT B of the authenticated user (e.g., as reconstructed at operation 440), and the user may be enabled to select one of the options with its biometrics update interaction bui in order to proceed with process 400. If the user chooses to update EBT B, then operation 444 may include the device enabling the user to choose to capture new user enrollment biometrics for defining a new EBT B (e.g., similar to operations 220 and 222) and after defining that new EBT B, operation 444 may delete all remaining unique circuit identifiers $C_{ids}$ from device 60a as they may now be unassociated with the new EBT B, and then operation 444 may advance to operation 446 with that new EBT B. As another example, if the user chooses to update EBT B, then operation 444 may include the device enabling the user to choose to replace or modify existing EBT B using existing ABS b (e.g., as captured at operation 422) and after defining that new EBT B using the ABS b, operation 444 may delete all remaining unique circuit identifiers $C_{ids}$ from device 60a as they may now be unassociated with the new EBT B and then operation 444 may advance to operation 446 with that new EBT B. As another example, if the user chooses not to update EBT B, then operation 444 may advance to operation 446 with that same EBT B. Such a potential template update may allow the APSP to keep tight thresholds, because the template may be representative of user variations over time such as aging, growing a beard, different haircuts, and/or the like.

At operation 446, user device 60a may then generate one or more new sets of authentication circuit information ACI on seed s (e.g., as reconstructed at operation 440) and EBT B (e.g., whatever EBT B may be passed from operation 444, whether it may be unchanged, modified by ABS b, replaced by ABS b, or a completely newly defined EBT B, etc.) for the selected nodes n using secure multi-party computation (e.g., according to application 69). Operation 446 may be carried out similarly to operation 224 of process 200 but with a potentially different EBT B.

At operation 448, each generated new set of authentication circuit information $ACI_{Cid\_1, \ldots, n}$ for each new unique circuit identifier $C_{id}$ may be sent as a portion data 448d to respective nodes $70_1, \ldots,$ for storing each new set of authentication circuit information $ACI_{Cid\_1, \ldots, n}$ with publication keys $pk_u$ and $pk_d$ for enabling additional authentication attempts by the enrolled user and device in the future. For example, each node j may be sent new authentication circuit information $ACI_{Cid\_j}$ for each new unique circuit identifier $C_{id}$ (e.g., circuit $C_j$ of each new unique circuit identifier $C_{id}$, encrypted key $k_j$ of each new unique circuit identifier $C_{id}$, restricted CIT $T'_j$ of each new unique circuit identifier $C_{id}$, encrypted CIT $\hat{K}_j$ of each new unique circuit identifier $C_{id}$, doubly encrypted seed share $[\hat{s}]_j$ of each new unique circuit identifier $C_{id}$, doubly encrypted EBT share $[\hat{B}]_j$ of each new unique circuit identifier $C_{id}$, and signatures $SVE_j$ of each new unique circuit identifier $C_{id}$).

At operation 450, each node j of nodes $70_1, \ldots, n$ may receive (e.g., as data 448d) its respective new authentication circuit information $ACI_{Cid\_j}$ for each new unique circuit identifier $C_{id}$ and may store the received new authentication circuit information $ACI_{Cid\_j}$ with the stored public keys $pk_u$ and $pk_d$ of user device 60a with the node, and the node may generate a storage confirmation acknowledgment $cnf_{CID\_j}$ that may be indicative of that node fully enrolling the authentication circuit information $ACI_{Cid\_j}$ for each new particular unique circuit identifier $C_{id}$ with the stored public keys of user device 60a, and then the node may send that storage confirmation acknowledgment $cnf_{CID\_j}$ as at least a portion of data 450d back to user device 60a (e.g., according to application 79 of that particular node 70).

At operation 452, user device 60a may receive and register storage confirmation acknowledgment $cnf_{CID\_j}$ of data 450d from one or each node j of nodes n for each new unique circuit identifier $C_{id}$ (e.g., according to application 69 of user device 60a). If the received storage confirmation acknowledgment $cnf_{CID\_j}$ is indicative of a positive storage by node j for a particular new unique circuit identifier $C_{id}$, then user device 60a may determine that its new authentication circuit information $ACI_{Cid\_j}$, has been stored against its public keys $pk_u$ and $pk_d$ by node j, whereby user device 60a may be enabled to end process 400. Ending process 400 may include confirming that no sensitive authentication information SAI remains on device 60a. This may include deleting any or each of the following items of information SAI of each applicable node j for each applicable new circuit identifier $C_{id}$ and/or for the entire authentication process: user authentication biometrics uab of the authentication process, reconstructed seed s of the authentication process, reconstructed or new EBT B of the authentication process, ABS b of the authentication process, private user key $sk_u$ (although private user key $sk_u$ is usually not reconstructed during the authentication process), circuit C of each one of the n-nodes of each new unique circuit identifier $C_{id}$, encrypted CIT $\hat{K}_j$ of each one of the n-nodes of each new unique circuit identifier $C_{id}$, restricted CIT $T'_j$ of each one of the n-nodes of each new unique circuit identifier $C_{id}$, encrypted key $\hat{k}_j$ of each one of the n-nodes of each new unique circuit identifier $C_{id}$, doubly encrypted seed share $[\hat{s}]_j$ of each one of the n-nodes of each new unique circuit identifier $C_{id}$, doubly encrypted EBT share $[\hat{B}]_j$, of each one of the n-nodes of each new unique circuit identifier $C_{id}$, and signatures $SVE_j$ of each one of the n-nodes of each new unique circuit identifier $C_{id}$. This deletion of sensitive authentication information SAI (e.g., at operation 452) and of sensitive new circuit generation information SCGI (e.g., at operation 328 of operation 446 or otherwise (e.g., at operation 452)) from user device 60a during this authentication process may prevent such information from being accessed by device 60a if device 60a were somehow compromised after this authentication process. Moreover, certain information, even before deletion, may never be provided to certain portions of memory 63 of user device 60a. For example, an APSP SDK of the client APS application 69a of user device 60a may retain at least reconstructed seed s and reconstructed EBT B and/or any other suitable data of the SAI and/or of the SCGI inside the APSP SDK and not allow such data to be provided to other portions of the APS application 69a and/or to other applications of device 60a.

The APSP SDK may be configured never to save such data to a permanent storage of device memory 63 (e.g., a flash memory portion of memory 63), but only in device volatile memory or otherwise of device memory 63 (e.g., a RAM portion of memory 63), and may be configured to overwrite such data with zeroes or otherwise delete such data once the values are no longer necessary for the authentication process (e.g., at operation 328 of operation 446 and/or operation 452). Ending authentication process 400 may also include storing data indicative of each new unique circuit identifier $C_{id}$ and its associated nodes 1, . . . n on authenticated user device 60a (e.g., as a portion of data 69d (e.g., in permanent storage (e.g., a flash memory portion of memory 63))) for later retrieval (e.g., at operation 406 and/or at operation 424 of a later iteration of authentication process 400). Some of the keys that may be used by process 400 (e.g., public user key $pk_u$ (but not private user key $sk_u$ potentially of deleted sensitive enrollment information SAI), private device signing key $sk_d$ (with or without public device signing key $pk_d$, which may be computed using private device signing key $sk_d$), and private encryption key $sk_e$ (with or without public encryption key $pk_e$, which may be computed using private encryption key $sk_e$)), may also be stored on user device 60a (e.g., as a portion of data 69d (e.g., in permanent storage (e.g., a flash memory portion of memory 63))) before ending authentication process 400. However, if the received storage confirmation acknowledgment $cnf_{CID\_j}$ is indicative of a negative (e.g., failed) storage by node j for a particular new unique circuit identifier $C_{id}$, then user device 60a may determine that its new authentication circuit information $ACI_{Cid\_j}$ may not have been stored against its public keys $pk_u$ and $pk_d$ by node j, whereby user device 60a may be configured to repeat one or more of operations 444-452 for at least each node and each unique circuit identifier $C_{id}$ that provided such a negative confirmation acknowledgment.

Therefore, the APSP may use a novel variant of the garbled circuit protocol, where the party acting as generator (e.g., user device 60a) may have two inputs (e.g., two biometric samples (e.g., EBT B as $\beta_y$ and ABS b as $\beta_z$)) of its matching function $mf(\beta_y, \beta_z)$, albeit at different points in time (e.g., respectively, during APS enrollment (e.g., at operations 222-226 of process 200) and during APS authentication (e.g., at operations 422-432 of process 400)), and where the party acting as the evaluator (e.g., node j) may have effectively no input. This may allow the APSP to remove one, some, or each one of the OT phase(s), which may typically account for a substantial portion of the computation and communication costs of a typical garbled circuit protocol. To achieve this, the evaluator's input labels may be stored (e.g., encrypted) on the network node. During APS authentication, the node may return the labels to the user's device, which may decrypt the input labels and select (e.g., at operation 432) the appropriate subset of the labels based on the second input (e.g., ABS b as $\beta_z$). As a result, at this point, the node may receive all the information needed to compute the output of the authentication (e.g., the garbled circuit, the evaluator's input, and the generator's input). Therefore, such APS enrollment and APS authentication of the APSP of processes 200-400 may be much faster than common SMPC techniques. For example, compared to standard garbled circuits, the APSP may remove OT, which may be very computationally demanding. In some common garbled circuit evaluation, oblivious transfer may be used to restrict a CIT. However, the APSP may instead restrict each CIT on an APS user device (e.g., CIT $T_j$ to CIT $T'_j$ for EBT B at operation 318 of operation 224 on APS user device 60a (e.g., during an APS enrollment process 200) and CIT K to CIT $K'_j$ for ABS b at operation 432 on APS user device 60a (e.g., during a later APS authentication process 400)). This modification may be made possible due to the fact that EBT B may be known to APS user device 60a while constructing circuit $C_j$, while such an input is not known in advance in some common garbled circuit evaluation protocols, and/or due to the fact that ABS b may be known to APS user device 60a while attempting to authenticate APS user device 60a and its user U. Therefore, the APSP may enable increased speed by removing OT through reduction of each one of input tables T and K on an APS user device directly (e.g., albeit at different phases of the protocol) without running the OT protocol.

For any particular circuit identifier $C_{id}$, the matching function, the EBT, and the ABS used in an iteration of operations 422-440 may be the same for all nodes, while the representation of the matching function in the form of circuit $C_j$ on each node, the representation of EBT B as $T_j$ on each node, and the representation of ABS b as $K_j$ or $K'_j$ on each node used in an iteration of operations 422-440 may be different and unrelated for each node. Despite each node having a different circuit and different inputs, the result of each node's matching function (e.g., SUCCESS or FAIL) will be the same for a given EBT, ABS, and circuit identifier $C_{id}$, yet the success key that may be revealed by such a successful result may differ between nodes.

APS authentication process 400 may allow for various features of the CPBA (e.g., authentication circuit information ACI (e.g., garbled circuit(s) and associated success key(s))) to be refreshed, rotated, rolled, or otherwise updated after a successful authentication. Whether or not EBT B may be updated at operation 444, at least the recovered and/or reconstructed seed s from operation 440 as a result of a successful authentication may be used to enable the generation of one or more new sets of authentication circuit information ACI at operation 446, which may then be used to replace (e.g., at operation 450) the old set of authentication circuit information ACI that was just used to enable the successful authentication. Therefore, the CPBA may be updated while securely maintaining the same seed s, if not also maintaining the same EBT B. Therefore, after deleting seed s and EBT B from APS user device 60a at the end of an APS enrollment phase (e.g., at operation 238) or at the end of an APS authentication phase (e.g., at operation 452), a new APS authentication phase may enable recovery or reconstruction of that deleted seed s and EBT B through successful evaluation of garbled circuit(s) of a first set of authentication circuit information ACI, and that recovered or reconstructed seed s and EBT B may then be used to generate a second set of authentication circuit information ACI that may then be used for a future APS authentication phase (e.g., authentication circuit information ACI may be rolled or otherwise updated on one or more nodes in response to authentication circuit information ACI enabling recovery or reconstruction of a secure seed s). This may essentially enable the APSP to send a message to itself in the future.

The operations shown in process 400 of FIGS. 4A-4C are only illustrative and that existing operations may be modified or omitted, additional operations may be added, and the order of certain operations may be altered. Much of authentication process 400 may be carried out transparently to user U for providing a more seamless and efficient user experience. For example, operations 404-422 may be transparent to user U (e.g., between being presented with screen 700s of FIG. 7S and being presented with screen 700t of FIG. 7T). As another example, operations 422-440 may be transparent to user U (e.g., between being presented with screen 700u of FIG. 7U and being presented with screen 700w of FIG. 7W). In some embodiments, the success of an authentication may not be disclosed to the user. In some embodiments, the success of an authentication may not be shared by the node with the user device.

As mentioned, one or more nodes 70 and/or repository 80 may be operative to store any suitable data for associating an APS user identifier with an APS device identifier (e.g., for enrolling a public user key $pk_u$ with a public device signing key $pk_d$, (e.g., at operation 210 and/or at operation 236 of an APS enrollment process for a user of a first APS user device 60a)). However, two or more different APS user devices (e.g., first APS user device 60a and second APS user device 60b) may be enrolled with the APSP for a single user (e.g., a single user persona (e.g., a single EBT B)). For example, after the enrollment of user U and first APS user device 60a of process 200, during which public user key $pk_u$ of user U and public device signing keys $pk_d$ of first APS user device 60a may be enrolled with the APSP by storing those public keys together (e.g., on one or more nodes 70 at operation 210 and/or on a repository 80 at operation 236) and verifying that first APS user device 60a has access to private user key $sk_u$ as the counterpart to public user key $pk_u$ (e.g., at operation 216) and generating and storing one or more sets of authentication circuit information ACI for an EBT B of user U on one or more nodes 70 (e.g., at operations 222-238), user U and second APS user device 60b may be enrolled with the APSP. Therefore, second APS user device 60b may then be enabled to authenticate second APS user device 60b with the APSP using the same EBT B from the enrollment of first user device 60a and an ABS b that may be captured during the authentication using second APS user device 60b (e.g., at operations 402-418 when carried out by second APS user device 60b rather than by first APS user device 60a).

In some embodiments, different encrypted EBT shares need not be stored on different nodes but may instead be stored on one particular node (e.g., a more favored or more trusted node). For example, a first doubly encrypted EBT share of an EBT B may be used along with a first circuit to partially define first ACI for a particular circuit identifier $C_{id}$ and that first ACI may be shared with a first node, while a second doubly encrypted EBT share of the same EBT B may be used along with a second circuit to partially define second ACI for the same particular circuit identifier $C_{id}$ and that second ACI may be shared with the same first node, such that, during an APS authentication phase, the APS user device may identify that particular circuit identifier $C_{id}$ (e.g., at operation 424) and make two different restricted CITs K', one for each of the first and second ACIs, and send both of those first and second restricted CITs K' to the same first node (e.g., at operation 432). Then, the first circuit of the first ACI may be successfully evaluated using the first restricted CIT K' for revealing a first success key that may be used to decrypt the first doubly encrypted EBT share, while the second circuit of the second ACI may be successfully evaluated using the second restricted CIT K' for revealing a second success key that may be used to decrypt the second doubly encrypted EBT share, such that both the first and second singly encrypted EBT shares may then be sent back from the same node to the APS user device. Therefore, operation 308 may be carried out two or more times for a single node. As another example, a single success key may be used to encrypt and decrypt multiple EBT shares provided to a single node, where each one of a first doubly encrypted EBT share of an EBT B and a second doubly encrypted EBT share of the same EBT B may be used along with a circuit to partially define ACI for a particular circuit identifier $C_{id}$ and that ACI may be shared with a node, such that, during an APS authentication phase, the APS user device may identify that particular circuit identifier $C_{id}$ (e.g., at operation 424) and make a single restricted CIT K' for the ACI, and send that restricted CIT K' to the same node (e.g., at operation 432). Then, the circuit of the ACI may be successfully evaluated using the restricted CIT K' for revealing a success key that may be used to decrypt each one of the first doubly encrypted EBT share and the second doubly encrypted EBT share, such that both the first and second singly encrypted EBT shares may then be sent back from the same node to the APS user device. Therefore, operation 324 of operation 308 may be carried out two or more times for a single node, while operation 436 may be carried out two or more times for a single operation 434. Alternatively, in some embodiments, EBT B need not be split into two or more EBT shares (e.g., at operation 304) before being encrypted and stored on one or more nodes. Instead, the entire EBT B may be doubly encrypted with an inner key and a success key (e.g., at operation 322) and the doubly encrypted EBT may be stored as a portion of authentication circuit information ACI on one or more nodes, such that a successful evaluation by such a node may decrypt the doubly encrypted EBT with a revealed success key and send the singly encrypted EBT as encrypted by the inner key back to the APS user device. This may obviate the need for any reconstruction of EBT shares, but may enable the APS user device to recover the EBT simply through decrypting an encrypted EBT provided by a node. Alternatively, in some embodiments, besides using an EBT B to select a subset of a CIT T to make a restricted CIT T' (e.g., at operation 318) that may define a portion of authentication circuit information ACI to be stored and used by one or more nodes 70, such an EBT B need not be stored in any form on any nodes. For example, neither a doubly encrypted EBT nor any doubly encrypted EBT shares need be stored on any nodes, such that no node needs to singly encrypt any such doubly encrypted EBT or doubly encrypted EBT share with a revealed success key, such that no APS user device needs to recover or reconstruct an EBT during an APS authentication phase. Although this may prevent the APS user device from accessing (e.g., at operation 440) an enrolled EBT during an APS authentication phase (e.g., the enrolled EBT with which an ABS may be evaluated during the APS authentication phase), which may prevent the APS user device from using such an enrolled EBT for generating one or more new sets of authentication circuit information ACI, process 400 may still allow for the APS user device to replace the enrolled EBT with a new EBT (e.g., at operation 444) before using such a new EBT for generating one or more new sets of authentication circuit information ACI (e.g., at operation 446).

In some embodiments, different encrypted seed shares need not be stored on different nodes but may instead be stored on one particular node (e.g., a more favored or more trusted node). For example, a first doubly encrypted seed share of a seed s may be used along with a first circuit to partially define first ACI for a particular circuit identifier $C_{id}$ and that first ACI may be shared with a first node, while a second doubly encrypted seed share of the same seed s may be used along with a second circuit to partially define second ACI for the same particular circuit identifier $C_{id}$ and that second ACI may be shared with the same first node, such that, during an APS authentication phase, the APS user device may identify that particular circuit identifier $C_{id}$ (e.g., at operation 424) and make two different restricted CITs K', one for each of the first and second ACIs, and send both of those first and second restricted CITs K' to the same first node (e.g., at operation 432). Then, the first circuit of the first ACI may be successfully evaluated using the first restricted CIT K' for revealing a first success key that may be used to decrypt the first doubly encrypted seed share, while the second circuit of the second ACI may be successfully evaluated using the second restricted CIT K' for revealing a second success key that may be used to decrypt the second doubly encrypted seed share, such that both the first and second singly encrypted seed shares may then be sent back from the same node to the APS user device. Therefore, operation 308 may be carried out two or more times for a single node. As another example, a single success key may be used to encrypt and decrypt multiple seed shares provided to a single node, where each one of a first doubly encrypted seed share of a seed s and a second doubly encrypted seed share of the same seed s may be used along with a circuit to partially define ACI for a particular circuit identifier $C_{id}$ and that ACI may be shared with a node, such that, during an APS authentication phase, the APS user device may identify that particular circuit identifier $C_{id}$ (e.g., at operation 424) and make a single restricted CIT K' for the ACI, and send that restricted CIT K' to the same node (e.g., at operation 432). Then, the circuit of the ACI may be successfully evaluated using the restricted CIT K' for revealing a success key that may be used to decrypt each one of the first doubly encrypted seed share and the second doubly encrypted seed share, such that both the first and second singly encrypted seed shares may then be sent back from the same node to the APS user device. Therefore, operation 322 of operation 308 may be carried out two or more times for a single node, while operation 436 may be carried out two or more times for a single operation 434. Alternatively, in some embodiments, seed s need not be split into two or more seed shares (e.g., at operation 304) before being encrypted and stored on one or more nodes. Instead, the entire seed s may be doubly encrypted with an inner key and a success key (e.g., at operation 322) and the doubly encrypted seed may be stored as a portion of authentication circuit information ACI on one or more nodes, such that a successful evaluation by such a node may decrypt the doubly encrypted seed with a revealed success key and send the singly encrypted seed as encrypted by the inner key back to the APS user device. This may obviate the need for any reconstruction of seed shares, but may enable the APS user device to recover the seed simply through decrypting an encrypted seed provided by a node. Alternatively, in some embodiments, seed s need not be stored in any form on any nodes or recovered or reconstructed on the APS user device based on any data received at the APS user device from one or more nodes. Instead, any success key(s) that may be revealed through any successful evaluation(s) on one or more nodes (e.g., at operation 434) may then be used by the one or more nodes for carrying out a secure operation SO. As just one example, the success key (or success keys) that may be revealed by one or more nodes (e.g., at operation 434 for an APS authentication phase) may be used as different small pieces of a secret, which may be used to perform a secure operation directly by the node(s) or by any other suitable entity.

FIG. 5 and FIGS. 7J-7P

FIG. 5 illustrates a flowchart of an exemplary process 500 for registering a third party service with an enrolled APS user of an enrolled APS user device. Process 500 is shown being implemented by user U, its APS user device 60a, a TPS user device 60c, TP subsystem 90, a selection of nodes 70 (e.g., a number n of selected nodes 70 (e.g., nodes 70a, 70b, 70c, . . . , 70n)), and repository 80. However, process 500 may be implemented using any other suitable components or subsystems or entities of system 1 of FIG. 1 or otherwise. Process 500 may provide a seamless user experience for securely and efficiently registering a third party service of TP subsystem 90 with enrolled APS user device 60a and its enrolled APS user U via TPS user device 60c. To facilitate the following discussion regarding the operation of system 1 for registering the third party service of TP subsystem 90 with enrolled APS user device 60a and its enrolled APS user U via TPS user device 60c according to process 500 of FIG. 5, reference is made to various components of system 1 of the schematic diagrams of FIGS. 1-1F, and to screens 700j-700p that may be representative of a graphical user interface of enrolled APS user device 60a or TPS user device 60c during such a process (e.g., as shown in FIGS. 7J-7P). The operations described may be achieved with a wide variety of graphical elements and visual schemes. Therefore, the embodiments of FIGS. 7J-7P are not intended to be limited to the precise user interface conventions adopted herein. Rather, embodiments may include a wide variety of user interface styles.

Process 500 may begin at operation 502, where user U may initiate a third party ("TP") service action enrollment by carrying out any suitable TP service action tpsa 502d with a third party service ("TPS") application that may be running on a user's TPS user device 60c, which may be the same as enrolled APS user device 60a or may be a different device that may not be enrolled with (or even may not be able to enroll with) the APSP but may nevertheless be used by user U to interact with a third party subsystem 90 that may benefit from the enrollment/authentication of the APSP. For example, as shown by screen 700j of FIG. 7J, the UI of TPS device 60c may present a "LOG-IN" option for user U to log-into a TPS (e.g., a TPS website that may be managed or under the control of a third party subsystem 90a (e.g., a "B'Gock Service" subsystem)) with its TP service action tpsa in order to proceed with process 500 for registering the TPS with an enrolled APS user of an enrolled APS user device 60a. In advance of operation 502, a TPS application 69 may be accessed by TPS device 60c in any suitable manner (e.g., as an app downloaded from any suitable app store or as a website via any suitable web browser or otherwise) and user U may carry out any suitable account set-up operations with respect to the TPS and the TPS application for enabling the user to log-in at operation 502 (e.g., using a <user name> and <password> as shown in FIG. 7J).

At operation 504, the TPS application that may be running on TPS user device 60c may be operative to receive and send TP service action tpsa data 502d on to TP subsystem 90 (e.g., a server of the "B'Gock Service") as at least a portion of TP service action tpsa data 504d. At operation 506, TP subsystem 90 may be operative to receive and process TP service action tpsa data 504d in order to determine any APSP availability for the TPS at operation 508. For example, TP subsystem 90 may be operative to determine that it may enable user U to register the TPS with the APSP (e.g., using any suitable code provided to TP subsystem 90 by APS subsystem 100 or otherwise). In response to such a determination, TP subsystem 90 may be operative to send associated APSP availability ("apspa") data 508d back to TPS user device 60c at operation 508. In response to receiving such apspa data 508d, TPS user device 60c (e.g., in accordance with its TPS application) may be operative to present any suitable apspa information for the TPS to user U. For example, as shown by screen 700k of FIG. 700K, the TPS application may present any suitable options that may be available to the user with respect to potentially registering the TPS with the APSP, such as "REGISTER SERVICE USING ENABLED DEVICE" (e.g., register the TPS using another device that is APS enabled) or "GET THE APP" (e.g., obtain an APSP app on this device for enabling this device for APS and registering the TPS with the APSP on this device) or "SKIP THIS STEP" (e.g., do not register the TPS with the APSP). Although operations 504-510 may include communicating data to and from TP subsystem 90 that may handle some of the processing, the functionality of these operations may alternatively be carried out entirely on TPS user device 60c running a TPS application in an offline mode (e.g., without relying on any processing of a TPS server).

At operation 512 user U may initiate any suitable APSP registration for the TPS while interfacing with the TPS application that may be running on TPS user device 60c by carrying out any suitable APSP registration with action apspr 512d. For example, as mentioned and as shown by screen 700k of FIG. 700K, the UI of TPS device 60c may present at operation 510 any suitable options that may be available to the user with respect to potentially registering the TPS with the APSP, and the user may choose one of the options with data 512d at operation 512, such as "REGISTER SERVICE USING ENABLED DEVICE" (e.g., register the TPS using another device that is APS enabled).

At operation 514, the TPS application that may be running on TPS user device 60c may be operative to receive and send APSP action apspr 512d on to TP subsystem 90 (e.g., a server of the "B'Gock Service") as at least a portion of APSP action apspr data 514d. At operation 516, TP subsystem 90 may be operative to receive and process APSP action apspr data 514d in order to determine any appropriate APS device registration ("apsdr") information as aspdr data 518d for the TPS at operation 518. For example, TP subsystem 90 may be operative to determine that it may enable user U to register the TPS with the APSP on an enrolled APS device that is not TPS user device 60c by generating information that may be transferable from TPS user device 60c to an enrolled APS user device 60a in any suitable manner for enabling such registration. For example, a QR code or any other suitable information may be presented on device 60c as apspr data 520d at operation 520, in response to receiving associated apsdr data 518d sent from TP subsystem 90 at operation 518, and then captured by APS user device 60a at operation 524 (e.g., with the help of user U at operation 522 (e.g., screen 700l of FIG. 7L may be presented by TPS device 60c at operation 520 with such a QR code, screen 700m of FIG. 7M may be presented by an enrolled APS device 60a at operation 524 (e.g., in response to user U selecting a "register new service" option provided by the APSP application that may be running on enrolled user device 60a (e.g., after operation 238)) that may allow the user to affirmatively choose to register a new service on the APSP using enrolled APS device 60a, then screen 700n of FIG. 7N may be presented by APS device 60a instructing the user how to aid in the registration at operation 524 by capturing the QR code being presented by TPS device 60c)). In other embodiments the information of apspr data 520d provided by the QR code may be sent directly from TPS device 60c to APS device 60a or from TP subsystem 90 to APS device 60a without requiring the user to help with the communication. Such apspr data 520d may include any suitable data indicative of the TPS and/or of the user's account with the TPS (e.g., the account logged into by user U at operations 502-506).

At operation 524, in response to receiving such apspr data 520d, enrolled APS user device 60a may process such data and determine how to enable the requested registration. For example, in response operation 524, APS user device 60a may be operative to generate a TPS keypair ($sk_t$, $pk_t$) at operation 526. For example, a private TPS key $sk_t$ may be generated as a random integer of any suitable size (e.g., 256 bits) and then a counterpart public TPS key $pk_t$ to private TPS key $sk_t$ may also be generated in any suitable manner (e.g., for providing random TPS keypair ($sk_t$, $pk_t$)), such as where private TPS key $sk_t$ may be used as a private key for a signature scheme, such as EdDSA or ECDSA, and the corresponding public counterpart is public TPS key $pk_t$ (e.g., $pk_t = sk_t \times G$, where G may be the elliptic curve base point in the case of ECDSA). Moreover, at operation 526, APS user device 60a may encrypt private TPS key $sk_t$ with public user key $pk_u$ to derive encrypted private TPS key $\widetilde{sk}_t$ (e.g., $\widetilde{sk}_t = Epk_u(sk_t)$) and then, at operation 526, APS user device 60a may delete private TPS key $sk_t$, such that the only way in which APS user device may regain access to private TPS key $sk_t$ may be to regain access to private user key $sk_u$ (e.g., the counterpart of public user key $pk_u$) for decrypting encrypted private TPS key $\widetilde{sk}_t$ by reconstructing seed s through authentication with the APSP. At operation 528, APS user device 60a may store encrypted private TPS key $\widetilde{sk}_t$ with at least a portion of apspr data 520d for associating the stored encrypted private TPS key $\widetilde{sk}_t$ with the TPS and user U's account therewith. In some embodiments, encrypted private TPS key $\widetilde{sk}_t$ may be stored with at least a portion of apspr data 520d directly on APS user device 60a (e.g., at operation 528). Additionally or alternatively encrypted private TPS key $\widetilde{sk}_t$ may be stored with at least a portion of apspr data 520d on one or more nodes 70 of the APSP (e.g., at operation 530 via data 530d from user device 60a). Additionally or alternatively encrypted private TPS key $\widetilde{sk}_t$ may be stored with at least a portion of apspr data 520d on repository 80 (e.g., at operation 532 via data 532d from user device 60a). Then, at operation 534, APS user device 60a may send public TPS key $pk_t$ with at least a portion of apspr data 520d as apsrc data 534d to TP subsystem 90, where such data may also be indicative of enrolled APS user device 60a. Finally, at operation 534, APS user device 60a may provide confirmation of the registration of the TPS with the APSP (e.g., by presenting screen 700o of FIG. 7O).

At operation 536, TP subsystem 90 may receive apsrc data 534d and then store on TP subsystem 90 public TPS key $pk_t$ of apsrc data 534d in association with at least a portion of apspr data 520d of apsrc data 534d or some other data associated therewith. Therefore, any suitable data indicative of the TPS and/or of the user's account with the TPS (e.g., the account logged into by user U at operations 502-506) may be stored on TP subsystem 90 along with public TPS key $pk_t$, while such data indicative of the TPS and/or of the user's account with the TPS may also be stored on enrolled APS user device 60a and/or node(s) 70 and/or repository 80 of the APSP. At operation 538, TP subsystem 90 may determine and send a confirmation of the APSP registration of the TPS achieved at operation 538 as apscr data 538d to TPS user device 60c, which may then receive and process such data for presenting to the user a confirmation of such APSP registration of the TPS (e.g., by presenting screen 700p of FIG. 7P). Process 500 may end after the APSP registration of the TPS has been confirmed to the user via one or both of devices 60a and 60c. Although operations 514-520 may include communicating data to and from TP subsystem 90 that may handle some of the processing, the functionality of these operations may alternatively be carried out entirely on TPS user device 60c running a TPS application in an offline mode (e.g., without relying on any processing of a TPS server). Although operations 536-540 may include communicating data to and from TP subsystem 90 that may handle some of the processing, the functionality of these operations may alternatively be carried out entirely on TPS user device 60c running a TPS application in an offline mode (e.g., without relying on any processing of a TPS server).

The operations shown in process 500 of FIG. 5 are only illustrative and that existing operations may be modified or omitted, additional operations may be added, and the order of certain operations may be altered. Much of registration process 500 may be carried out transparently to user U for providing a more seamless and efficient user experience. For example, operations 504-510 may be transparent to user U (e.g., between being presented with screen 700j of FIG. 7J and being presented with screen 700k of FIG. 7K). As another example, operations 514-534 may be transparent to user U (e.g., between being presented with screen 700k of FIG. 7K and being presented with screen 700o of FIG. 7O). As another example, operations 514-540 may be transparent to user U (e.g., between being presented with screen 700k of FIG. 7K and being presented with screen 700p of FIG. 7P (e.g., except for potentially operation 522 and FIGS. 7L-7N in some embodiments)). Process 500 may be repeated for registering various third party services (e.g., of a single or various third party subsystems) with a single user persona of the APSP (e.g., a single enrolled EBT B of a particular user). For example, a single user U may open multiple distinct user accounts with the B'Gock service, each of which may be registered with a single APSP persona of that user. Additionally or alternatively, a single user U can enroll multiple user personas on the APSP (e.g., by repeating process 200 with different keypairs and a different EBT B).

FIG. 6 and FIGS. 7O-7W

FIG. 6 illustrates a flowchart of an exemplary process 600 for authenticating an enrolled APS user of an enrolled APS user device with a registered third party service using the APSP. Process 600 is shown being implemented by user U, its APS user device 60a, a TPS user device 60c, TP subsystem 90, a selection of nodes 70 (e.g., a number n of selected nodes 70 (e.g., nodes 70a, 70b, 70c, . . . , 70n)), and repository 80. However, process 600 may be implemented using any other suitable components or subsystems or entities of system 1 of FIG. 1 or otherwise. Process 600 may provide a seamless user experience for securely and efficiently authenticating enrolled APS user U of enrolled APS user device 60a with a registered third party service of TP subsystem 90 using the APSP via TPS user device 60c. To facilitate the following discussion regarding the operation of system 1 for authenticating enrolled APS user U of enrolled APS user device 60a with a registered third party service of TP subsystem 90 using the APSP via TPS user device 60c according to process 600 of FIG. 6, reference is made to various components of system 1 of the schematic diagrams of FIGS. 1-1F, and to screens 700q-700w that may be representative of a graphical user interface of enrolled APS user device 60a or TPS user device 60c during such a process (e.g., as shown in FIGS. 7Q-7W). The operations described may be achieved with a wide variety of graphical elements and visual schemes. Therefore, the embodiments of FIGS. 7Q-7W are not intended to be limited to the precise user interface conventions adopted herein. Rather, embodiments may include a wide variety of user interface styles.

Process 600 may begin at operation 602, where user U may initiate a registered TPS authentication ("rtpsa") by carrying out any suitable rtps action rtpsa 602d with a third party service ("TPS") application that may be running on a user's TPS user device 60c, which may be the same as enrolled APS user device 60a or may be a different device that may not be enrolled with (or even may not be able to enroll with) the APSP but may nevertheless be used by user U to interact with a third party subsystem 90 that may benefit from the enrollment/authentication of the APSP. For example, as shown by screen 700q of FIG. 7Q, the UI of TPS device 60c may present a "LOG-IN" option for user U to log-into a registered TPS (e.g., a TPS website that may be managed or under the control of a third party subsystem 90a (e.g., a "B'Gock Service" subsystem) as may have been registered during process 500) with its RTPS action ripsa in order to proceed with process 600 for authenticating an enrolled APS user of an enrolled APS user device with the registered TPS using the APSP. Unlike screen 700j of FIG. 7J that may be presented by an unregistered TPS, screen 700q of FIG. 7Q of the registered TPS may only require the user to enter a <user name> but not also a password.

At operation 604, the TPS application that may be running on TPS user device 60c may be operative to receive and send RTPS action rtpsa data 602d on to TP subsystem 90 (e.g., a server of the registered "B'Gock Service") as at least a portion of RTPS action rtpsa data 604d. At operation 606, TP subsystem 90 may be operative to receive and process RTPS action rtpsa data 604d in order to determine any APSP data that may be available for the registered TPS (e.g., to identify public TPS key $pk_t$ as stored in association with at least a portion of apspr data 520d that may be indicative of the currently logged in account of the registered service and an enrolled APS user device of that user). In response to such processing, TP subsystem 90 may determine that it ought to generate and send a challenge to an enrolled APS user device associated with that APSP data (e.g., enrolled APS user device 60a). Then, at operation 608, TP subsystem 90 may generate a challenge $t_j$ and any suitable APS device authentication information ("apsdi") and then send that challenge $t_j$ and the apsdi to the enrolled APS user device 60a as data 608d, where such apsdi may include any suitable information, such as information indicative of the registered and currently logged-in TPS by user U. Additionally, after operation 608, TP subsystem 90 may determine and send a status update of the TPS authentication at operation 610 to TPS user device 60c using apsas data 610d. At operation 612, TPS user device 60c may receive and process apsas data 610d and then present an update of the TPS authentication to the user (e.g., screen 70r of FIG. 7R may be presented by TPS user device 60c at operation 612 to indicate to the user that TPS user device 60c and the TPS itself are awaiting authentication approval from the APSP (e.g., for enrolled APS user device 60a)).

At operation 614, enrolled APS user device 60a may receive and process challenge $t_j$ and the apsdi of data 608d, which may include user device 60a (e.g., according to an APS application 69a running thereon) that it must regain access to private TPS key $sk_t$ in order to properly respond to challenge $t_j$ from the registered service and that, in order to do so, it must reconstruct seed s. Therefore, at operation 616, enrolled APS user device 60a may attempt to obtain seed s for handling challenge $t_j$. Such an operation 616 may include enrolled APS user device 60a carrying out at least a portion of authentication process 400 (e.g., operations 402-440, which may involve nodes 70 and repository 80) that enables enrolled APS user device 60a to reconstruct seed s. (e.g., as shown by screens 700s-700u of FIGS. 7S-7U, enrolled APS user device 60a may present information for enabling the user to attempt to reconstruct seed s). Then, once seed s has been reconstructed by enrolled APS user device 60a, device 60a may access encrypted private TPS key $\widehat{sk}_t$ (e.g., from memory local to device 60a or from one or more nodes 70 or from repository 80) and then derive private TPS key $sk_t$ from accessed encrypted private TPS key $\widehat{sk}_t$ using reconstructed seed s. Particularly, in some embodiments, this may involve device 60a regaining access to private user key $sk_u$ (e.g., the counterpart of public user key $pk_u$) for decrypting encrypted private TPS key $\widehat{sk}_t$ with private user key $sk_u$, which may involve device 60a regenerating private user key $sk_u$ using reconstructed seed s and constant c (e.g., private user key $sk_u$=HMAC$_s$(c)). Then, once user device 60a has derived private TPS key $sk_t$ from accessed encrypted private TPS key $\widehat{sk}_t$ using reconstructed seed s at operation 618, device 60a may generate a challenge response $\sigma_{skt}$ ($t_j$) by signing the received challenge $t_j$ with the derived private TPS key $sk_t$, and then sending that challenge response $\sigma_{skt}$ to TP subsystem 90 as at least a portion of data 620d at operation 620. Although not shown, operation 620 may then also include deleting any suitable sensitive data from user device 60a, including, but not limited to, reconstructed seed s, private user key $sk_u$, any biometrics, any seed shares, any biometric shares, any suitable circuit information, and/or the like for providing additional security to the system.

At operation 622, TP subsystem 90 may receive and attempt to verify challenge response $\sigma_{skt}$ of data 620d using stored public TPS key $pk_t$ (e.g., as stored at operation 536 of registration process 500) in order to authenticate the TPS for user U (e.g., according to an APS application 99 that may be running on TP subsystem 90). If verification of challenge response $\sigma_{skt}$ is successful, TP subsystem 90 may authenticate TPS for user U (e.g., grant access to the TPS (e.g., grant access to the B'Gock service provided by TPS user device 60c)) and send a confirmation of such TPS authentication to TPS user device 60c as apsac data 622d, which may be received and processed by TPS user device 60c in order to present confirmation of the TPS authentication to the user at operation 624 (e.g., screen 700v of FIG. 7V may be presented by TPS user device 60c for indicating that the user has been authenticated with the TPS (e.g., the secure operation of granting a user access to the third party service has been achieved using a reconstructed seed s via the APSP)). Moreover, TP subsystem 90 may send a confirmation of such TPS authentication to APS user device 60a as apsac data 623d, which may be received and processed by APS user device 60a in order to present confirmation of the TPS authentication to the user at operation 626 (e.g., screen 700w of FIG. 7W may be presented by APS user device 60a for indicating that the user has been authenticated with the TPS (e.g., the secure operation of granting a user access to the third party service has been achieved using a reconstructed seed s via the APSP)). Although operations 604-612 may include communicating data to and from TP subsystem 90 that may handle some of the processing, the functionality of these operations may alternatively be carried out entirely on TPS user device 60c running a TPS application in an offline mode (e.g., without relying on any processing of a TPS server). Although operations 622 and 624 may include communicating data to and from TP subsystem 90 that may handle some of the processing, the functionality of these operations may alternatively be carried out entirely on TPS user device 60c running a TPS application in an offline mode (e.g., without relying on any processing of a TPS server). This is but just one example of how a reconstructed seed s may be used by an enrolled APS user device to enable a secure operation SO of any suitable service (e.g., a third party service or any other suitable service), such as to encrypt or decrypt a hard drive of the enrolled APS user device (e.g., using a new symmetric key or a key pair that may be derived from (e.g., anchored under) seed s), which may not involve a TPS user device or TP subsystem 90, or to carry out a secure operation with a blockchain and/or user wallet (e.g., signing a Bitcoin transaction), and/or the like.

As another particular example, TP subsystem 90 may be operative to manage a user's booking of a hotel room and enabling secure entry into that hotel room using the APSP. For example, during process 500, TPS user device 60c may be any suitable device that user U may interface with for booking a hotel room for a particular date (e.g., any device operative to run an app or website of a travel agency or hotel management entity, which may be APS user device 60a or a distinct different device) and/or registering that user's hotel booking or that user's hotel booking service account with that user's enrollment with the APSP. Then, during process 600, TPS user device 60c may be any suitable device that user U may interface with for gaining access to the booked hotel room on the particular date (e.g., a smart doorknob or lock that may be operative to automatically unlock and grant access to a hotel room if the user may be authenticated by the APSP). For example, at operations 602 and 604, user U may utilize APS user device 60a to communicate data 602d with such a TPS user device 60c (e.g., using NFC or Bluetooth or any other suitable communication path), which may indicate that the user is present outside the hotel room and would like to authenticate with the hotel booking service, and then APS user device 60a may be provided with a challenge by TP subsystem 90, and APS user device 60a may be operative to carry out a secure operation in response to such a challenge through authenticating with the APSP, where the secure operation may include providing a challenge response that may be utilized by TP subsystem 90 for unlocking the door to the hotel room using TPS user device 60c (e.g., the smart doorknob).

As another particular example, TP subsystem 90 may be operative to track a user's location (e.g., for confirming that a user is doing its designated tasks (e.g., that a security guard is checking various locations throughout a shift)) using the APSP. For example, during process 500, TPS user device 60c may be any suitable device that user U may interface with for registering with a tracking service and/or registering that tracking service with that user's enrollment with the APSP. Then, during process 600, TPS user device 60c may be any suitable device that user U may interface with for proving that the user U was located near that TPS user device 60c (e.g., a beacon (e.g., a Bluetooth low energy beacon transmitter device) that may be operative to communicate data indicative of the beacon and/or its location as well a time at which that data was communicated)). For example, at operations 602 and 604, user U may utilize APS user device 60a to communicate data 602d with such a TPS user device 60c (e.g., using NFC or Bluetooth or any other suitable communication path), which may request beacon data from the TPS user device and/or beacon data may be automatically (e.g., periodically) communicated by TPS user device 60c and received by APS user device 60a (e.g., as data 608d). In response to receiving such a challenge (e.g., timestamped beacon data), APS user device 60a may be operative (e.g., at operations 614-620) to sign such a challenge with a private TPS key ski, and then store that signed challenge as unmodifiable information (e.g., on repository 80 (e.g., on a public blockchain)). This may be used for facilitating a secure operation, as the TP subsystem may then utilize that stored signed challenge (e.g., by confirming the signature with its public TPS key $pk_t$) for securely determining that the user authenticated with the APSP to prove that APS user device 60a and user U received the challenge and thus was proximate beacon TPS user device 60c at the time of the timestamp.

The operations shown in process 600 of FIG. 6 are only illustrative and that existing operations may be modified or omitted, additional operations may be added, and the order of certain operations may be altered. For example, operations 604-612 may be transparent to user U (e.g., between being presented with screen 700q of FIG. 7Q and being presented with screen 700r of FIG. 7R). As another example, operations 604-616 may be transparent to user U (e.g., between being presented with screen 700q of FIG. 7Q and being presented with screen 700s of FIG. 7S). As another example, operations 618-624 may be transparent to user U (e.g., between being presented with screen 700t of FIG. 7T and being presented with screen 700v of FIG. 7V). As another example, operations 618-626 may be transparent to user U (e.g., between being presented with screen 700t of FIG. 7T and being presented with screen 700w of FIG. 7W).

In some embodiments, a TPS keypair ($sk_t$, $pk_t$) may be generated (e.g., at operation 526 of process 500) using seed s. For example, operation 526 of process 500 may include APS user device 60a first attempting to obtain seed s (e.g., similarly to operation 616 (e.g., through at least a portion of APS authentication process 400)), and then generating the TPS keypair using that obtained seed s. Then, operation 618 of process 600 may use the seed obtained at operation 616 to regenerate at least a portion of that TPS keypair for enabling any suitable operation 620 that may be operative to enable any suitable secure operation.

In some embodiments, rather than generating an EBT B based on captured user enrollment biometrics ueb (e.g., as user enrollment biometric identifier information or user enrollment biometric information, which may be indicative of a user's physiological and/or behavioral characteristics, as captured by one or more suitable sensors of the APS user device (e.g., at operation 222), the EBT B may additionally or alternatively be generated during an APS enrollment process based on any suitable enrollment device environmental data that may be captured by any suitable sensors of the APS user device as indicative of any suitable characteristic(s) of the device environment and/or that may be provided to the APS user device from any suitable third party source. Moreover, rather than generating an ABS b based on captured user authentication biometrics uab (e.g., as user authentication biometric identifier information or user authentication biometric information, which may be indicative of a user's physiological and/or behavioral characteristics, as captured by one or more suitable sensors of the APS user device (e.g., at operation 422), the ABS b may additionally or alternatively be generated during an APS authentication process based on any suitable authentication device environmental data that may be captured by any suitable sensors of the APS user device (e.g., concurrently with any captured user authentication biometrics uab) as indicative of any suitable characteristic(s) of the device environment. Therefore, the success or failure of any evaluation of EBT B and ABS b (e.g., at operation 434) may be based on a determined closeness between the enrollment device environmental data of the EBT B and the authentication device environmental data of the ABS b (if not also on a determined closeness between the user enrollment biometrics ueb of the EBT B and the user authentication biometrics uab of the ABS b). Such environmental data may be any suitable data indicative of any suitable characteristic(s) of the environment of the APS user device, including, but not limited to, location, temperature, air quality, light quality, sound quality, altitude, data captured by wireless sensor(s), and/or the like.

FIG. 8

Figure 8:
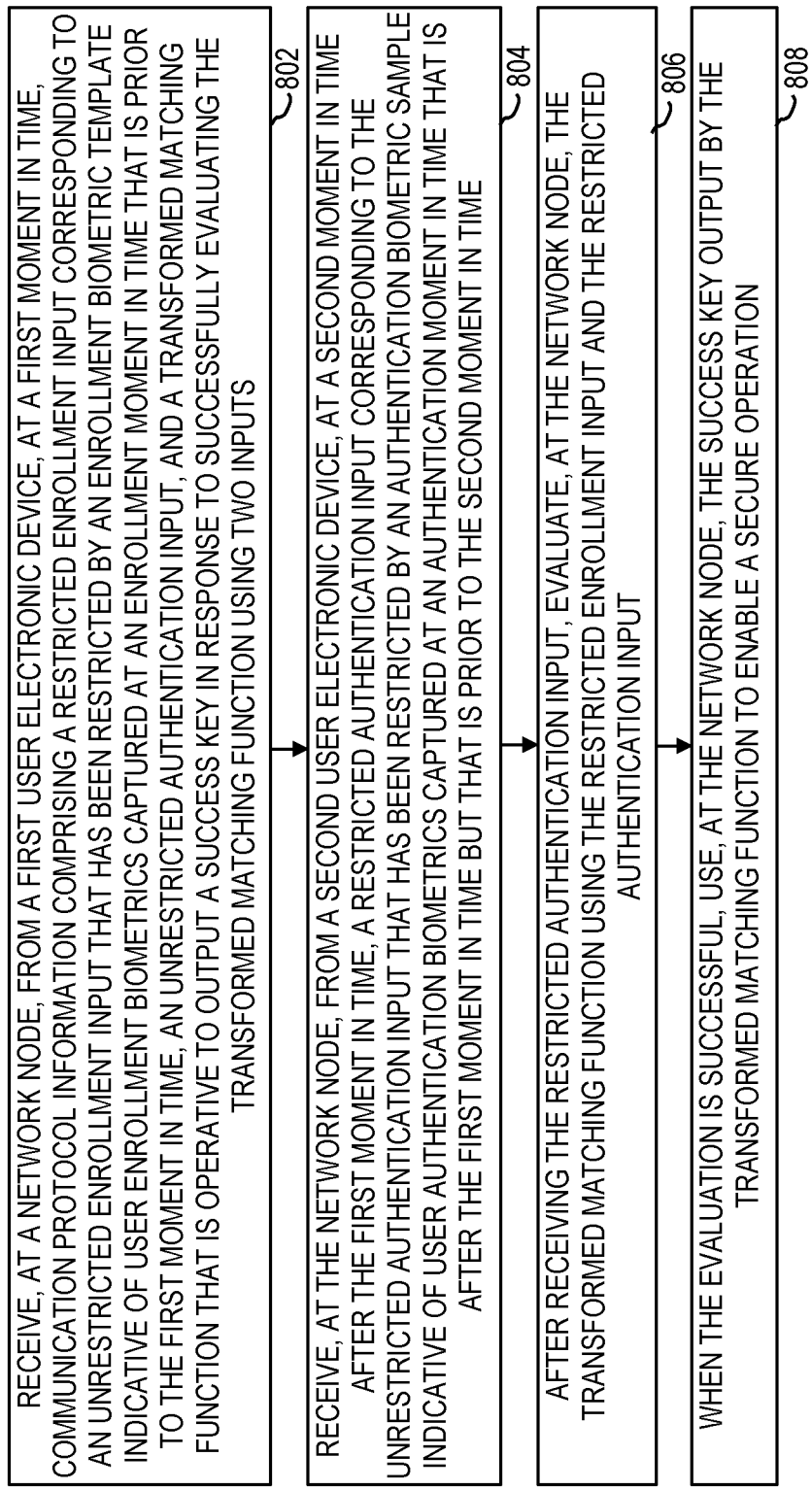

FIG. 8 is a flowchart of an illustrative process 800 for authenticating a user of at least a first user electronic device and a second user electronic device using a network node. At operation 802, the network node may receive, at the network node, from the first user electronic device, at a first moment in time, communication protocol information that may include a restricted enrollment input corresponding to an unrestricted enrollment input that has been restricted by an enrollment biometric template indicative of user enrollment biometrics captured at an enrollment moment in time that is prior to the first moment in time, an unrestricted authentication input, and a transformed matching function that is operative to output a success key in response to successfully evaluating the transformed matching function using two inputs (e.g., a node j may receive $ACI_j$ at operation 228 of process 200). At operation 804, the network node may receive, at the network node, from the second user electronic device, at a second moment in time after the first moment in time, a restricted authentication input corresponding to the unrestricted authentication input that has been restricted by an authentication biometric sample indicative of user authentication biometrics captured at an authentication moment in time that is after the first moment in time but that is prior to the second moment in time (e.g., a node j may receive a restricted CIT $K'_j$ at operation 434 of process 400). At operation 806, after the network node has received the restricted authentication input at operation 804, the network node may evaluate, at the network node, the transformed matching function using the restricted enrollment input and the restricted authentication input (e.g., node j may use restricted CIT $K'_j$ and restricted CIT $T'_j$ to evaluate circuit $C_j$ at operation 434 of process 400). When the evaluation of operation 806 is successful, the network node, at operation 808, may use, at the network node, the success key output by the transformed matching function to enable a secure operation (e.g., node j may use success key $ck_j$ at operation 436 of process 400).

The operations shown in process 800 of FIG. 8 are only illustrative and that existing operations may be modified or omitted, additional operations may be added, and the order of certain operations may be altered.

FIG. 9

FIG. 9 is a flowchart of an illustrative process 900 for authenticating a user of a user electronic device using a network node. At operation 902, the user electronic device may obtain, at the user electronic device, a seed (e.g., device 60a may obtain seed s at operation 204 of process 200). At operation 904, the user electronic device may generate, at the user electronic device, an enrollment biometric template indicative of user enrollment biometric identifier information (e.g., device 60a may generate an EBT B at operation 222 of process 200). At operation 906, the user electronic device may identify, at the user electronic device, a transformed matching function that is operative to output a success key in response to successfully evaluating the transformed matching function using a first input and a second input (e.g., device 60a may identify a garbled circuit at operation 310 of operation 224 of process 200). At operation 908, the user electronic device may generate, at the user electronic device, a restricted enrollment input by restricting the first input using the enrollment biometric template (e.g., device 60a may make restricted CIT T'$_j$ representative of EBT B at operation 318 of operation 224 of process 200). At operation 910, the user electronic device may encrypt, at the user electronic device, with the success key, seed information that includes at least a portion of the seed (e.g., device 60a may encrypt at least a seed share with success key ck$_j$ at operation 322 of operation 224 of process 200). After the encryption of operation 910, at operation 912, the user electronic device may delete the seed from the user electronic device (e.g., device 60a may delete seed s at operation 238 of process 200). At operation 914, the user electronic device may send, from the user electronic device, to the network node, enrollment data including the encrypted seed information and the transformed matching function and the restricted enrollment input (e.g., device 60a may send authentication circuit information ACI$_j$ to node j at operation 226 of process 200).

The operations shown in process 900 of FIG. 9 are only illustrative and that existing operations may be modified or omitted, additional operations may be added, and the order of certain operations may be altered.

Wrap-Up

One, some, or all of the processes described with respect to FIGS. 1-9 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 13, memory 63, memory 73, memory 83, and/or memory 93 of FIGS. 1-1F). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from an APS subsystem to a client subsystem, from a client subsystem (e.g., a user device, a node, a repository, a third party subsystem, etc.) to an APS subsystem, and/or from one client subsystem to another client subsystem using any suitable communications protocol (e.g., the computer-readable medium may be communicated to a user device 60 as at least a portion of application 69, to a node 70 as at least a portion of application 79, to a repository 80 as at least a portion of application 83, to a third party subsystem 90 as at least a portion of application 93 via any suitable communications components and/or via any suitable network(s) 50). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Any, each, or at least one module or component or subsystem of the disclosure may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. The number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

While there have been described systems, methods, and computer-readable media for providing an authentication processing service, many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for authenticating a user of at least a first user electronic device and a second user electronic device using a network node, the method comprising:
  receiving, at the network node, from the first user electronic device, at a first moment in time, communication protocol information comprising:
    a restricted enrollment input corresponding to an unrestricted enrollment input that has been restricted by an enrollment biometric template indicative of user enrollment biometrics captured at an enrollment moment in time that is prior to the first moment in time;
    an unrestricted authentication input; and
    a transformed matching function that is operative to output a success key in response to successfully evaluating the transformed matching function using two inputs;
  receiving, at the network node, from the second user electronic device, at a second moment in time after the first moment in time, a restricted authentication input corresponding to the unrestricted authentication input that has been restricted by an authentication biometric sample indicative of user authentication biometrics captured at an authentication moment in time that is after the first moment in time but that is prior to the second moment in time;

after the receiving the restricted authentication input, evaluating, at the network node, the transformed matching function using the restricted enrollment input and the restricted authentication input; and when the evaluating is successful, using, at the network node, the success key output by the transformed matching function to enable a secure operation, wherein:

the communication protocol information further comprises doubly encrypted seed data comprising seed information that has been encrypted with an inner key and then encrypted with the success key; and the using the success key comprises:

decrypting, at the network node, using the success key output by the transformed matching function, the doubly encrypted seed data to reveal singly encrypted seed data comprising the seed information that has been encrypted with the inner key; and after the decrypting, sending, from the network node, to a remote entity, the singly encrypted seed data for further enabling the secure operation.

2. The method of claim 1, wherein the second user electronic device is the first user electronic device.

3. The method of claim 1, wherein the enrollment biometric template is not accessible to the network node.

4. The method of claim 1, wherein the authentication biometric sample is not accessible to the network node.

5. The method of claim 4, wherein the enrollment biometric template is not accessible to the network node.

6. The method of claim 1, wherein the remote entity is the first user electronic device.

7. The method of claim 1, wherein the remote entity is the second user electronic device.

8. The method of claim 1, wherein the communication protocol information further comprises encrypted inner key data comprising the inner key that has been encrypted with a public encryption key of the first user electronic device.

9. The method of claim 8, wherein:

the second user electronic device is the first user electronic device;

the unrestricted authentication input of the communication protocol information is encrypted with the inner key; and the method further comprises, after the receiving the communication protocol information, but before the receiving the restricted authentication input, sending, from the network node, to the first user electronic device, the encrypted inner key data and the unrestricted authentication input encrypted with the inner key.

10. The method of claim 1, wherein the seed information comprises at least a portion of a secret seed generated by the first user electronic device.

11. The method of claim 10, wherein the secret seed is not stored on the first user electronic device at the second moment in time.

12. The method of claim 1, wherein:

the communication protocol information further comprises doubly encrypted enrollment biometric template data comprising enrollment biometric template information that has been encrypted with the inner key and then encrypted with the success key; and the using the success key further comprises:

decrypting, at the network node, using the success key output by the transformed matching function, the doubly encrypted enrollment biometric template data to reveal singly encrypted enrollment biometric template data comprising the enrollment biometric template information that has been encrypted with the inner key; and after the decrypting, sending, from the network node, to the remote entity, the singly encrypted enrollment biometric template data.

13. The method of claim 1, wherein the remote entity is configured to use the seed information to authenticate a challenge from a third party subsystem.

14. A method for authenticating a user of a user electronic device using a network node, the method comprising:

obtaining, at the user electronic device, a seed;

generating, at the user electronic device, an enrollment biometric template indicative of user enrollment biometric identifier information;

identifying, at the user electronic device, a transformed matching function that is operative to output a success key in response to successfully evaluating the transformed matching function using a first input and a second input;

generating, at the user electronic device, a restricted enrollment input by restricting the first input using the enrollment biometric template;

generating, at the user electronic device, an inner key;

encrypting, at the user electronic device, with the success key, seed information that comprises at least a portion of the seed encrypted with the inner key;

after the encrypting, deleting the seed from the user electronic device;

sending, from the user electronic device, to the network node, enrollment data comprising the encrypted seed information and the transformed matching function and the restricted enrollment input;

after the sending, receiving, at the user electronic device, from the network node, the seed information;

recovering, at the user electronic device, the seed using the received seed information; and using, at the electronic device, the recovered seed to enable a secure operation.

15. The method of claim 14, further comprising:

after the sending, generating, at the user electronic device, an authentication biometric sample indicative of user authentication biometric identifier information;

generating, at the user electronic device, a restricted authentication input by restricting the second input using the authentication biometric sample; and transmitting, from the user electronic device, to the network node, the restricted authentication input.

16. The method of claim 14, further comprising:

encrypting, at the user electronic device, with the success key, enrollment biometric template information that comprises at least a portion of the enrollment biometric template; and after both of the encrypting the enrollment biometric template information and the generating the restricted enrollment input, deleting the enrollment biometric template from the user electronic device, wherein the enrollment data further comprises the encrypted enrollment biometric template information.

17. A non-transitory computer-readable storage medium storing at least one program, the at least one program comprising instructions, which, when executed by at least one processor of an electronic subsystem, cause the at least one processor to:

receive, from a user electronic device, a restricted enrollment input corresponding to an unrestricted enrollment input that has been restricted by an enrollment biometric template indicative of user enrollment biometrics captured at an enrollment moment in time;

receive, from the user electronic device, a restricted authentication input corresponding to an unrestricted authentication input that has been restricted by an authentication biometric sample indicative of user authentication biometrics captured at an authentication moment in time after the enrollment moment in time;

receive, from the user electronic device, a transformed matching function that is operative to output a success key in response to successfully evaluating the transformed matching function using two inputs;

receive, from the user electronic device, doubly encrypted seed data comprising seed information that has been encrypted with an inner key and then encrypted with the success key;

evaluate the received transformed matching function using the received restricted enrollment input and the received restricted authentication input; and when the evaluation is successful, use the success key output by the transformed matching function to enable a secure operation, wherein the use of the success key comprises:

decrypting, using the success key output by the transformed matching function, the doubly encrypted seed data to reveal singly encrypted seed data comprising the seed information that has been encrypted with the inner key; and after the decrypting, sending, to a remote entity, the singly encrypted seed data for further enabling the secure operation.

* * * * *